(12) United States Patent
Qi et al.

(10) Patent No.: US 12,353,065 B2
(45) Date of Patent: Jul. 8, 2025

(54) SPECTACLE LENS AND METHOD FOR DESIGNING THE SAME

(71) Applicant: HOYA LENS THAILAND LTD., Pathumthani (TH)

(72) Inventors: Hua Qi, Tokyo (JP); Toshiaki Sonehara, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 636 days.

(21) Appl. No.: 17/423,811

(22) PCT Filed: Jun. 18, 2020

(86) PCT No.: PCT/JP2020/025118
§ 371 (c)(1),
(2) Date: Jul. 16, 2021

(87) PCT Pub. No.: WO2020/262569
PCT Pub. Date: Dec. 30, 2020

(65) Prior Publication Data
US 2022/0082864 A1 Mar. 17, 2022

(30) Foreign Application Priority Data

Jun. 25, 2019 (JP) ................................ 2019-117843

(51) Int. Cl.
*G02C 7/06* (2006.01)
*G02C 7/02* (2006.01)

(52) U.S. Cl.
CPC ............... *G02C 7/06* (2013.01); *G02C 7/024* (2013.01); *G02C 2202/24* (2013.01)

(58) Field of Classification Search
CPC .............................. G02C 2202/24; G02C 7/06
(Continued)

(56) References Cited

U.S. PATENT DOCUMENTS 7,025,460 B2 * 4/2006 Smitth .................... G02C 7/04
351/205
7,976,158 B2 7/2011 Drobe
(Continued)

FOREIGN PATENT DOCUMENTS

CN 101675372 A 3/2010
CN 104678572 A 6/2015
(Continued)

OTHER PUBLICATIONS

PCT/JP2020/025118, "English Translation of International Search Report", Sep. 10, 2020, 3 pages.
(Continued)

*Primary Examiner* — Zachary W Wilkes
(74) *Attorney, Agent, or Firm* — Oliff PLC

(57) ABSTRACT

An aspect is to not impair an effect of suppressing the progression of myopia or hyperopia even in a peripheral area of a spectacle lens. A spectacle lens and a technology related thereto are provided, the spectacle lens including: a first area that causes light rays incident on an object-side face of the lens to exit from an eyeball-side face of the lens and to converge at a predetermined position A on a retina of a wearer; a plurality of defocusing second areas configured to cause light rays to converge at a position B on the object side or a position C on the distal side relative to the position A, wherein at least some of the second areas in a peripheral area of the spectacle lens that is a radius range from 4.5 mm to 25 mm from a lens center have a shape that suppresses a variation in a defocusing effect, the variation being more likely to occur as a distance from the lens center increases.

7 Claims, 64 Drawing Sheets

(58) Field of Classification Search
USPC .................. 351/159.79, 159.41, 159.48
See application file for complete search history.

(56) References Cited

U.S. PATENT DOCUMENTS

| | | | |
|---|---|---|---|
| 10,268,050 B2* | 4/2019 | To .................... | G02C 7/022 |
| 10,429,670 B2* | 10/2019 | Newman .......... | B29D 11/00326 |
| 10,948,744 B1* | 3/2021 | Guillot ............. | G02C 7/066 |
| 11,061,253 B2* | 7/2021 | Back ................. | G02C 7/042 |
| 2007/0296916 A1* | 12/2007 | Holden ............. | G02C 7/044 |
| | | | 351/159.48 |
| 2008/0218687 A1 | 9/2008 | Phillips | |
| 2010/0100177 A1 | 4/2010 | Zhao | |
| 2012/0062836 A1* | 3/2012 | Tse .................... | G02C 7/042 |
| | | | 351/159.41 |
| 2014/0327875 A1 | 11/2014 | Blum et al. | |
| 2017/0131567 A1* | 5/2017 | To .................... | G02C 7/06 |
| 2017/0184875 A1* | 6/2017 | Newman ........... | G02C 7/022 |
| 2018/0210229 A1 | 7/2018 | Wang et al. | |
| 2018/0275427 A1* | 9/2018 | Lau .................... | G02C 7/081 |
| 2020/0073147 A1 | 3/2020 | Bakaraju et al. | |
| 2021/0055573 A1* | 2/2021 | Back ................. | G02C 7/06 |
| 2022/0035179 A1* | 2/2022 | Rappon ............. | G02C 7/061 |

FOREIGN PATENT DOCUMENTS

| | | |
|---|---|---|
| CN | 106707542 A | 5/2017 |
| CN | 208969368 U | 6/2019 |
| WO | 2012122411 A1 | 9/2012 |
| WO | 2018076057 A1 | 5/2018 |
| WO | 2019166655 A1 | 9/2019 |

OTHER PUBLICATIONS

EP22187411.8, "Extended European Search Report", Oct. 28, 2022, 8 pages.
EP20750777.3, "Communication Pursuant to Rule 114(2) EPC", Sep. 19, 2024, 8 pages.

* cited by examiner

[Fig.1]
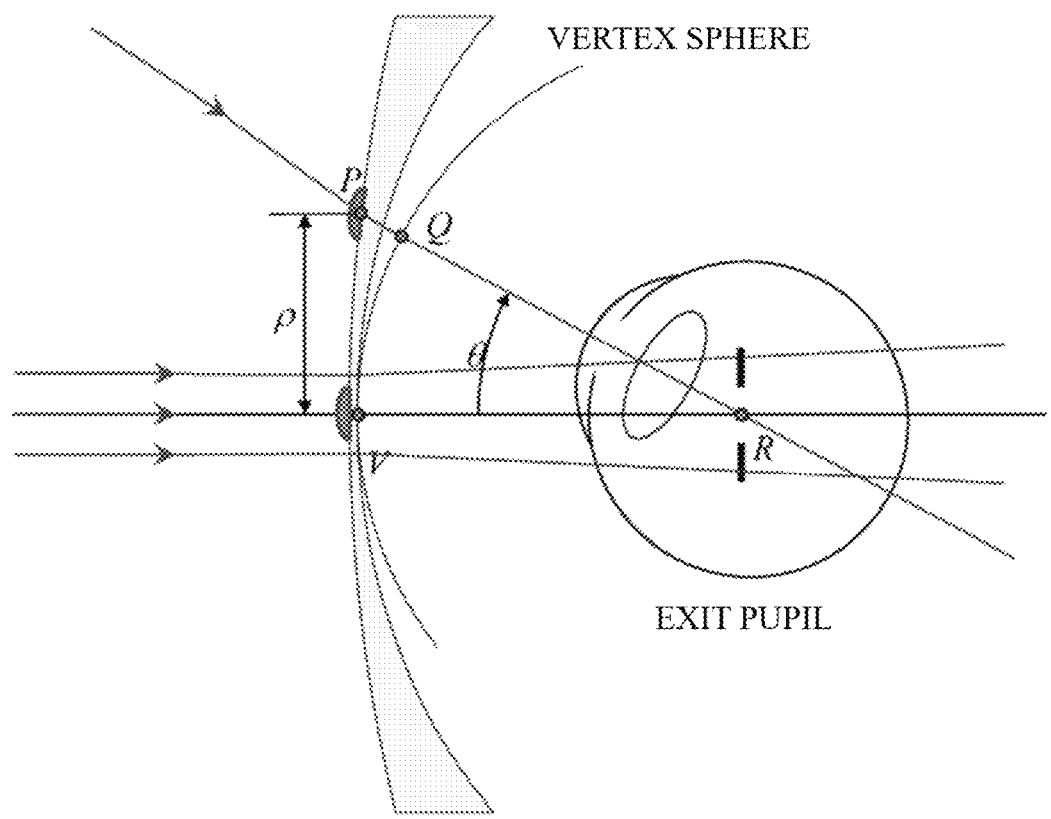
VERTEX SPHERE
EXIT PUPIL

[Fig.2]
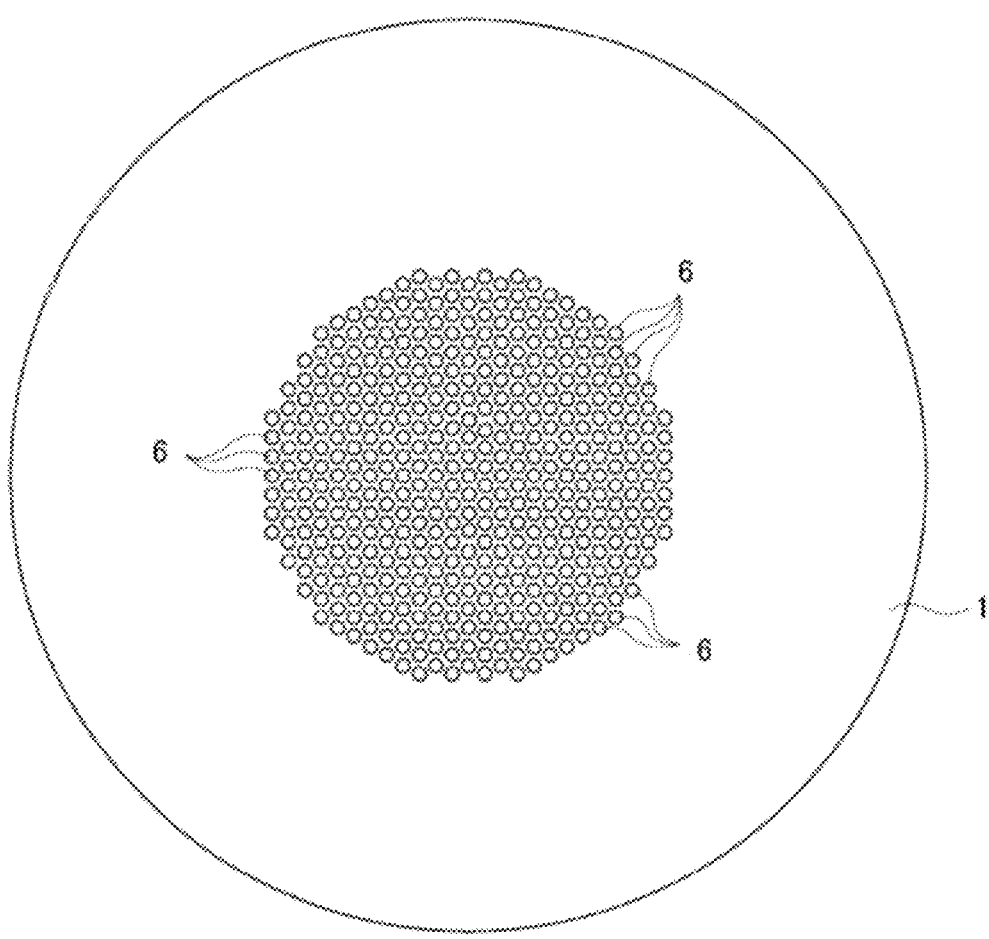

[Fig.3]
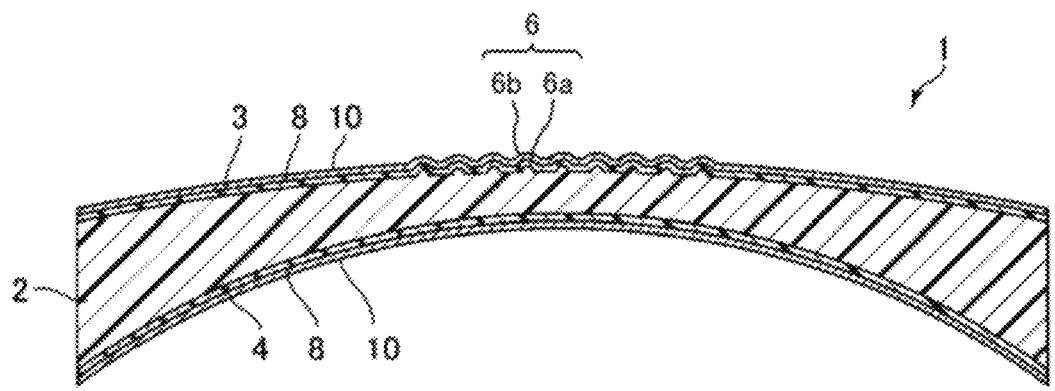
[Fig.4]
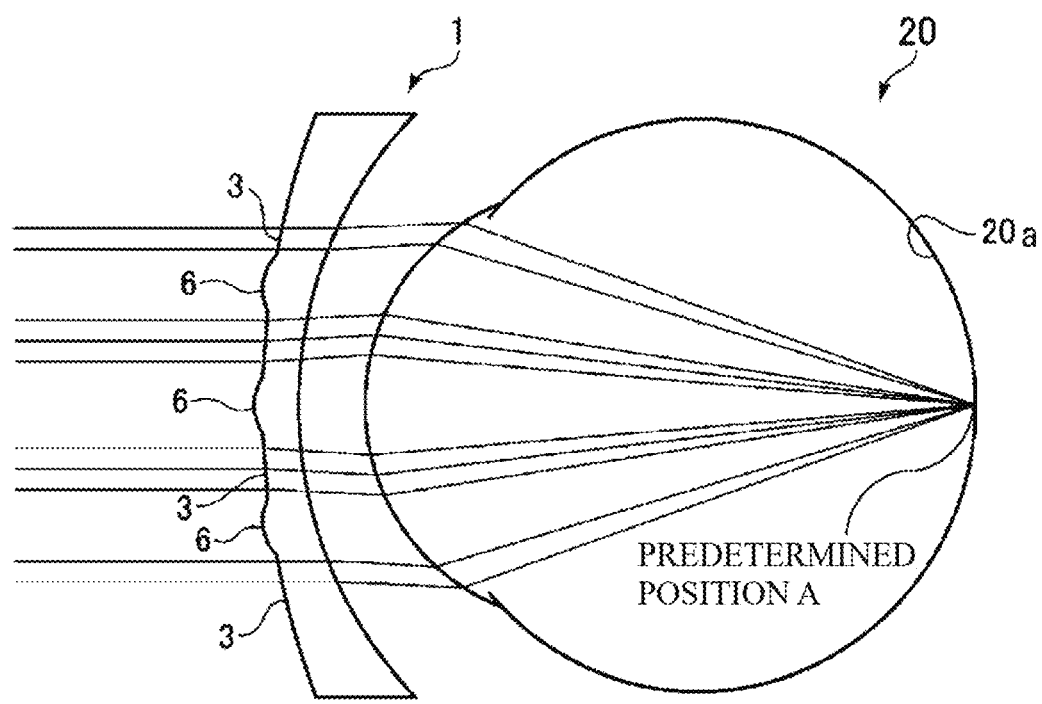

[Fig.5]
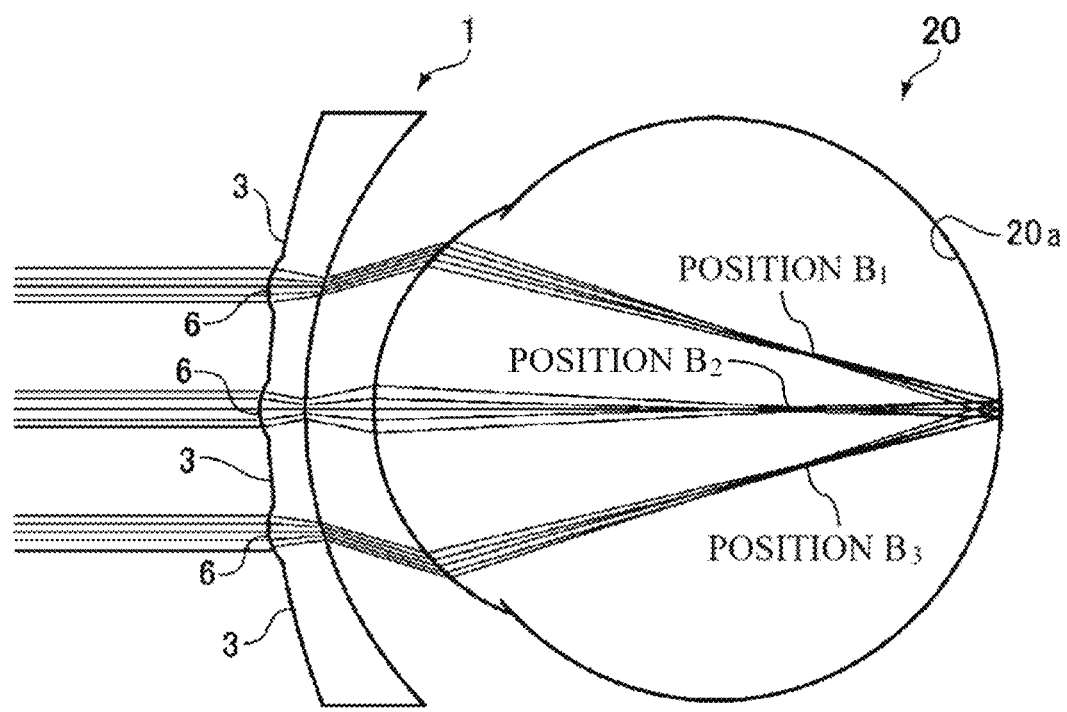

[Fig.6A]
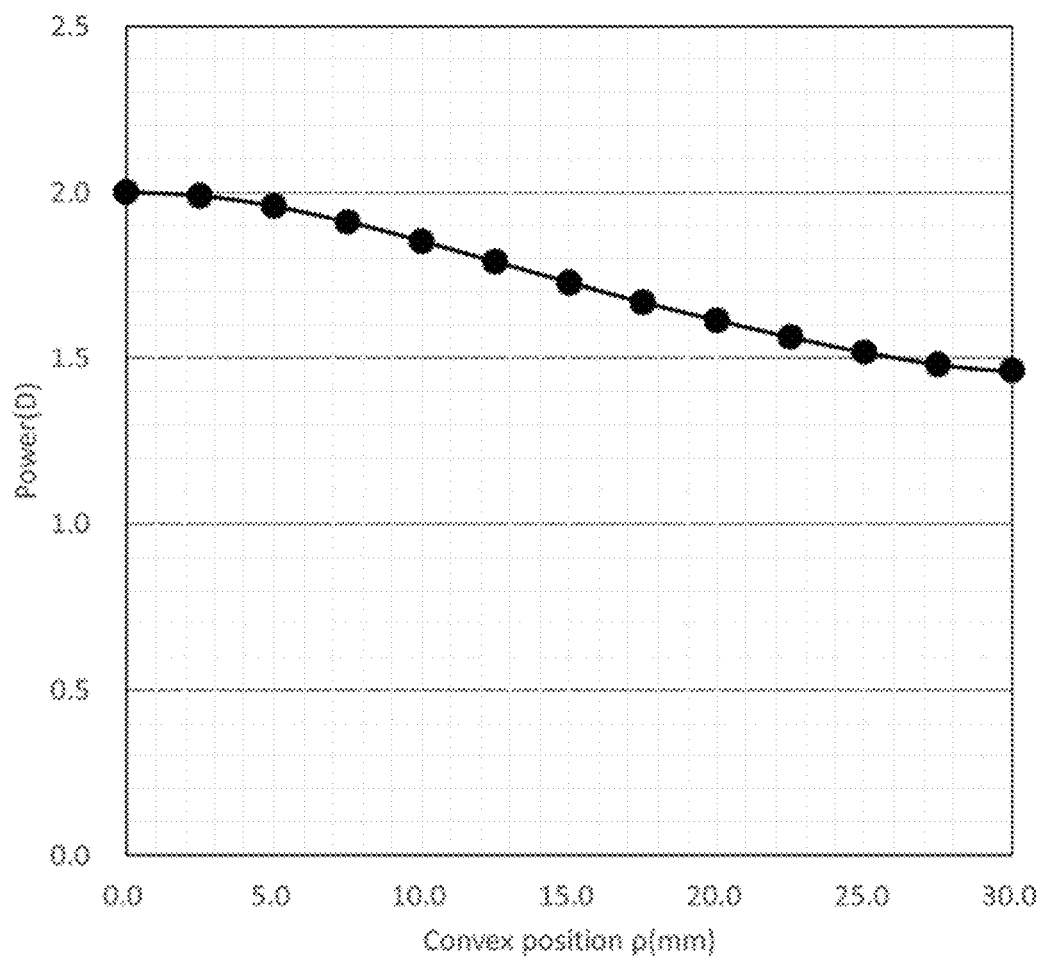

[Fig.6B]
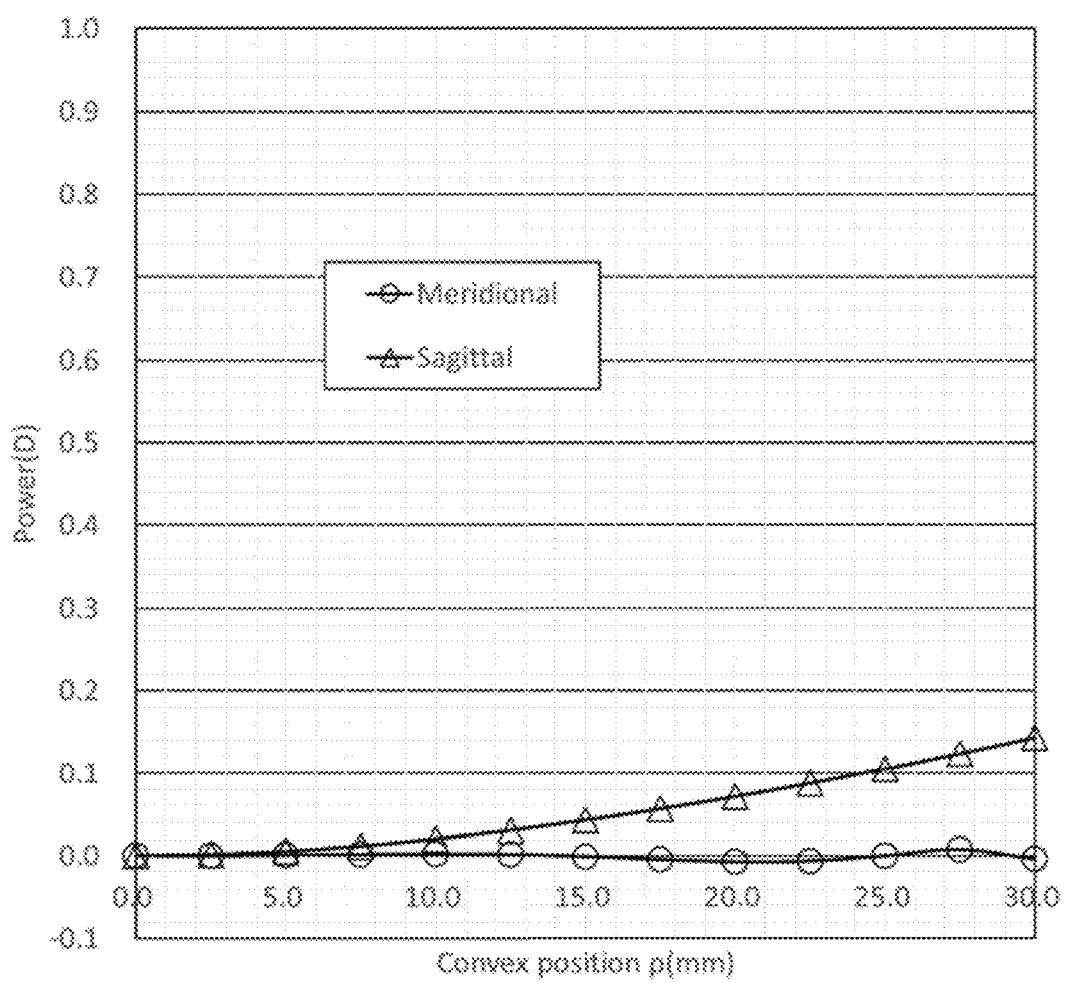

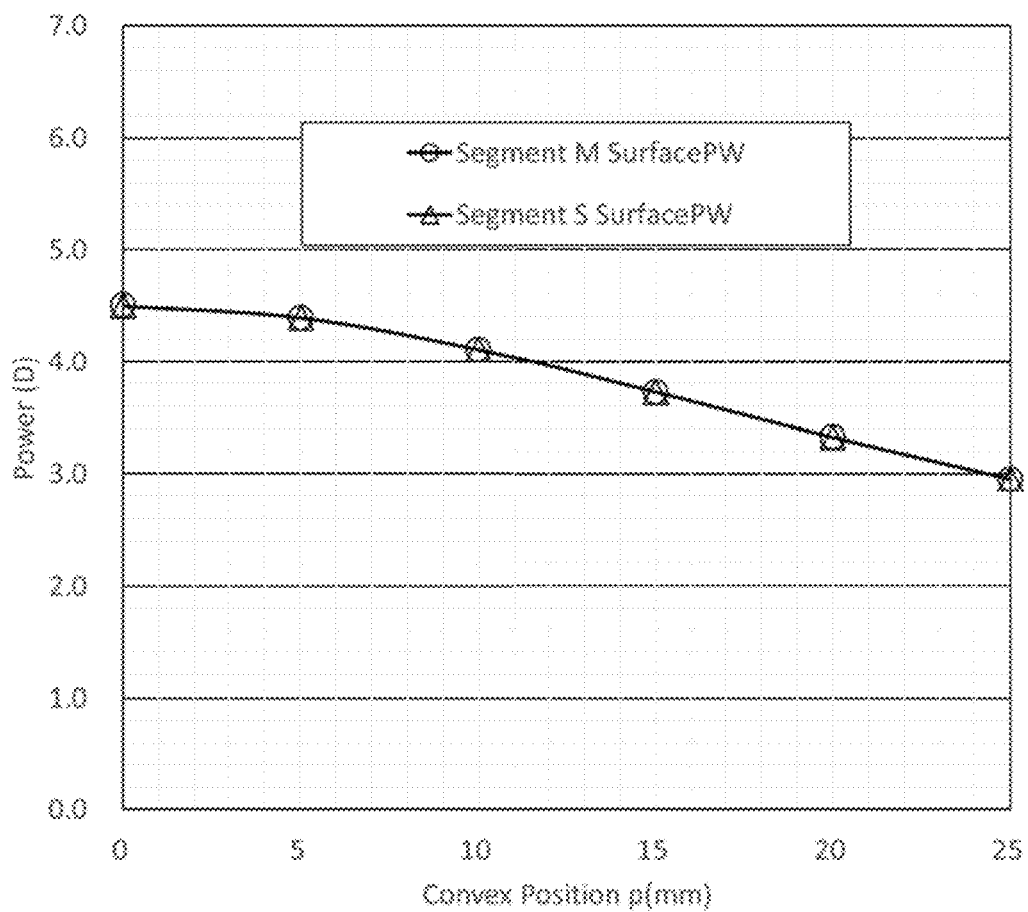

[Fig.6D]
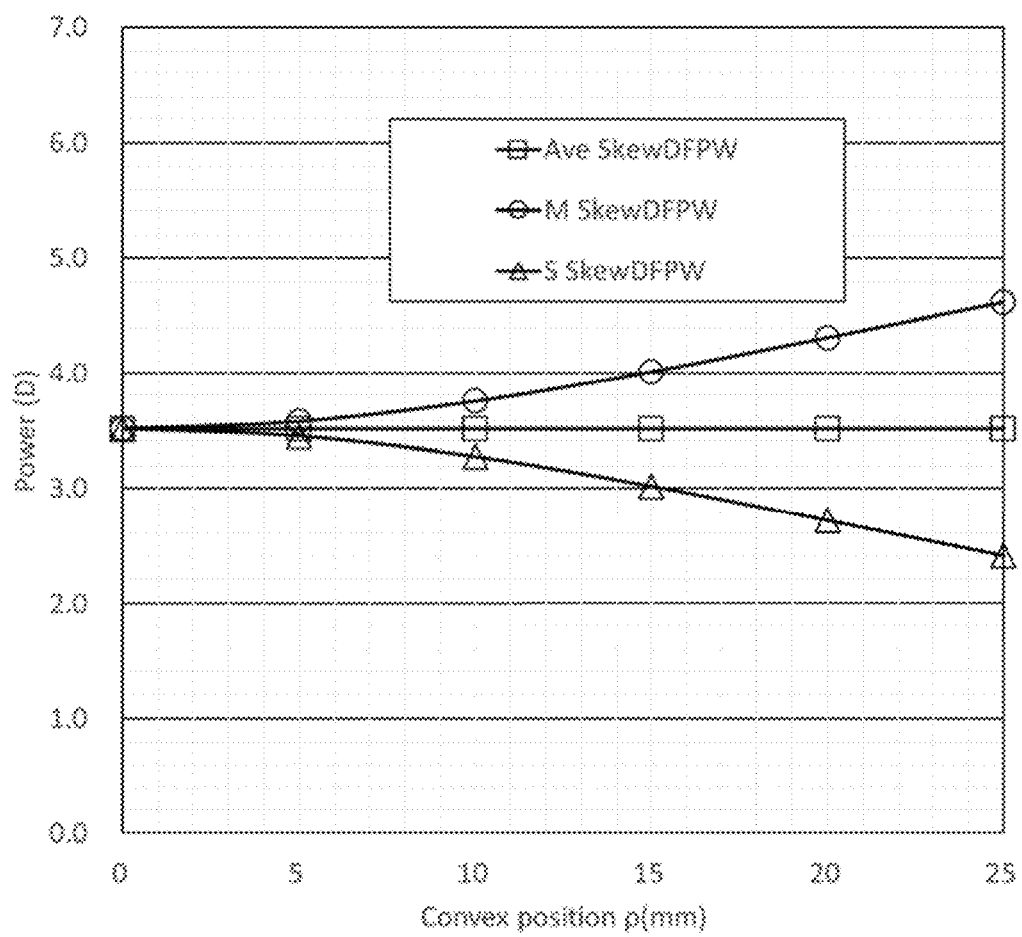

[Fig.6E]
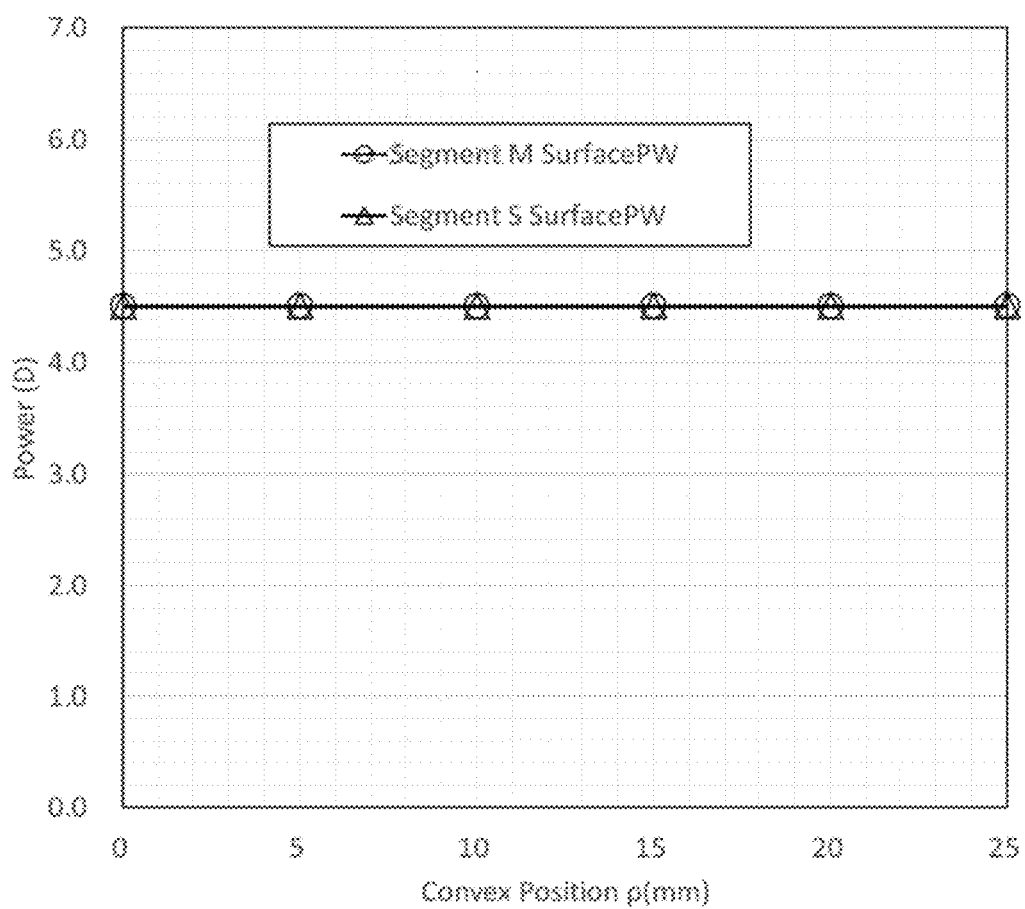

[Fig.6F]
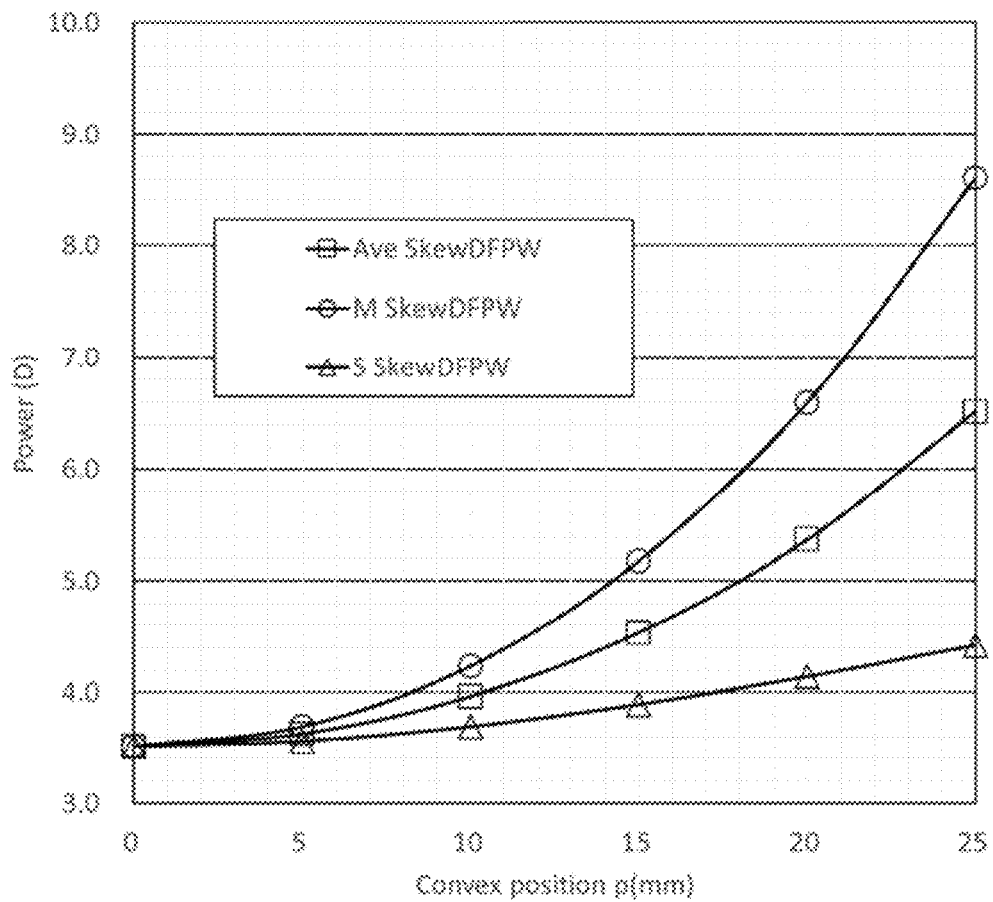

[Fig.7A]
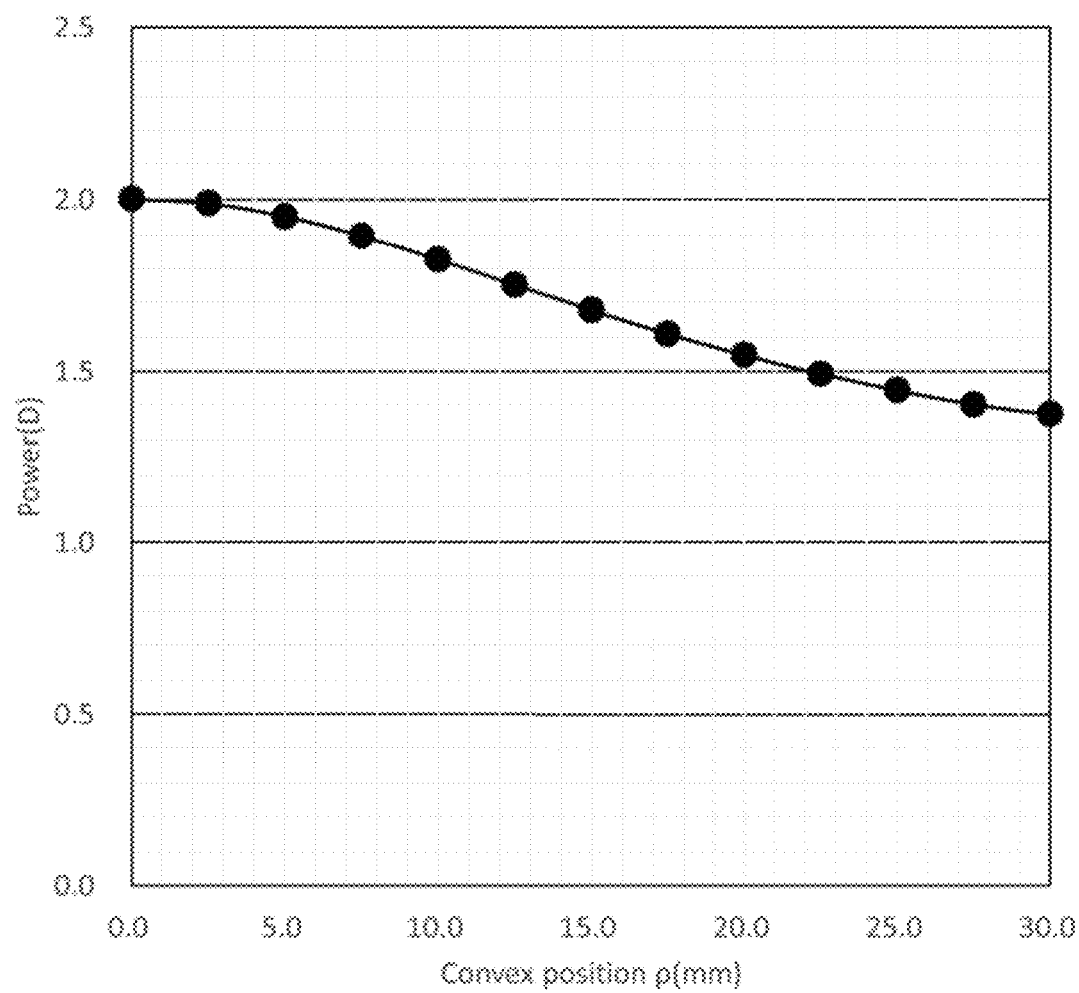

[Fig.7B]
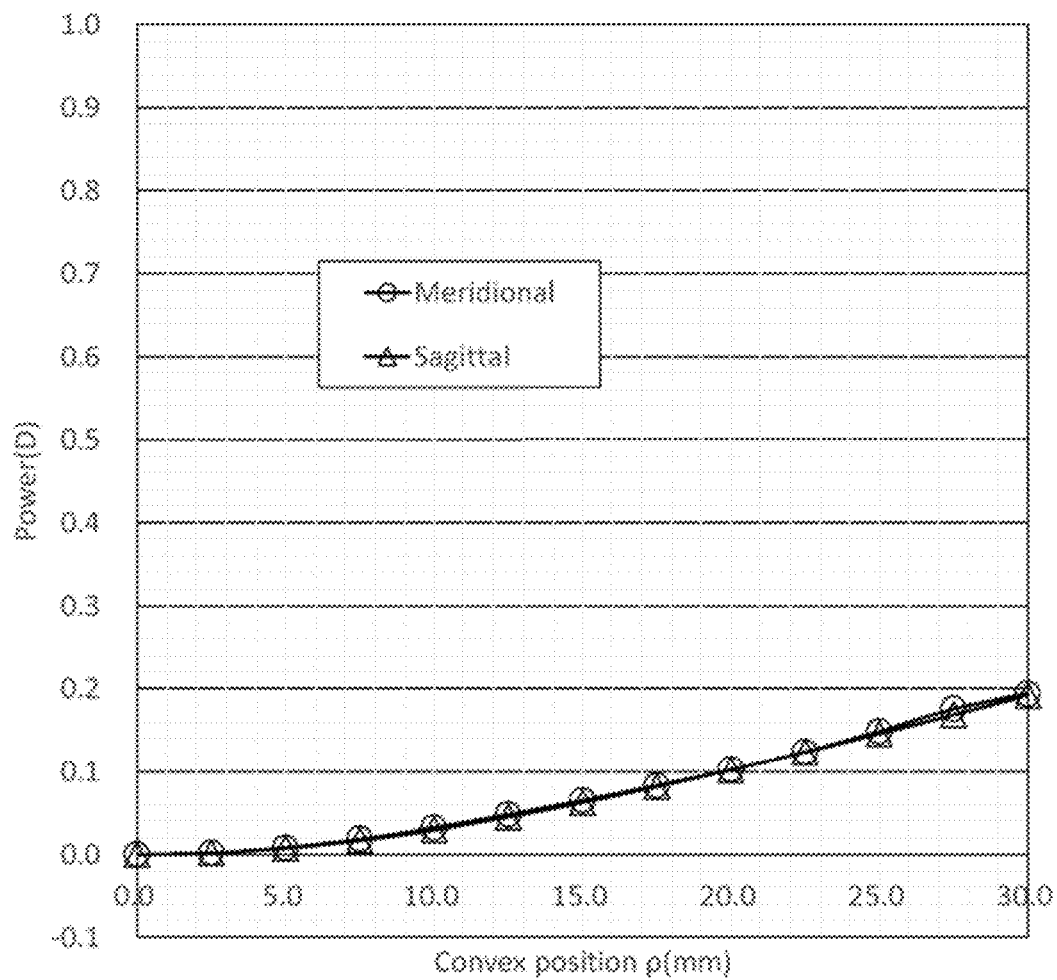

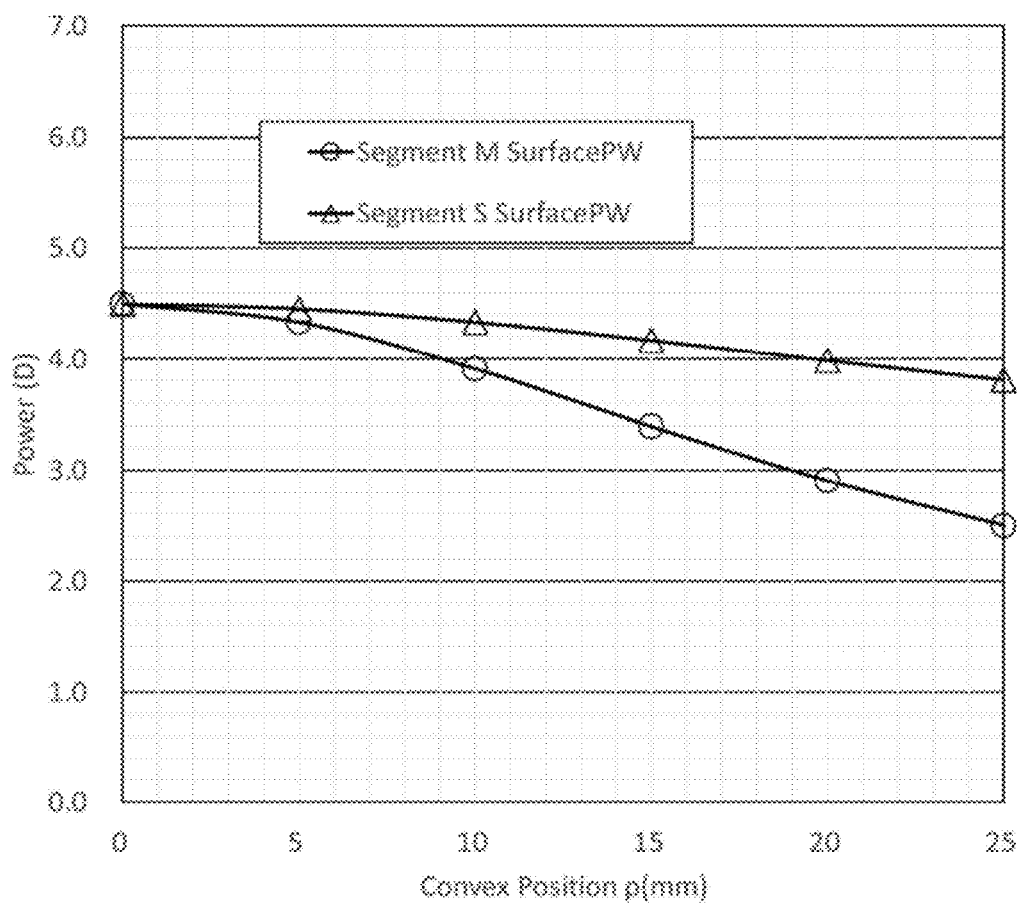

[Fig.7D]
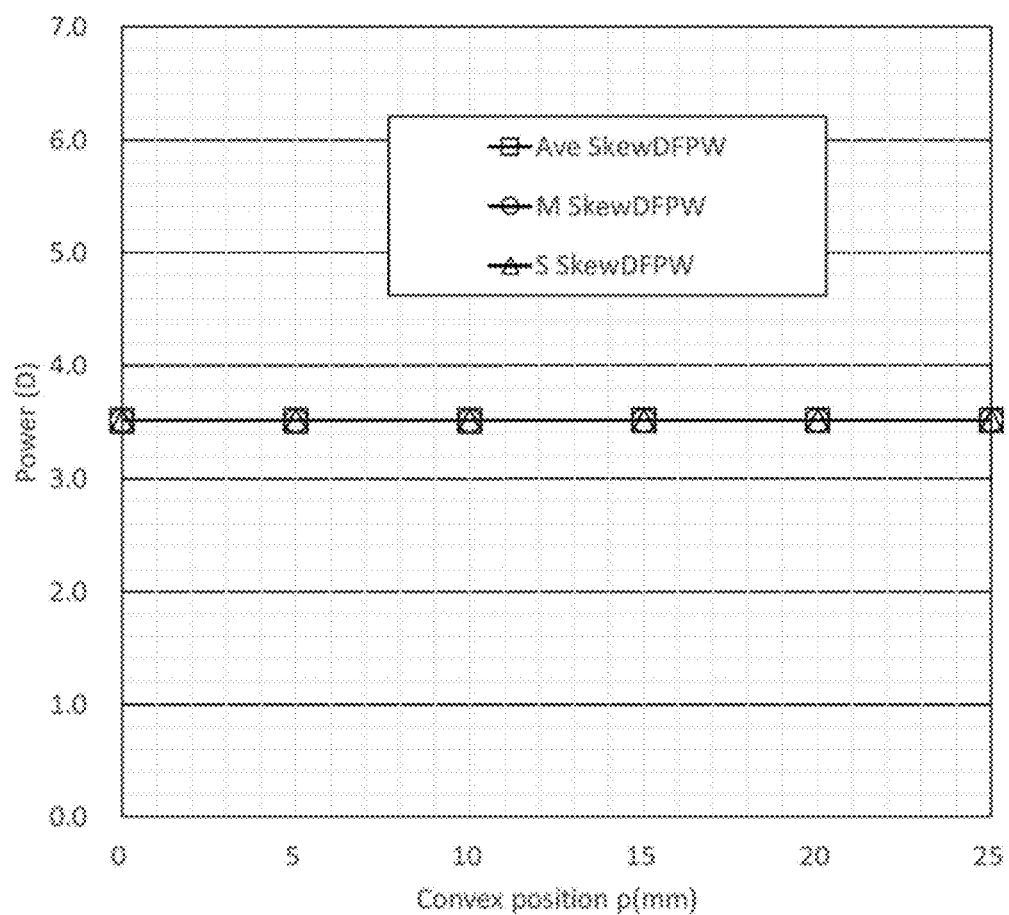

[Fig. 7E]
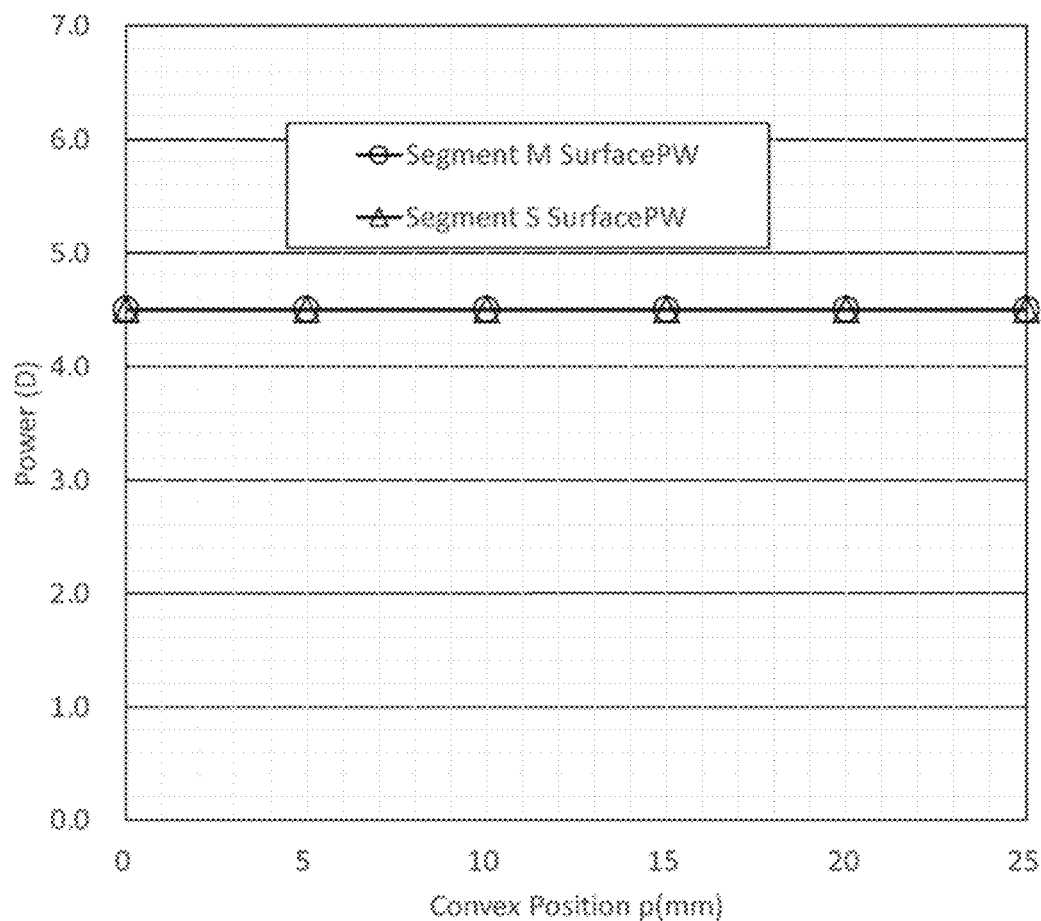

[Fig.7F]
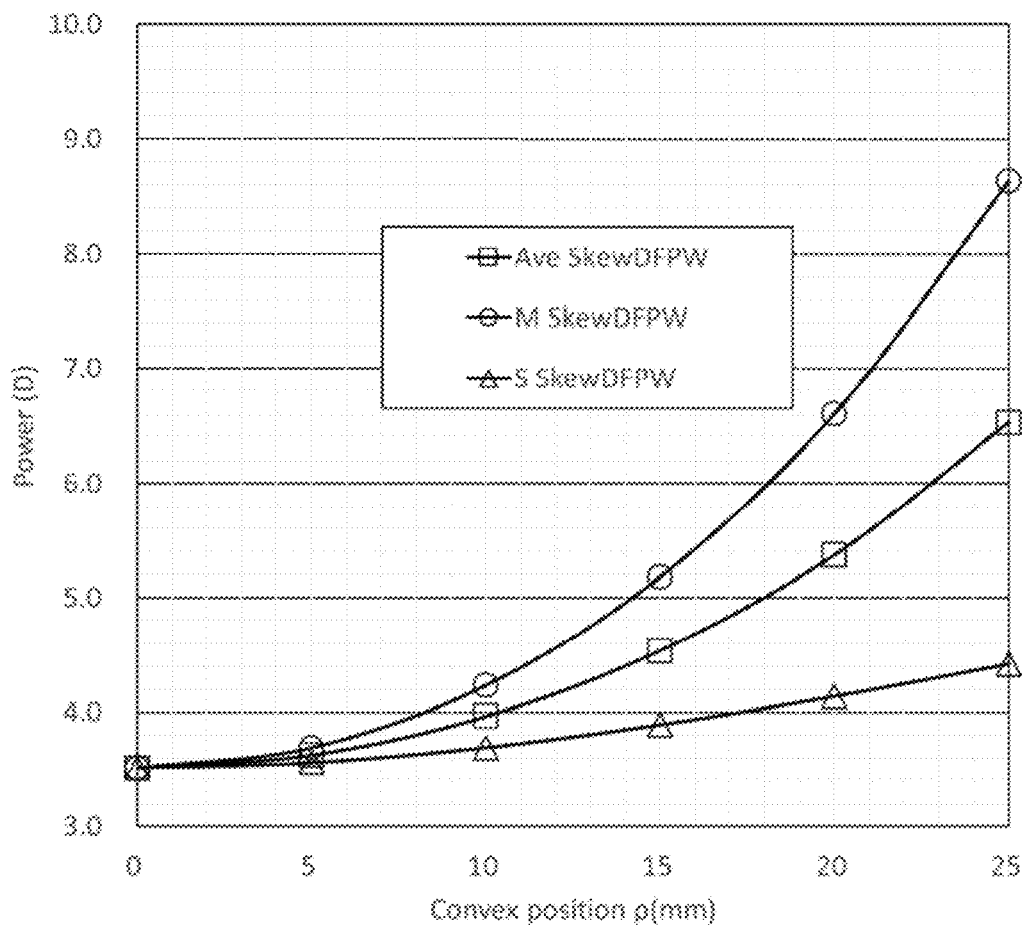

[Fig.8A]
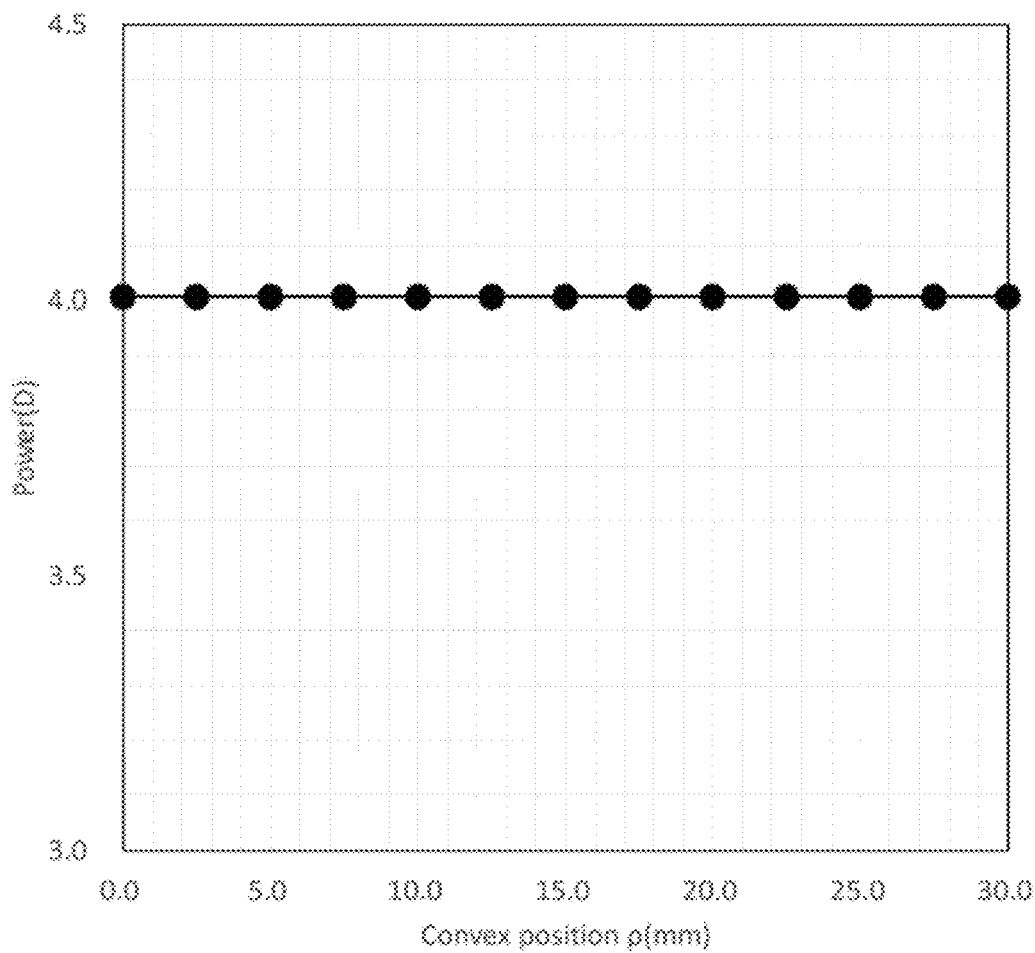

[Fig.8B]
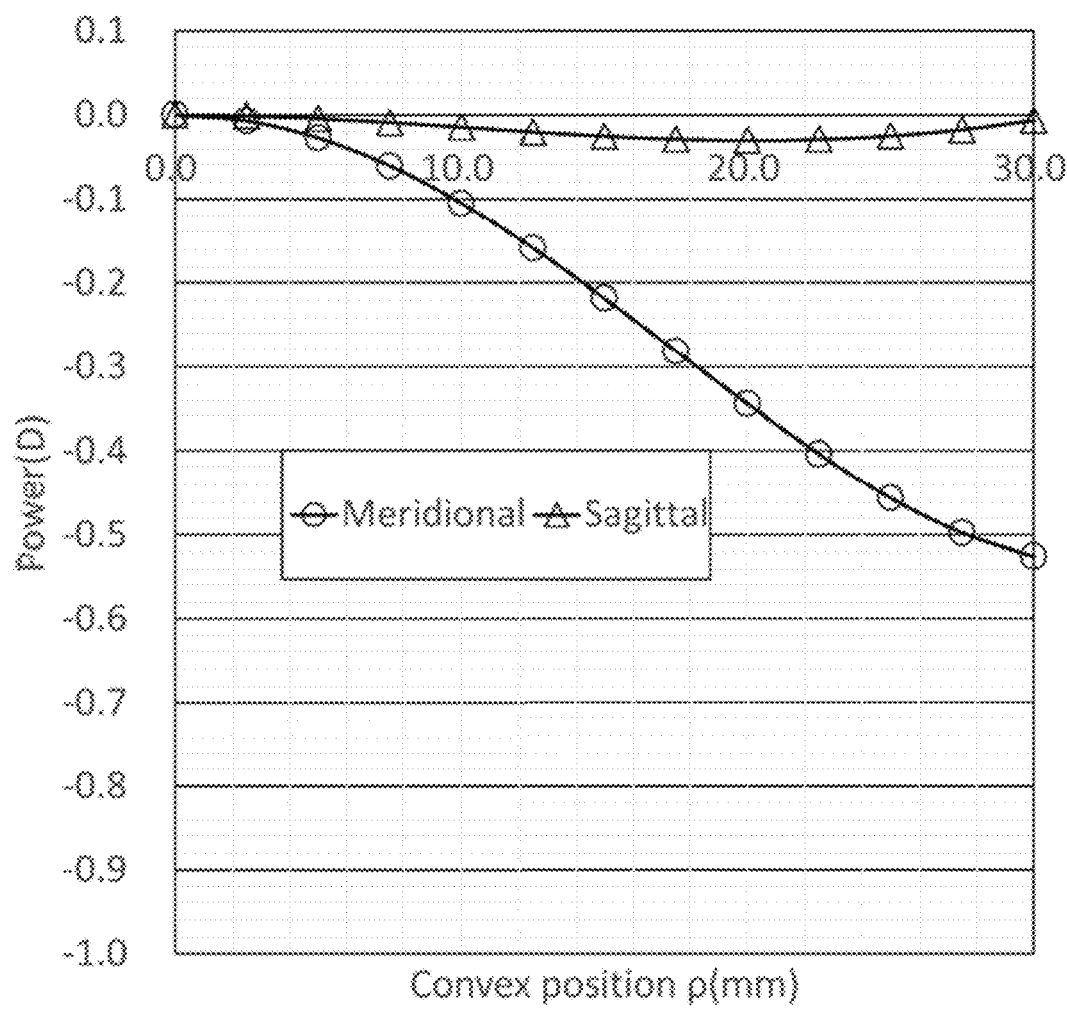

[Fig.8C]
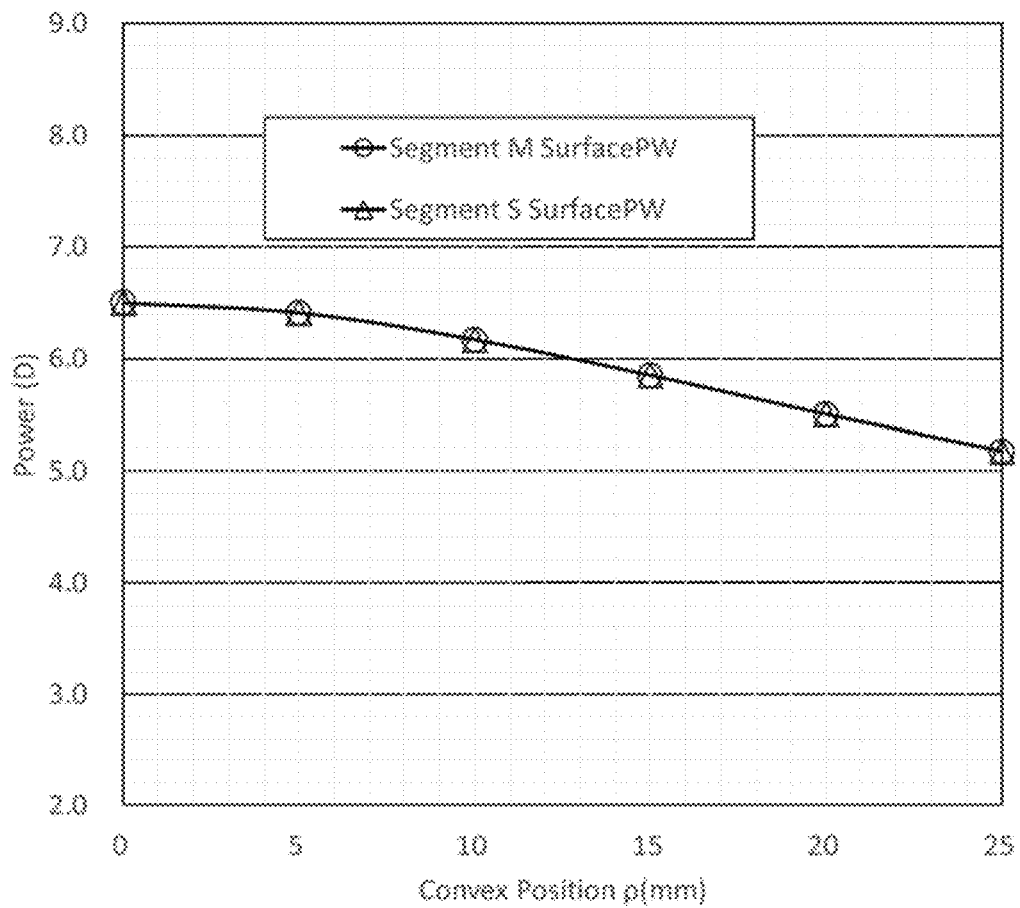

[Fig.8D]
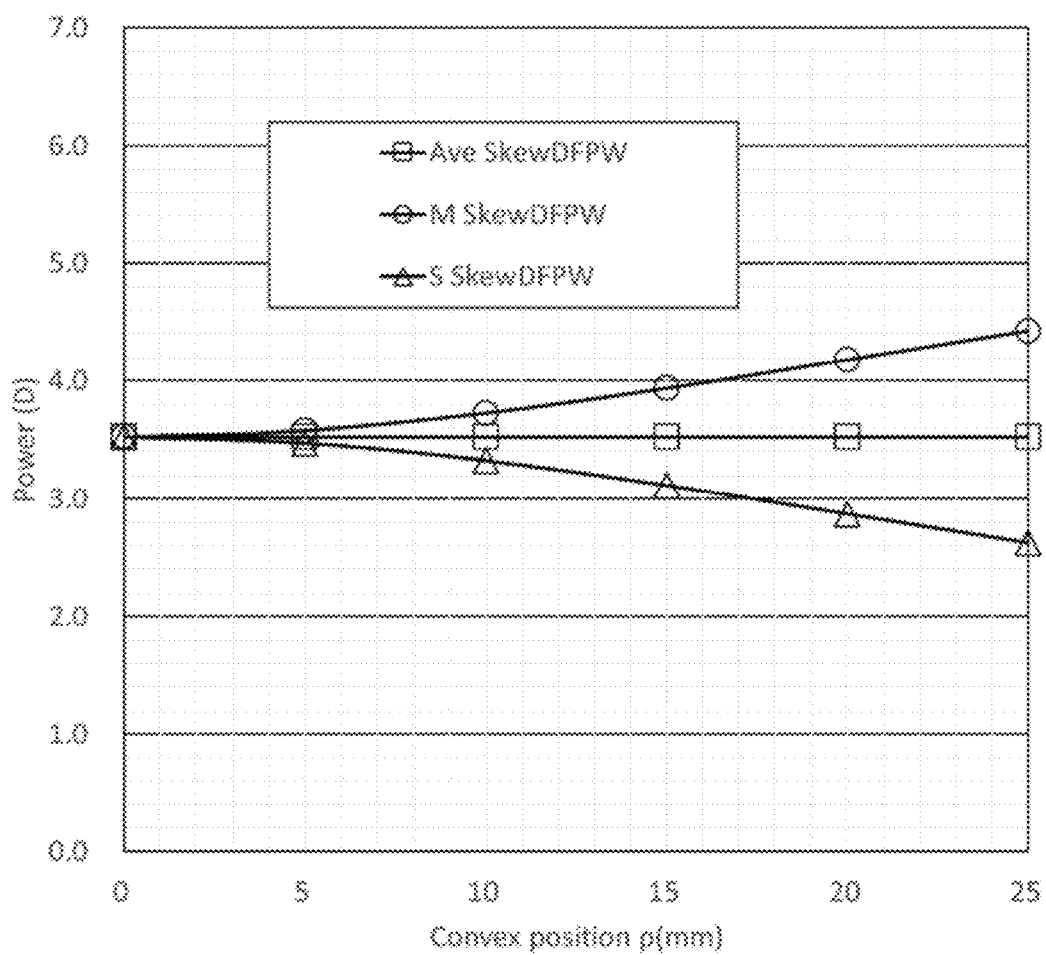

[Fig.8E]
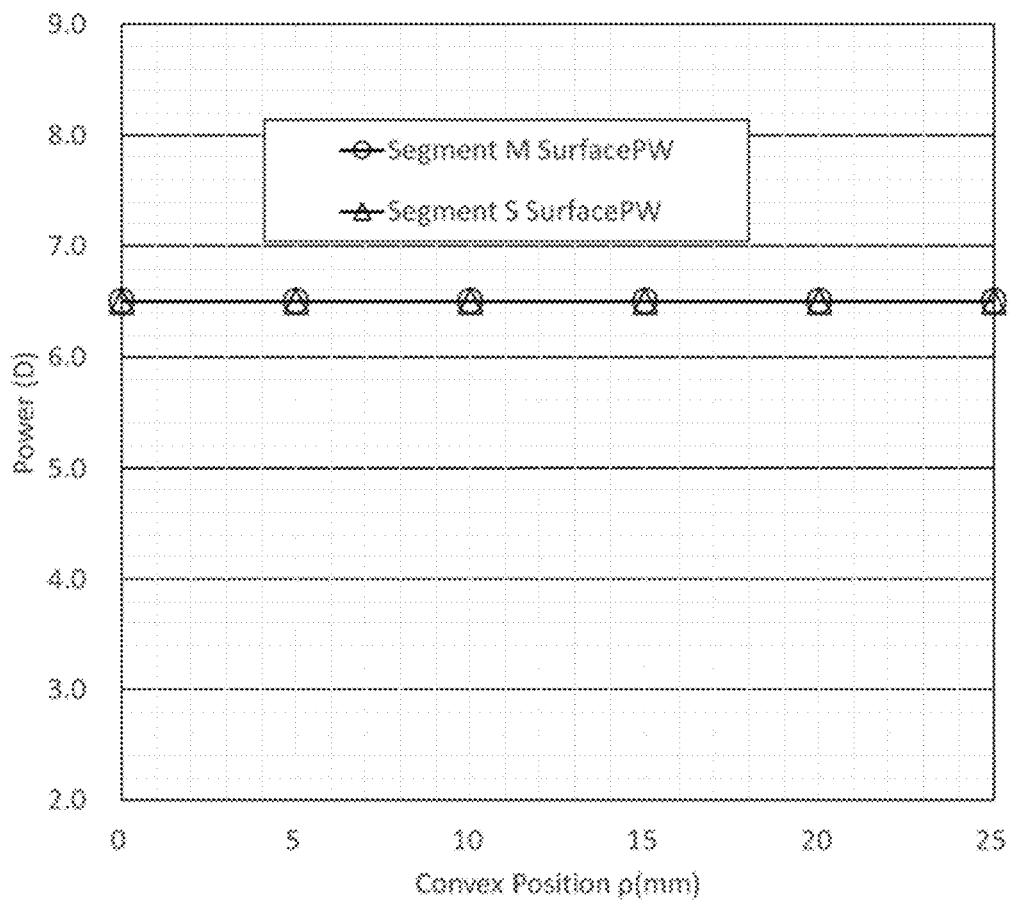

[Fig.8P]
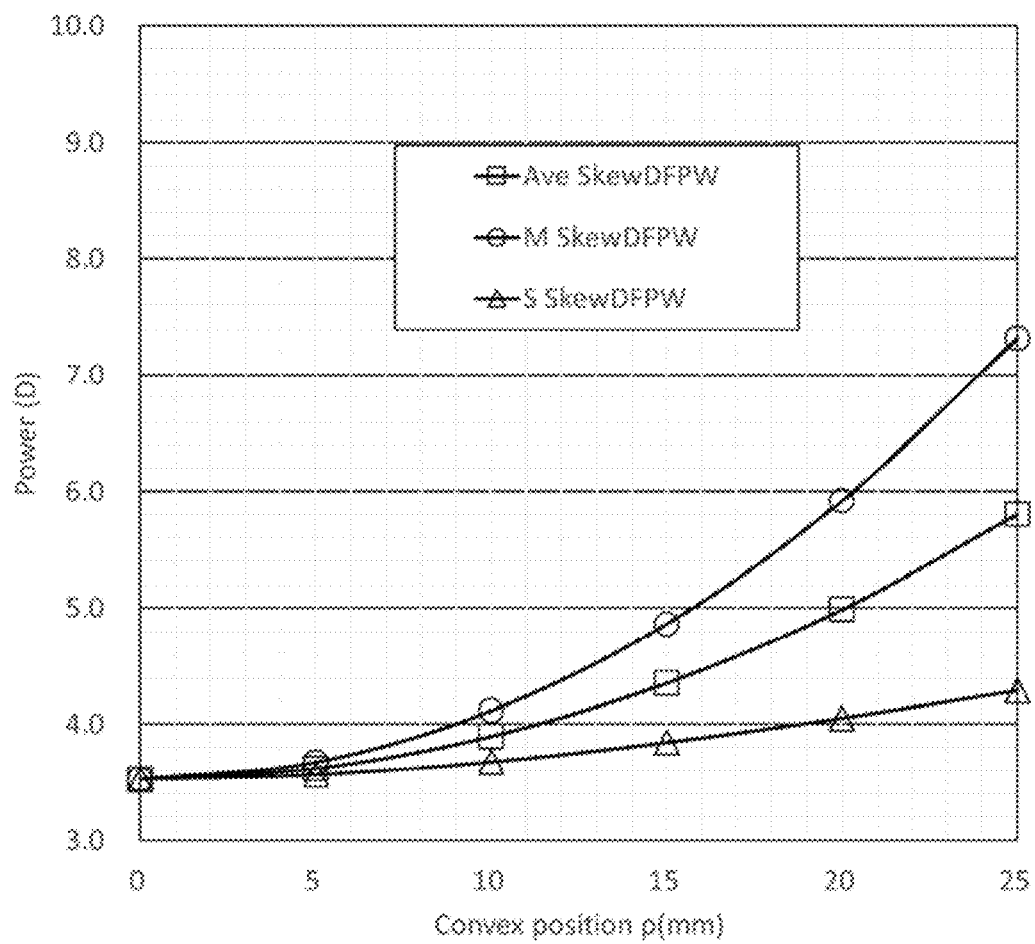

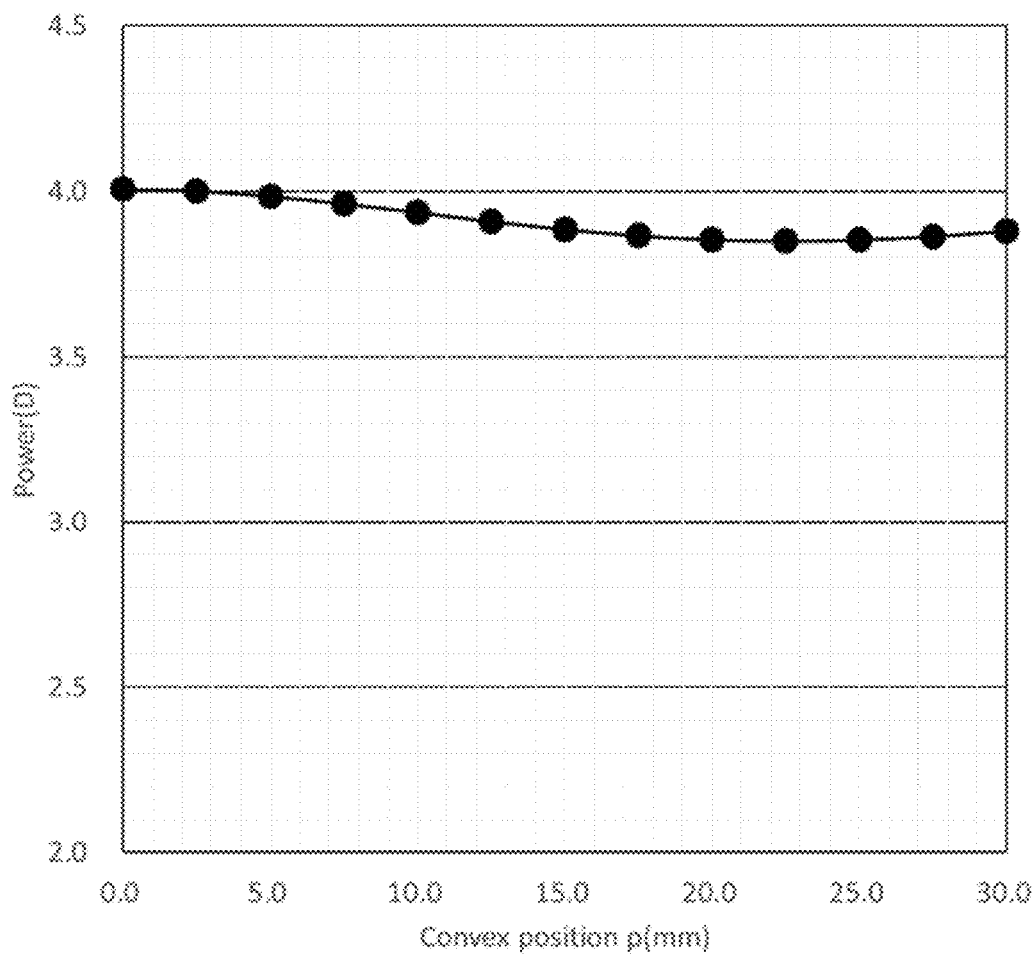

[Fig.9B]
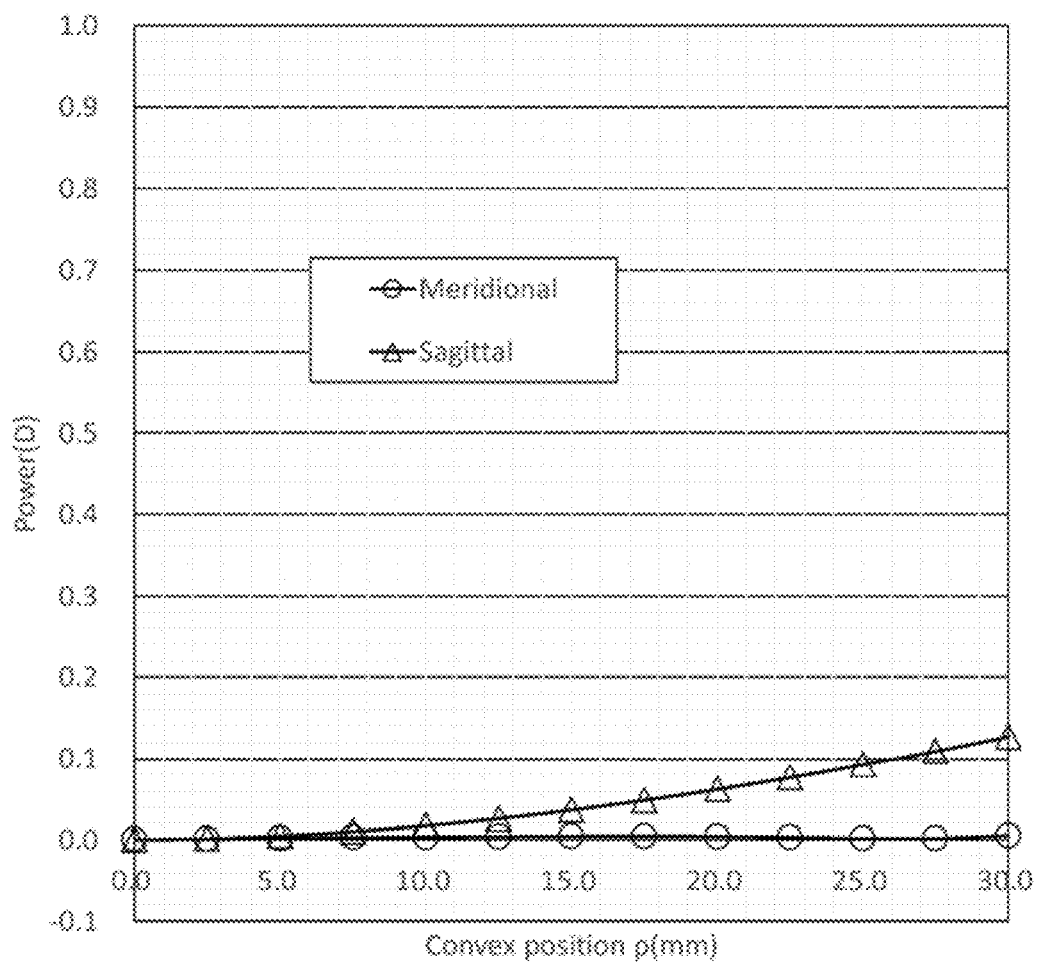

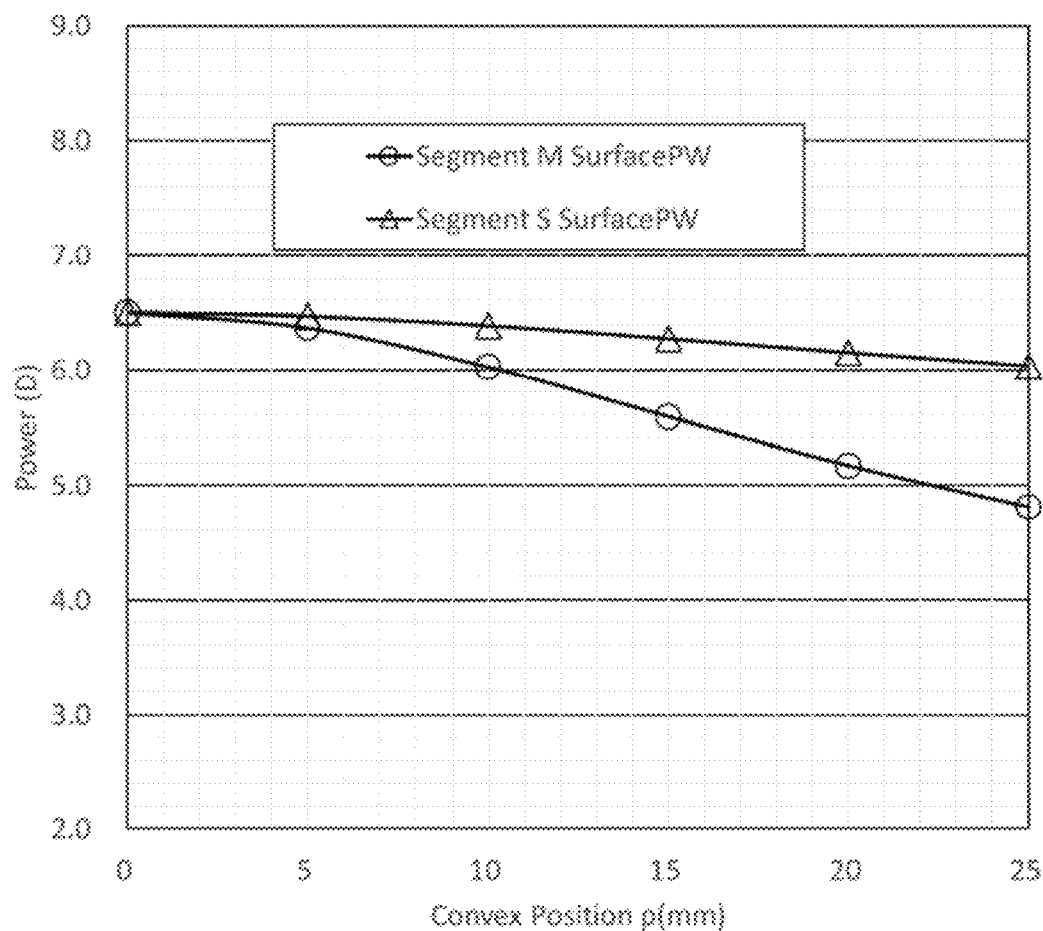

[Fig.9D]
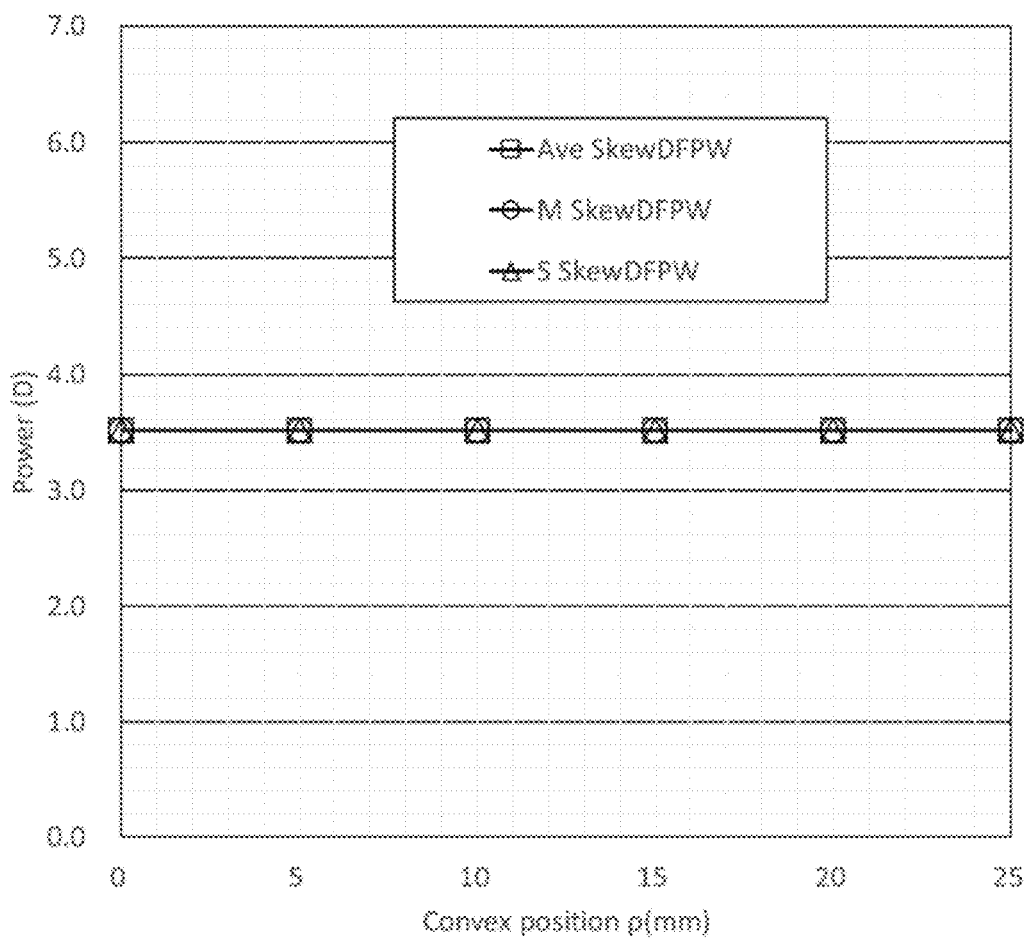

[Fig.9E]
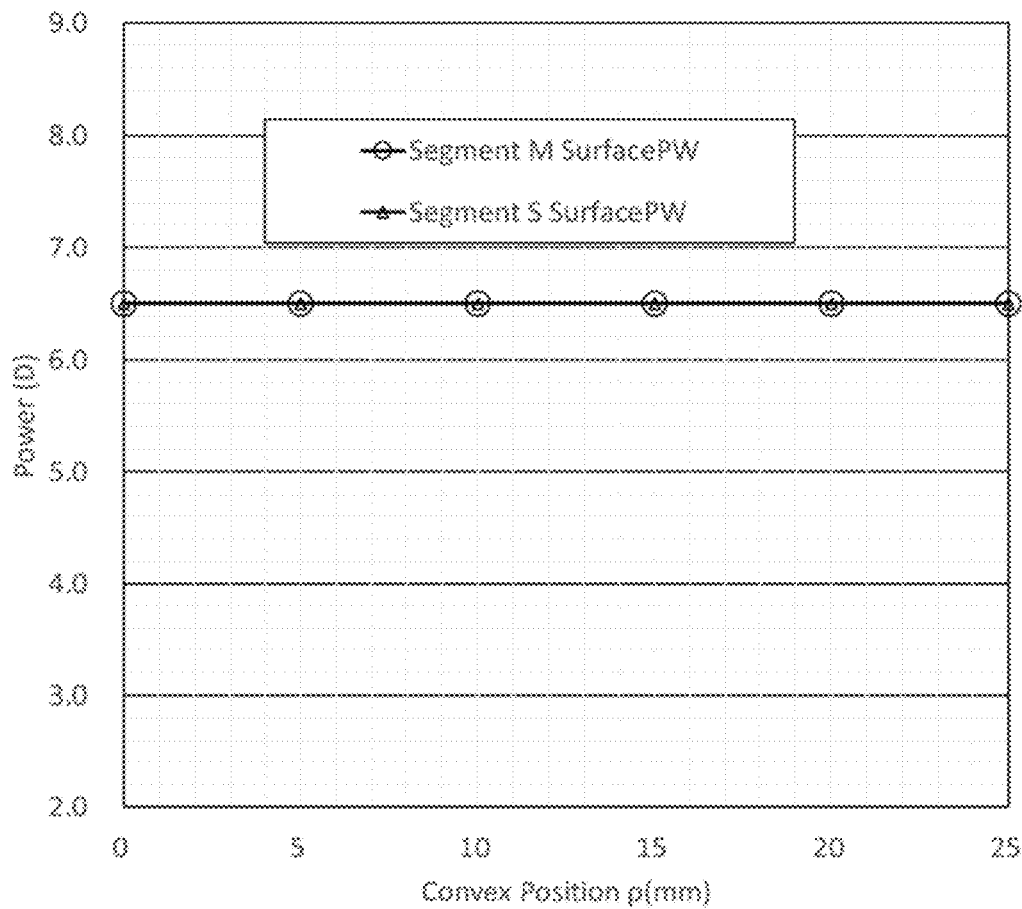

[Fig. 9F]
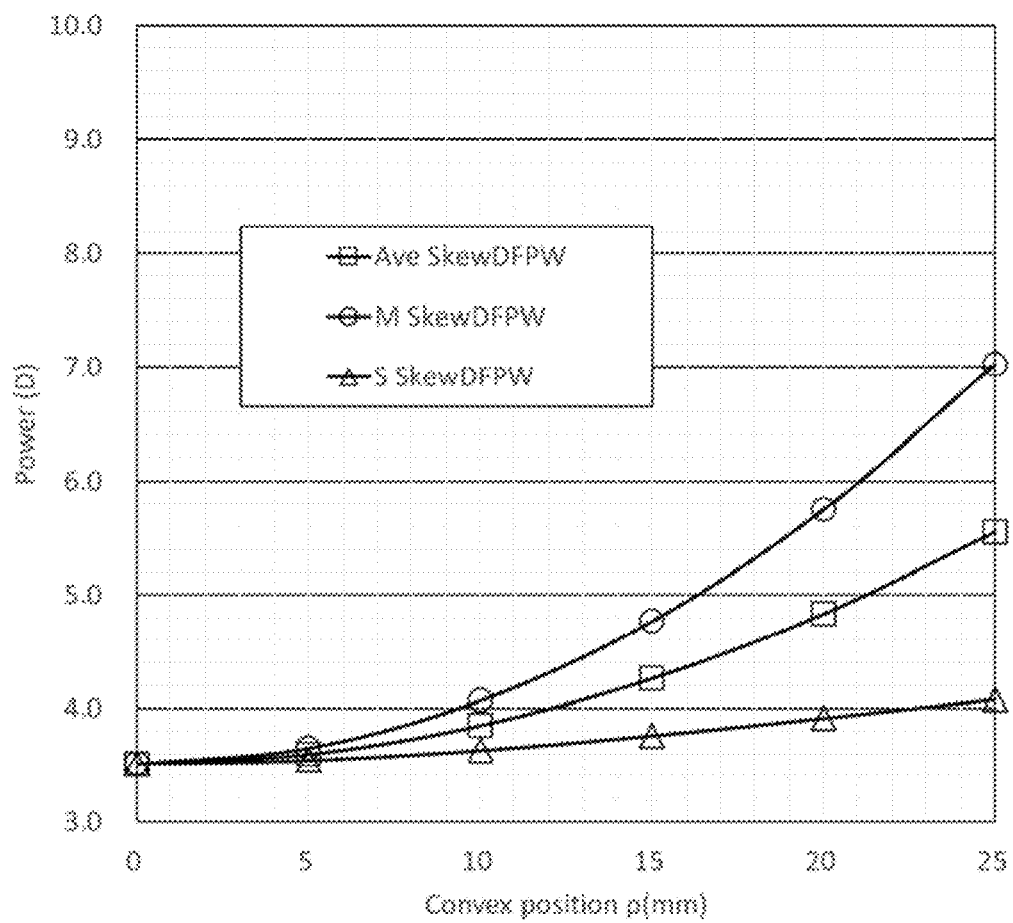

[Fig. 10A]
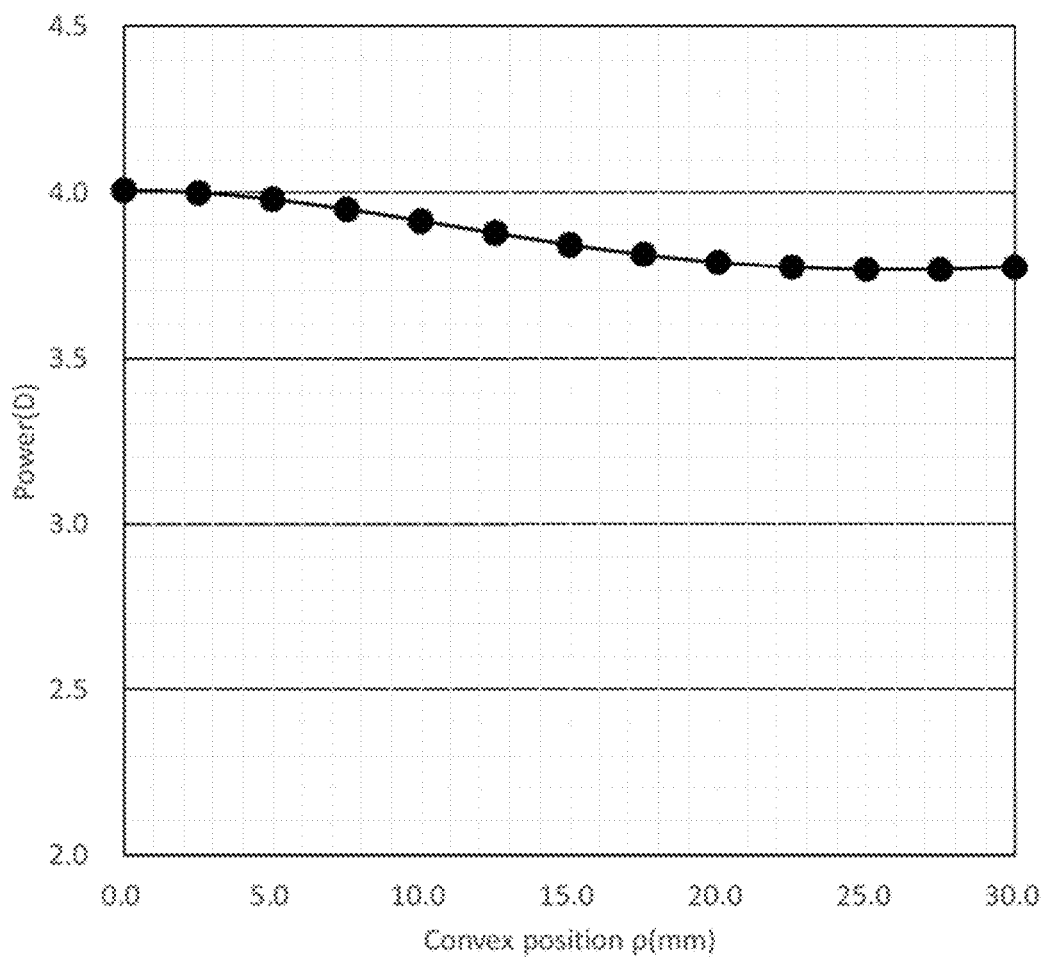

[Fig.10B]
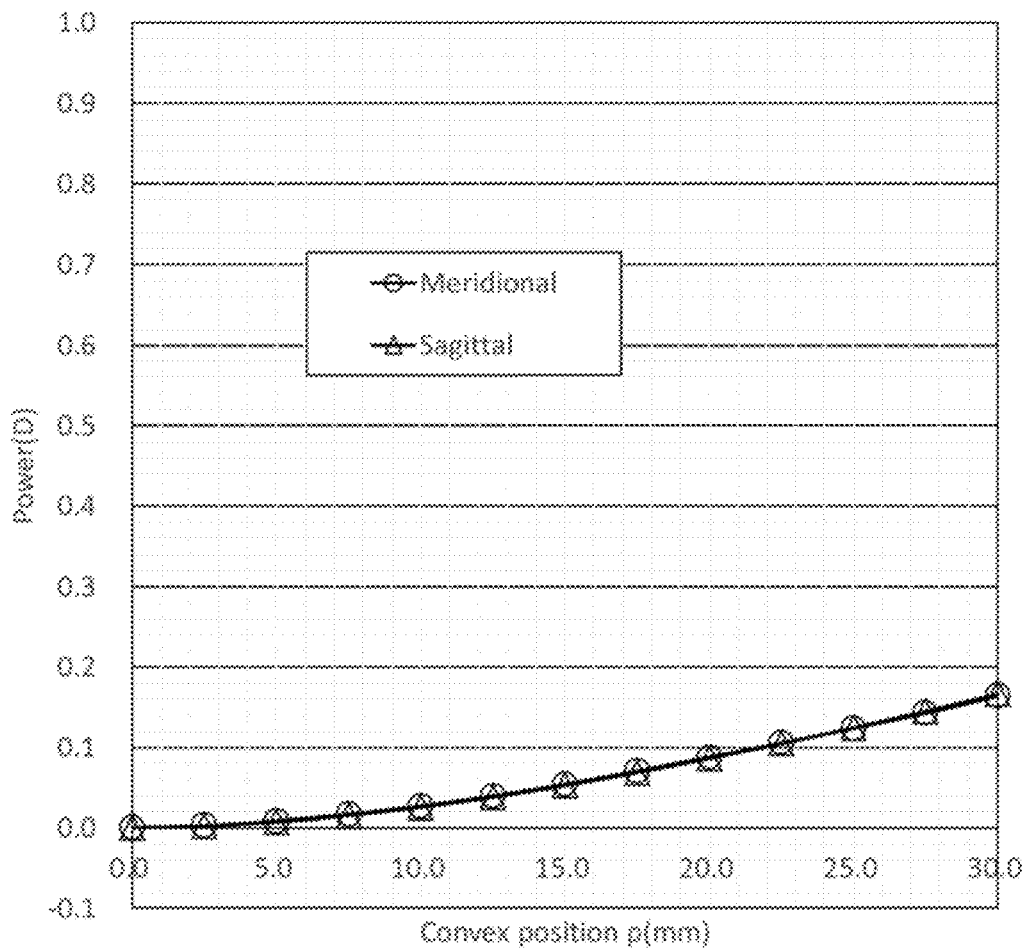

[Fig.10C]
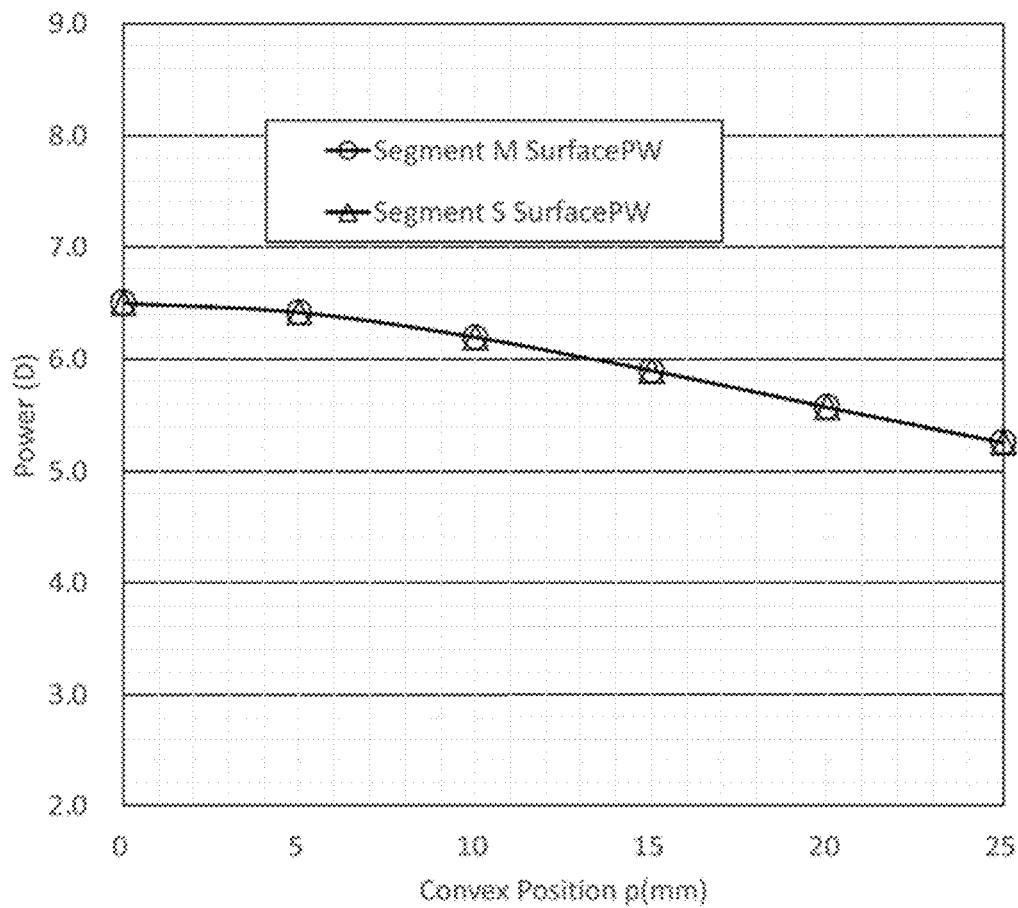

[Fig.10D]
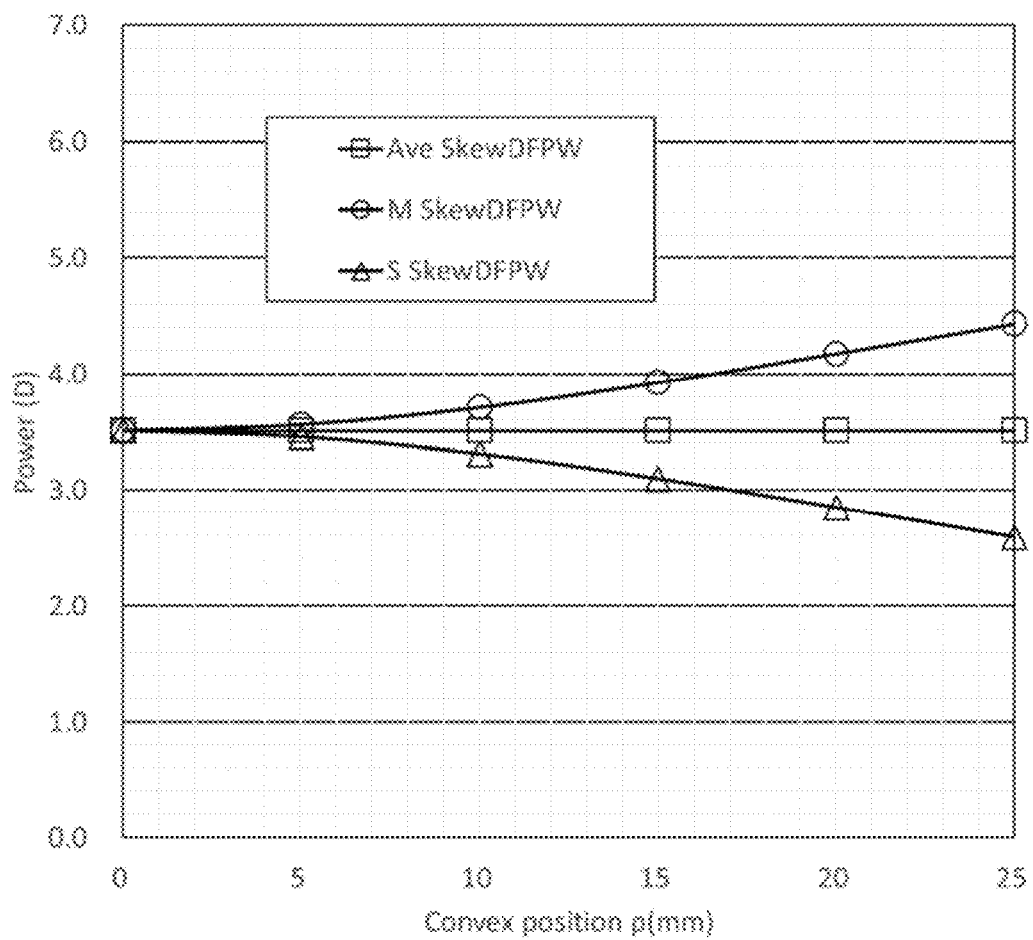

[Fig.10E]
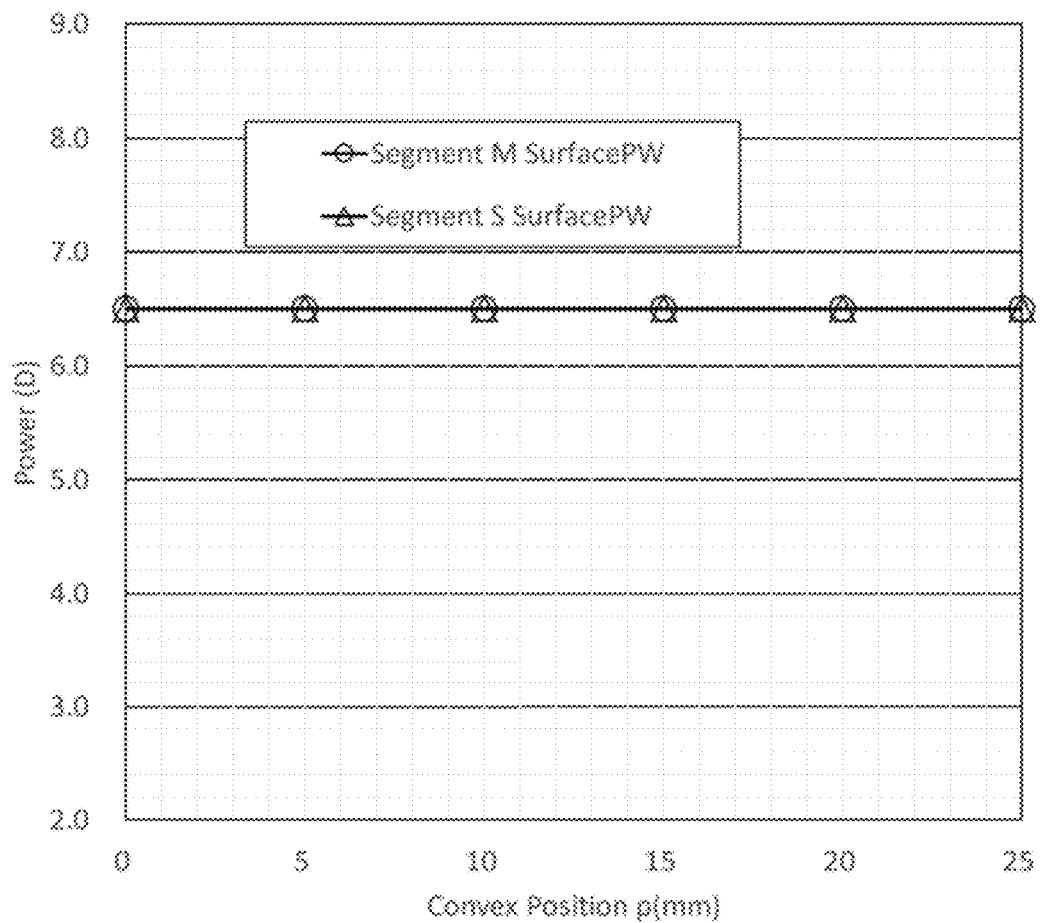

[Fig.10F]
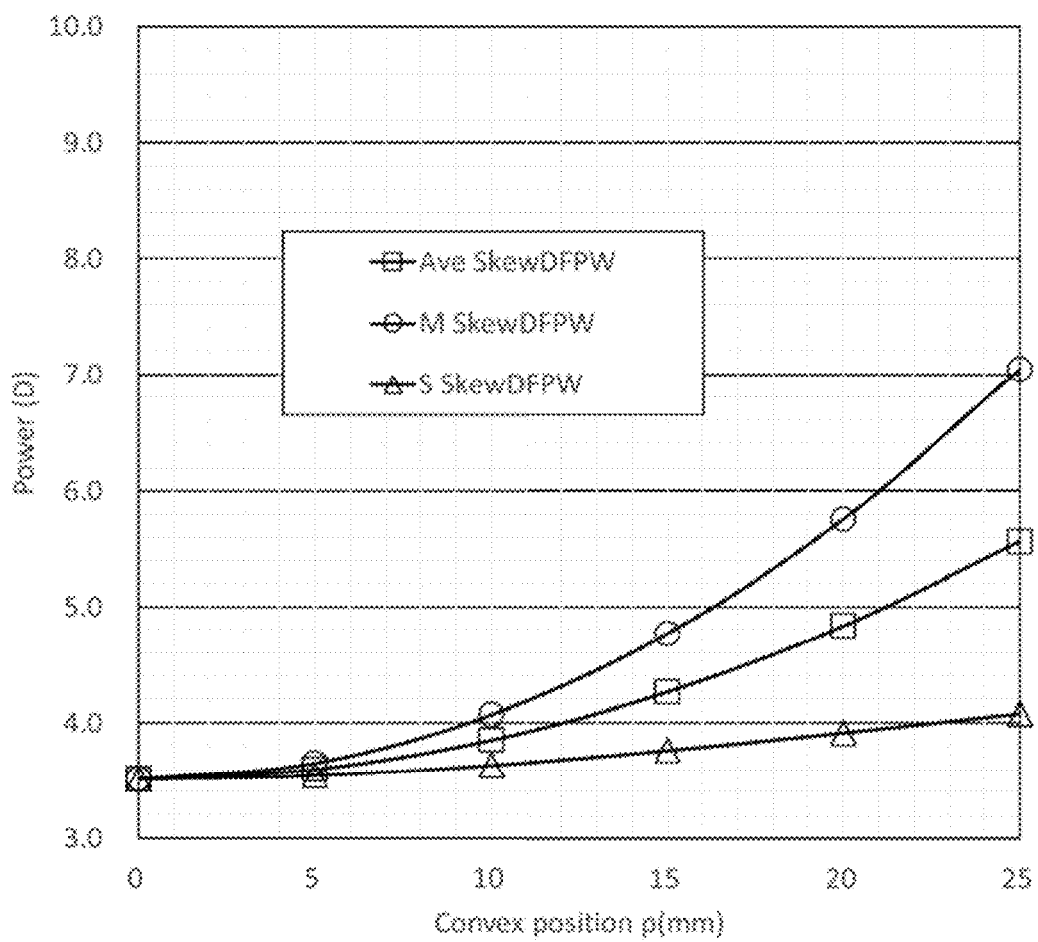

[Fig.11A]
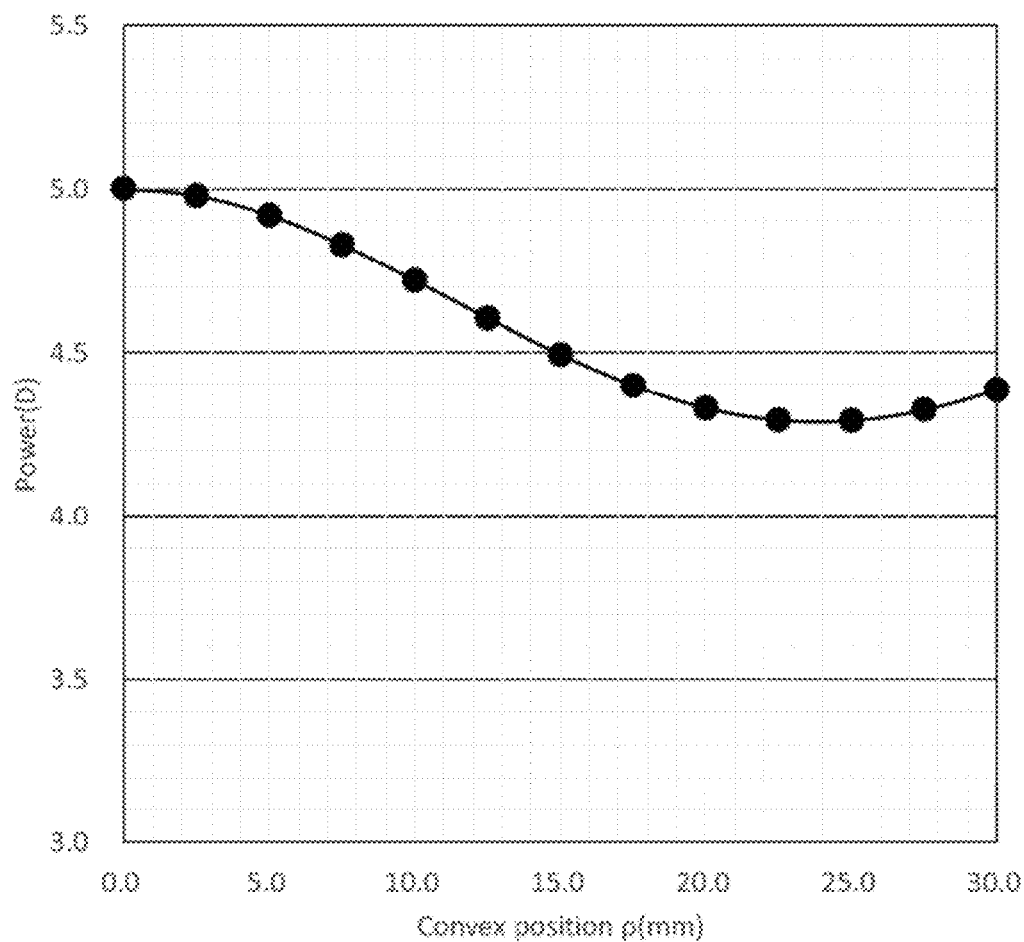

[Fig.11B]
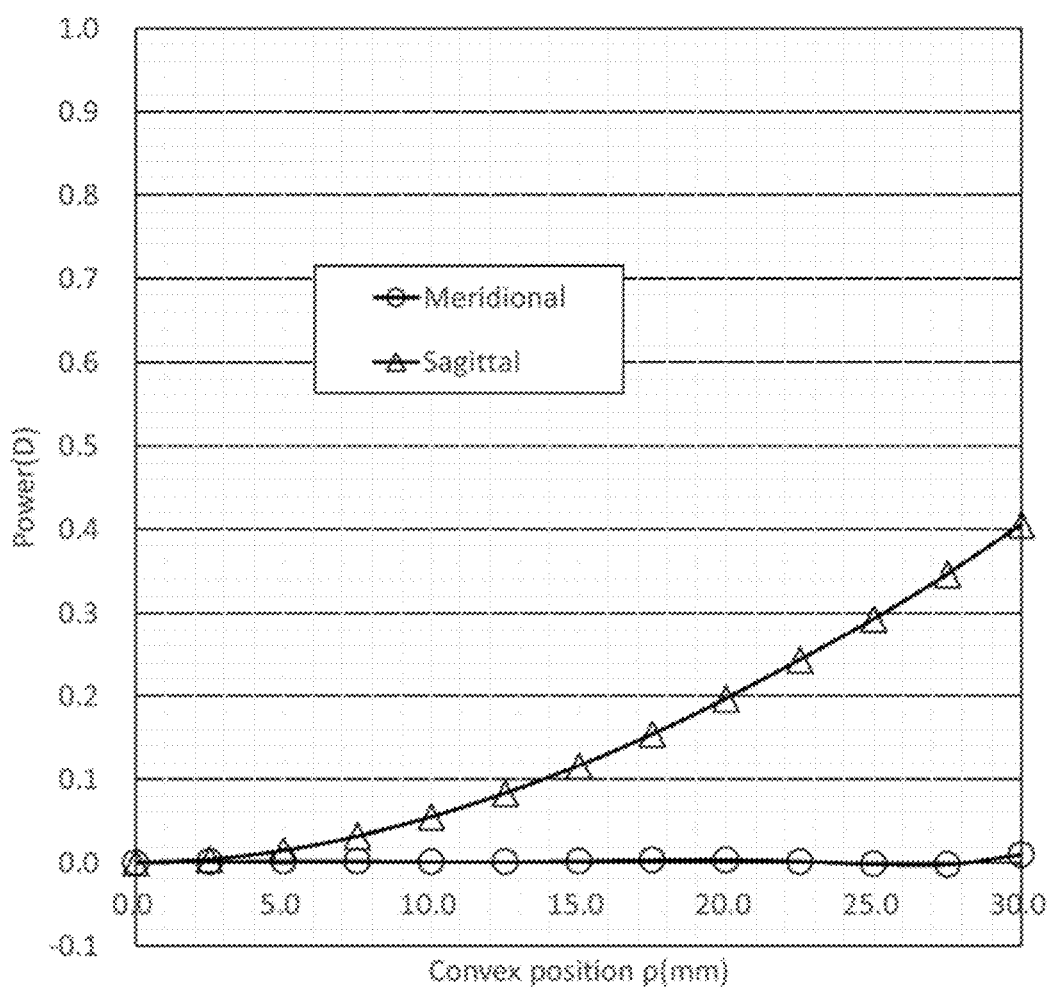

[Fig.11C]
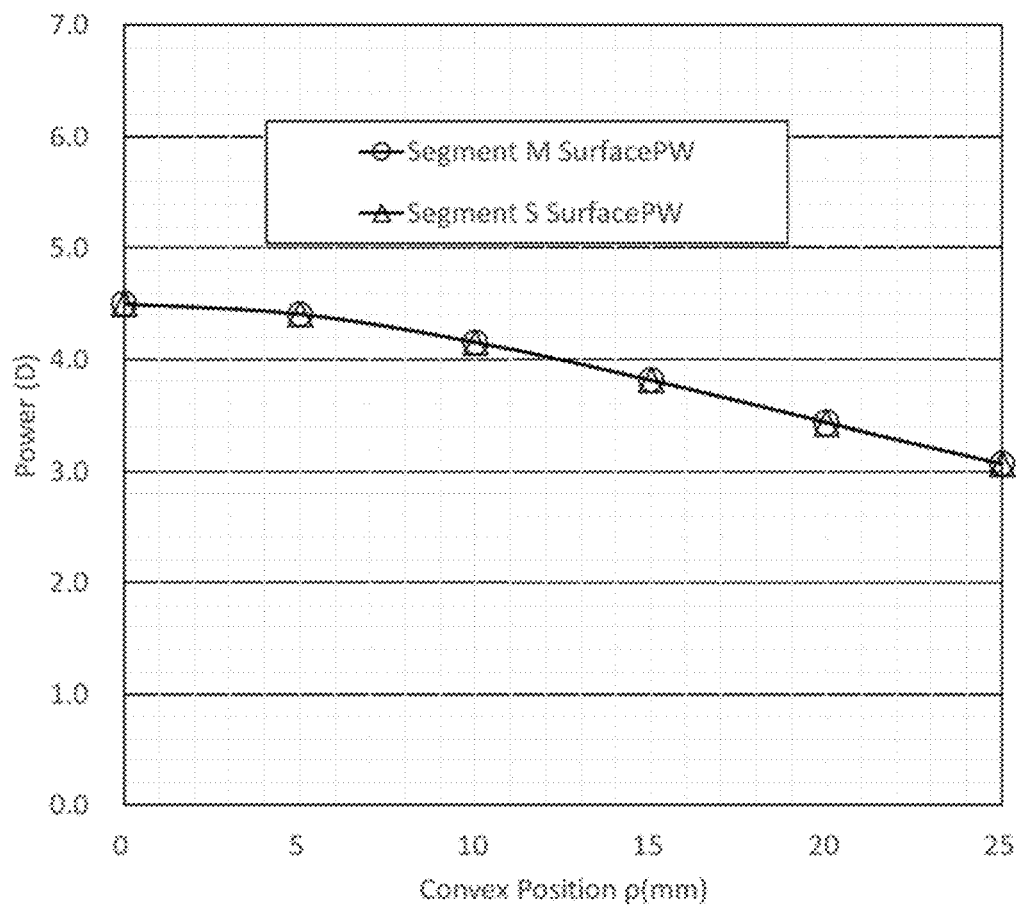

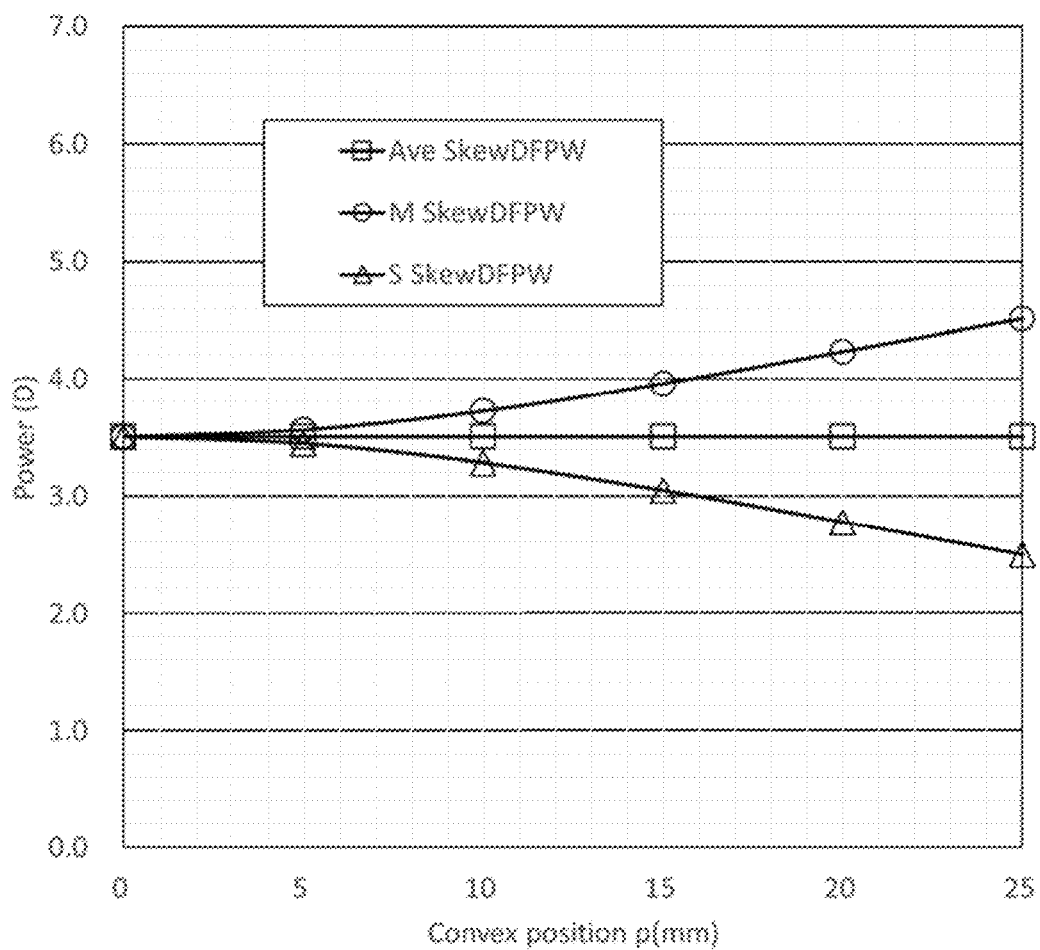

[Fig.11E]
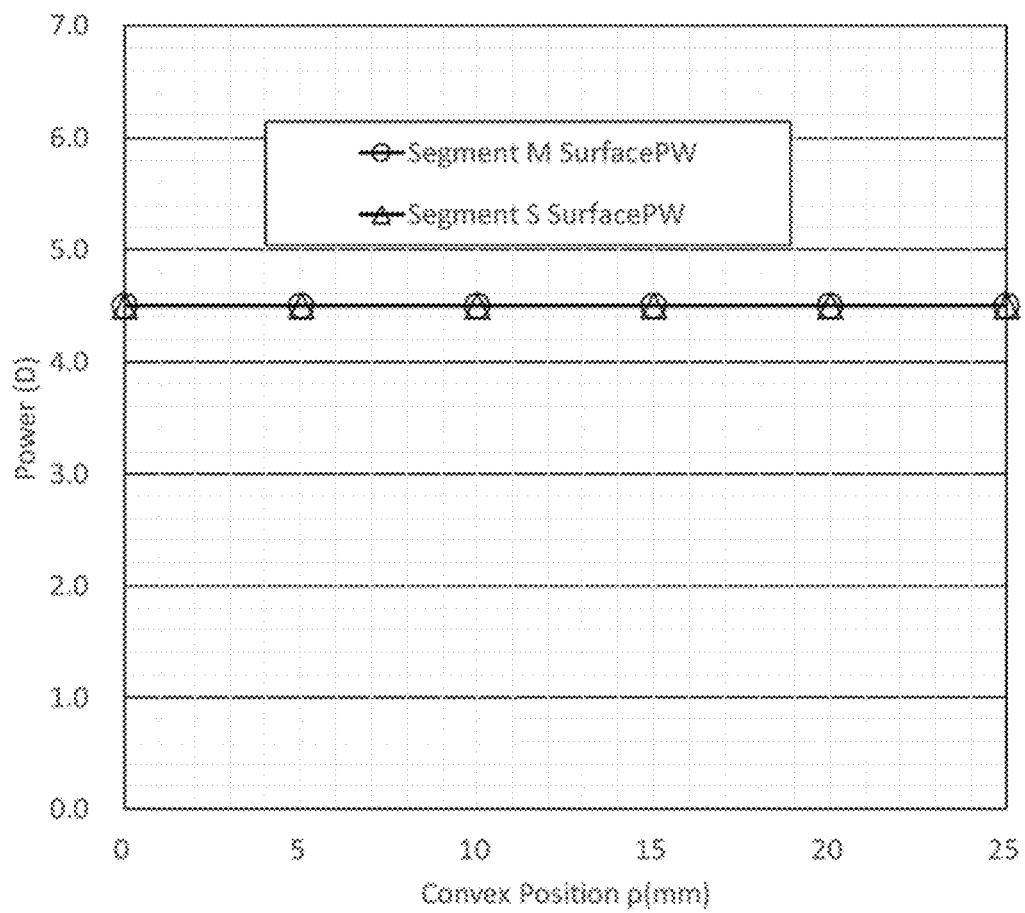

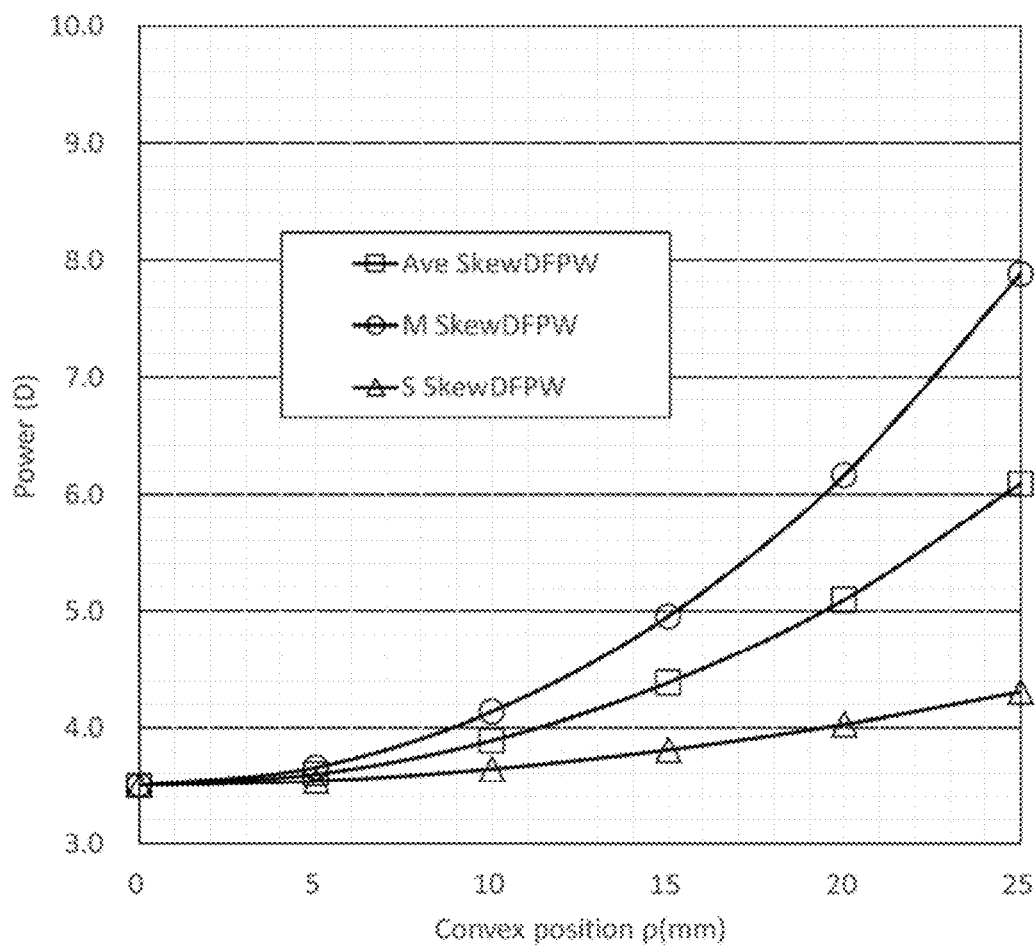

[Fig.12A]
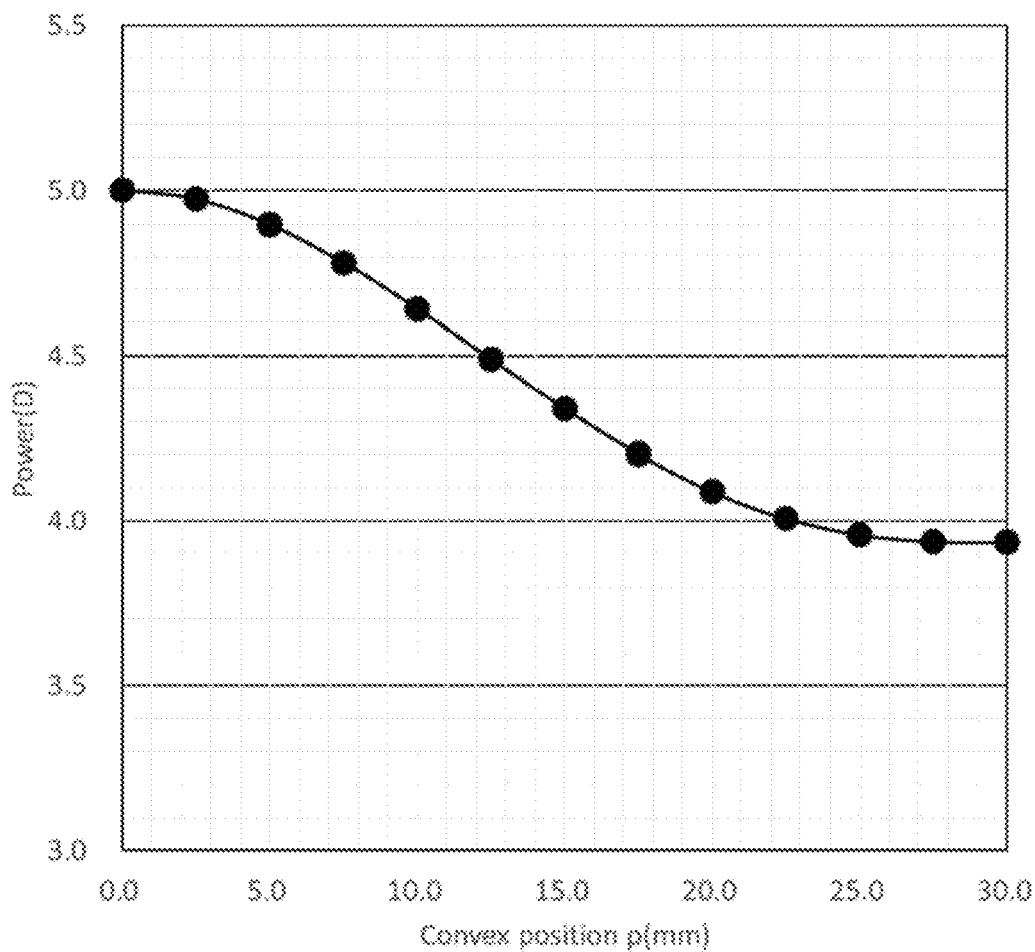

[Fig.12B]
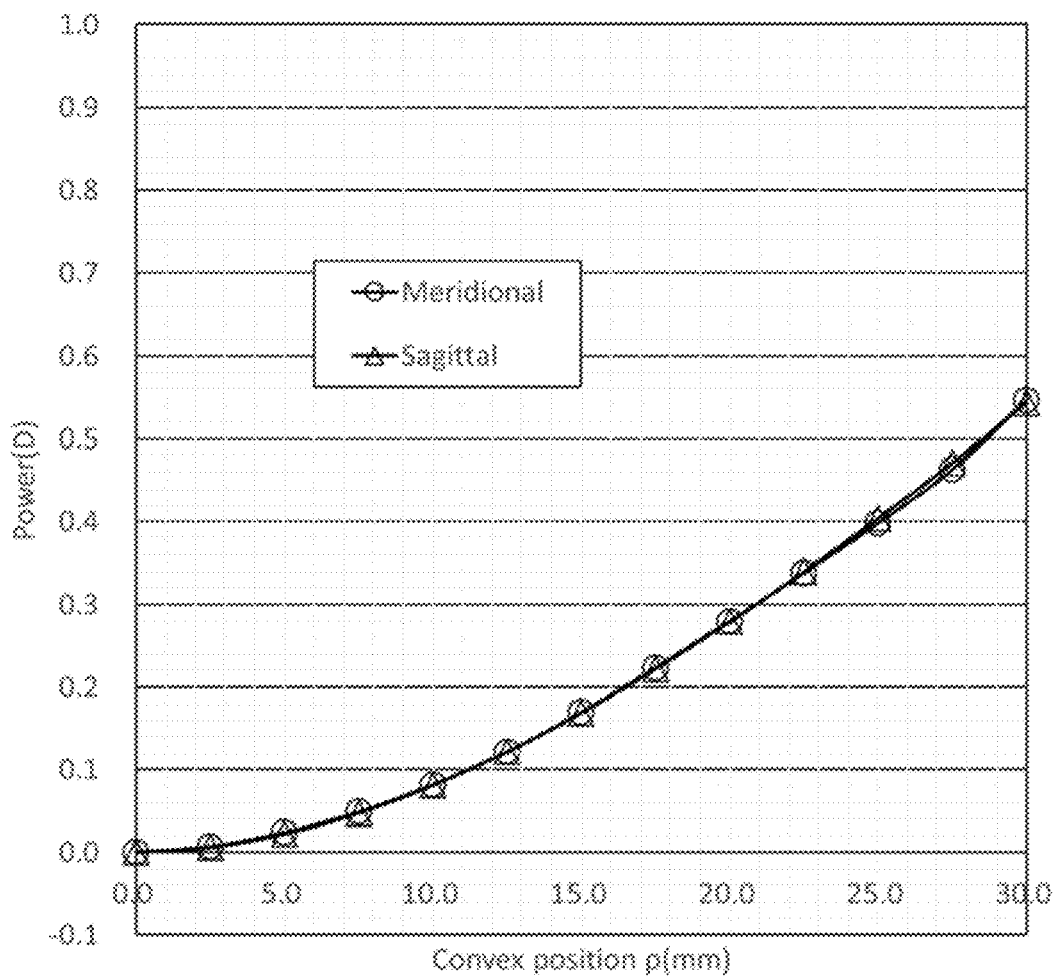

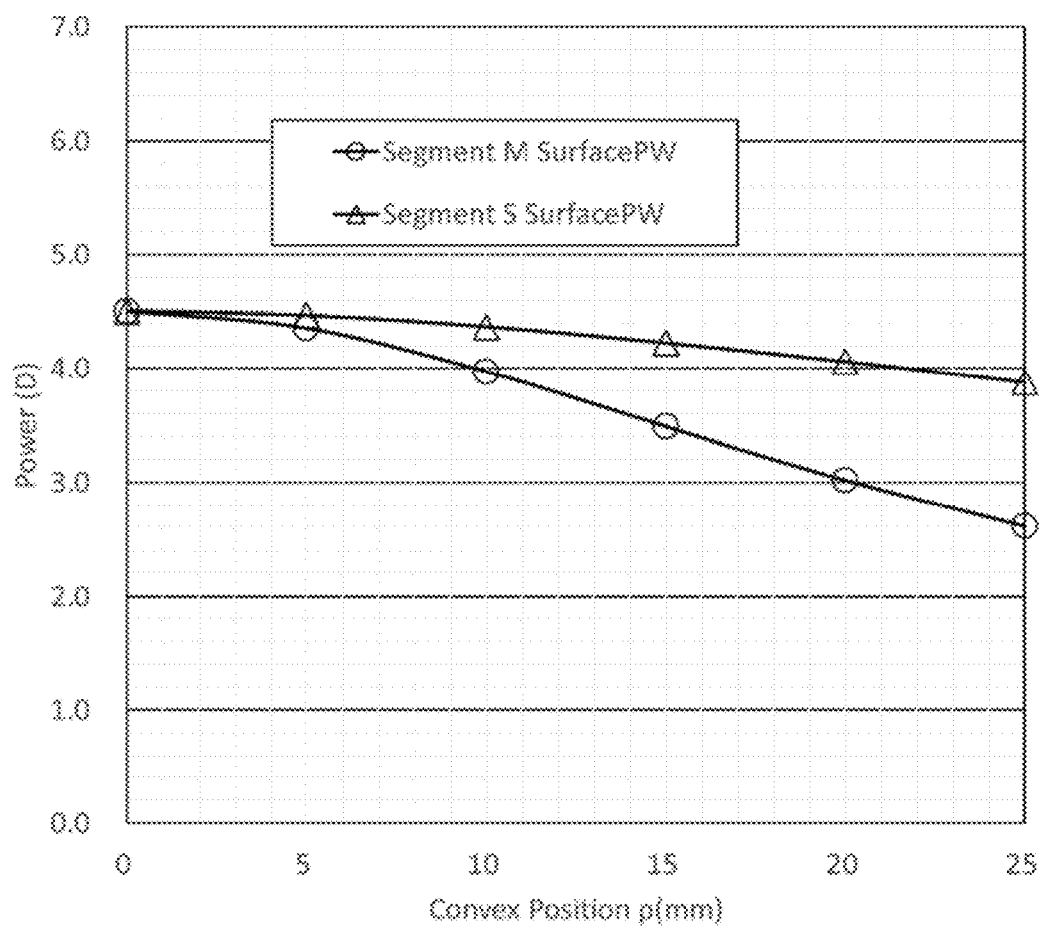

[Fig.12D]
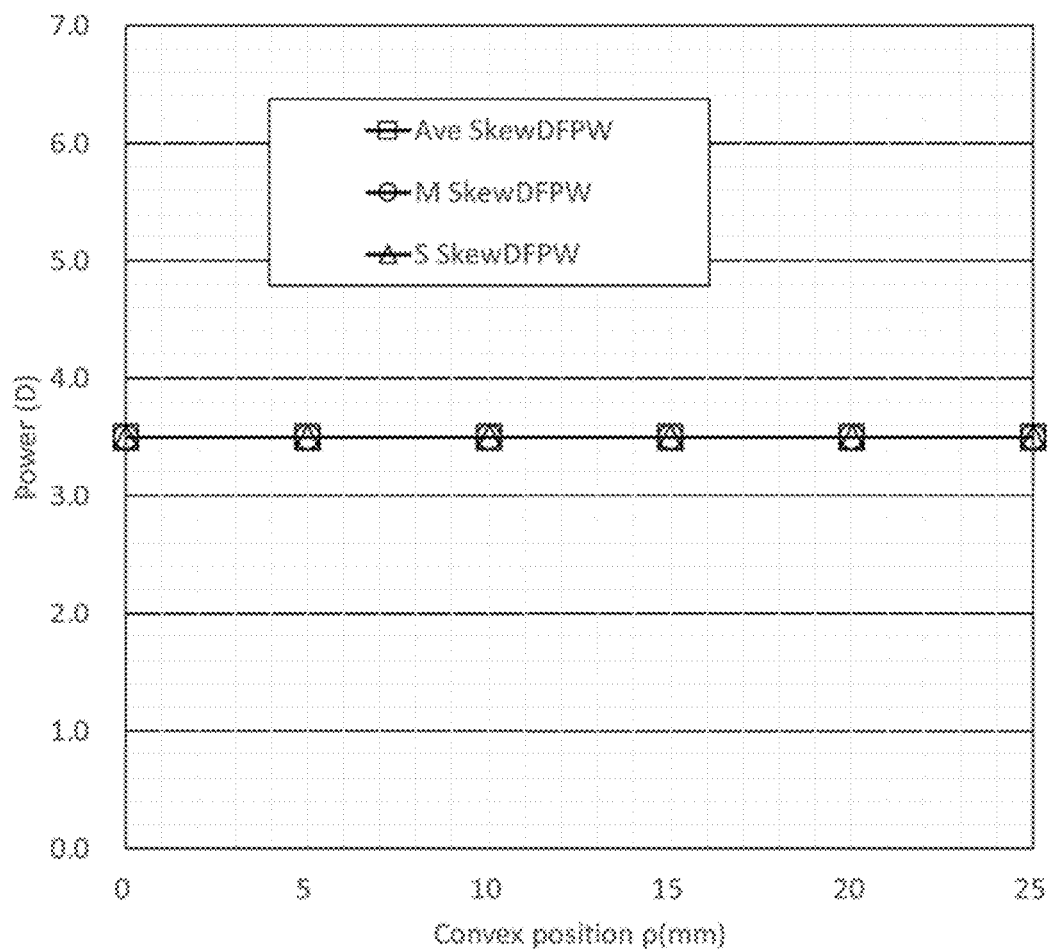

[Fig.12E]
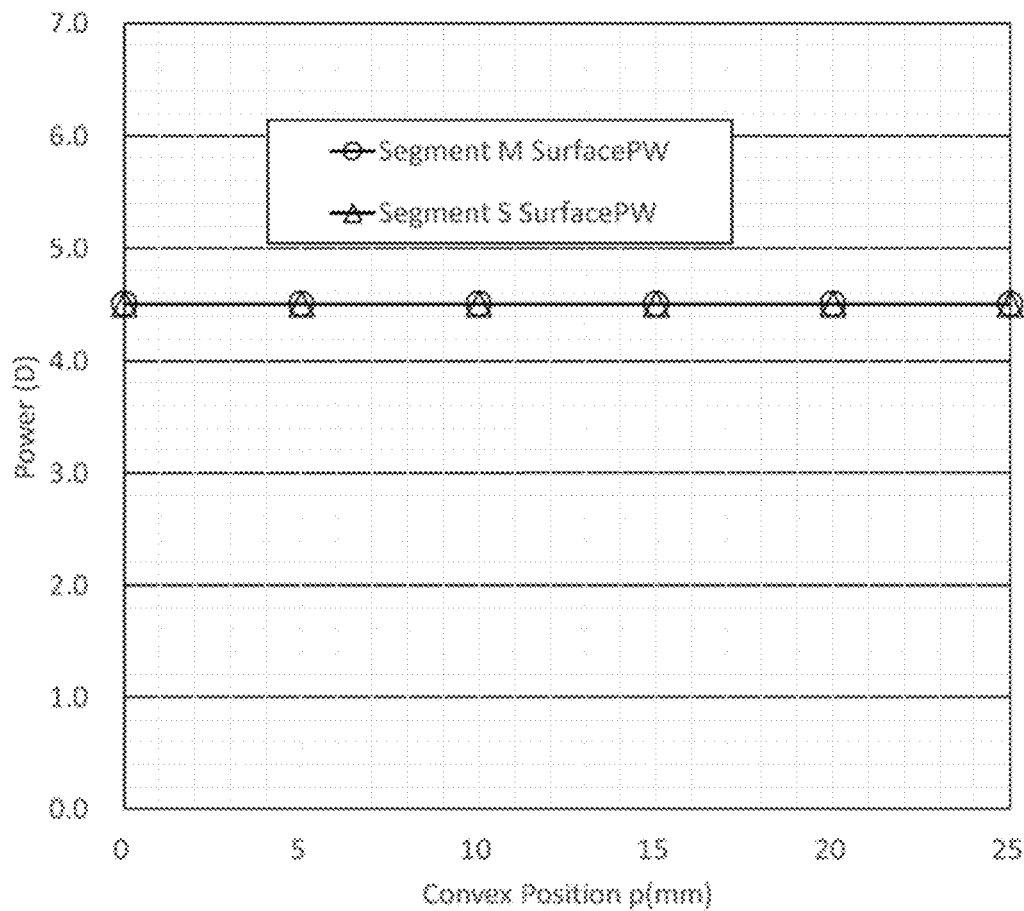

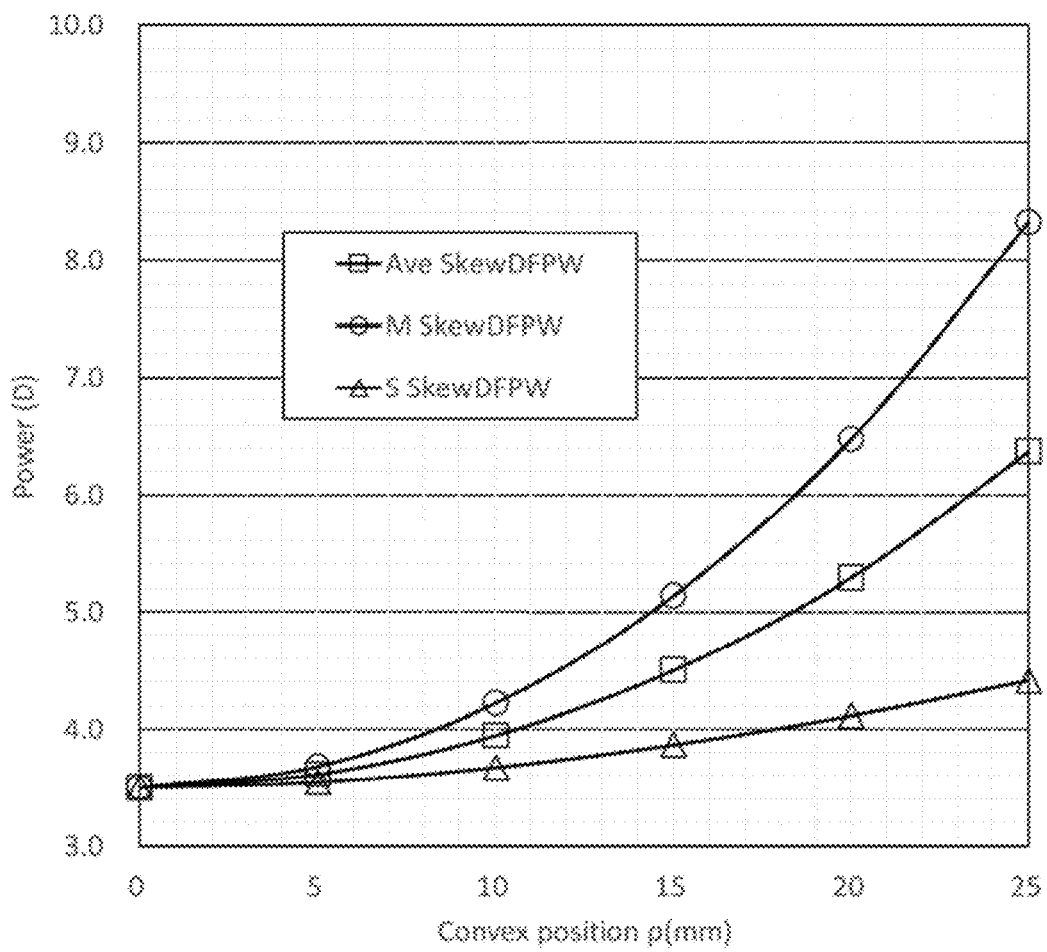
[Fig.12F]

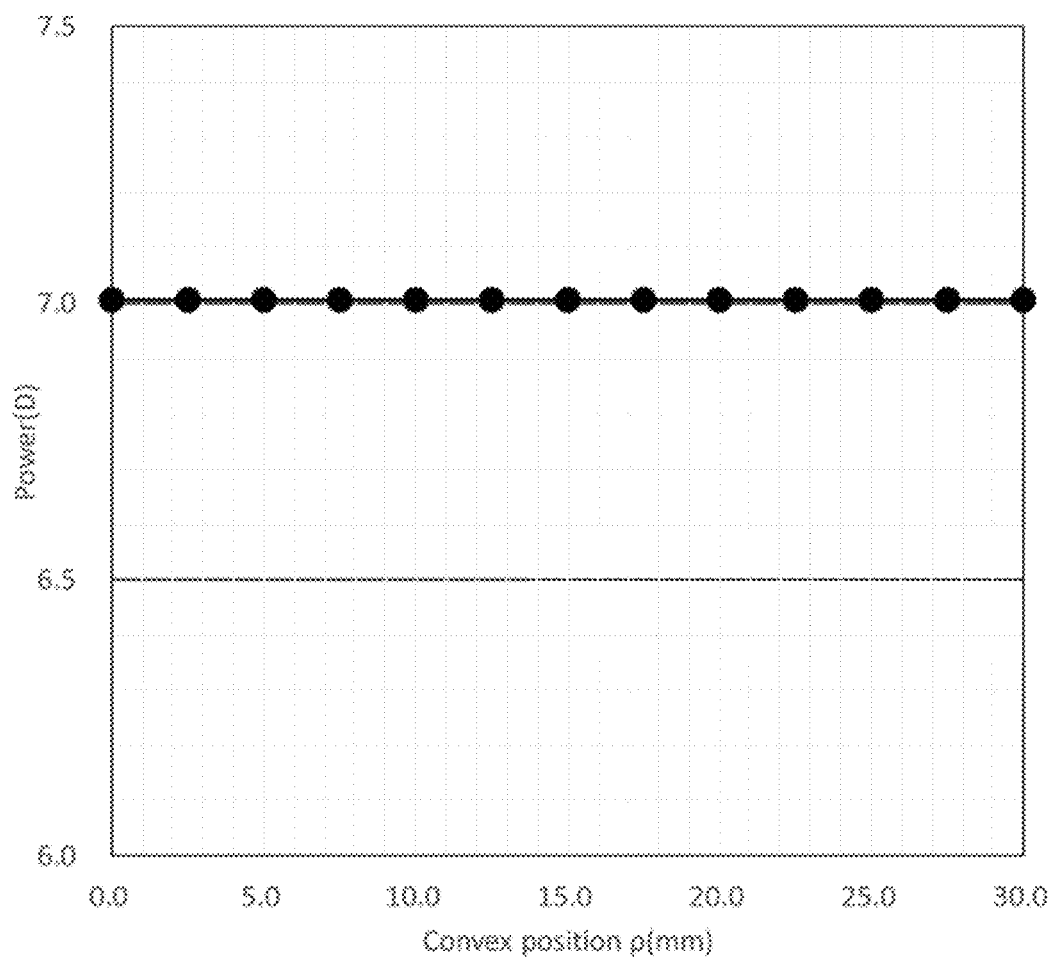

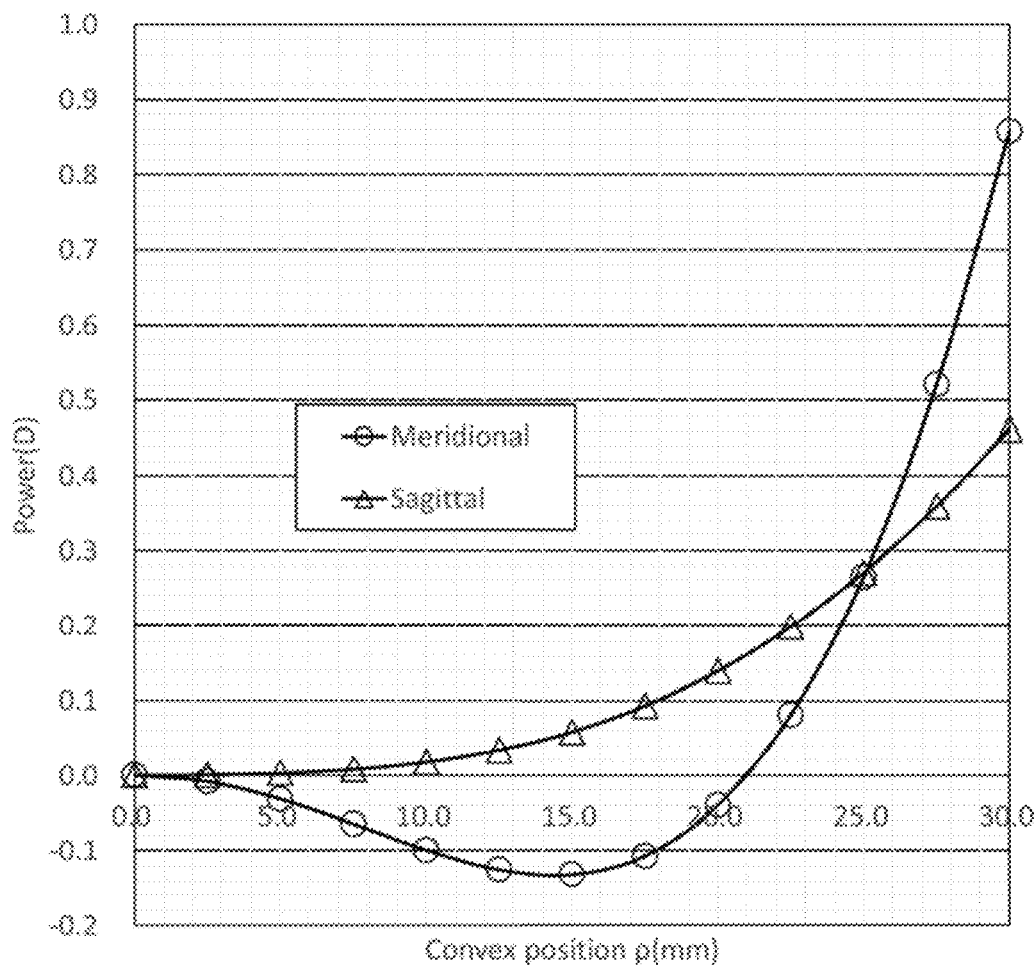
[Fig.13B]

[Fig.13C]
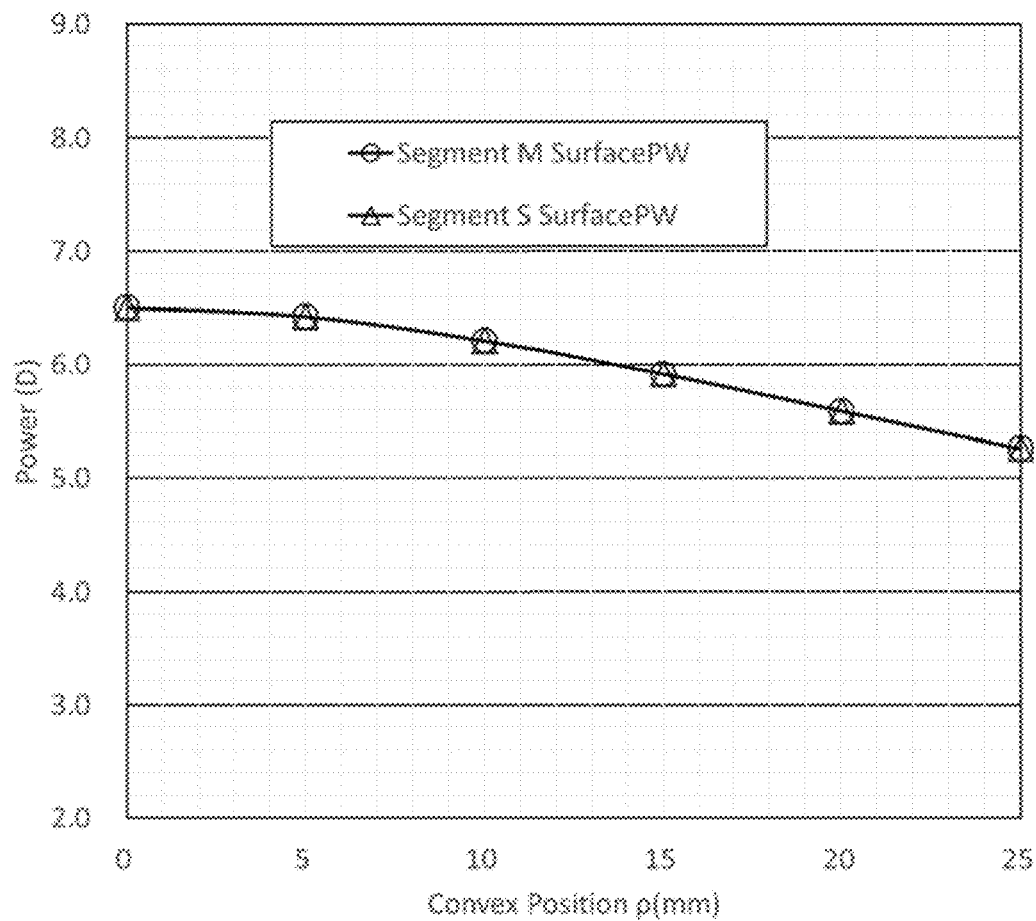

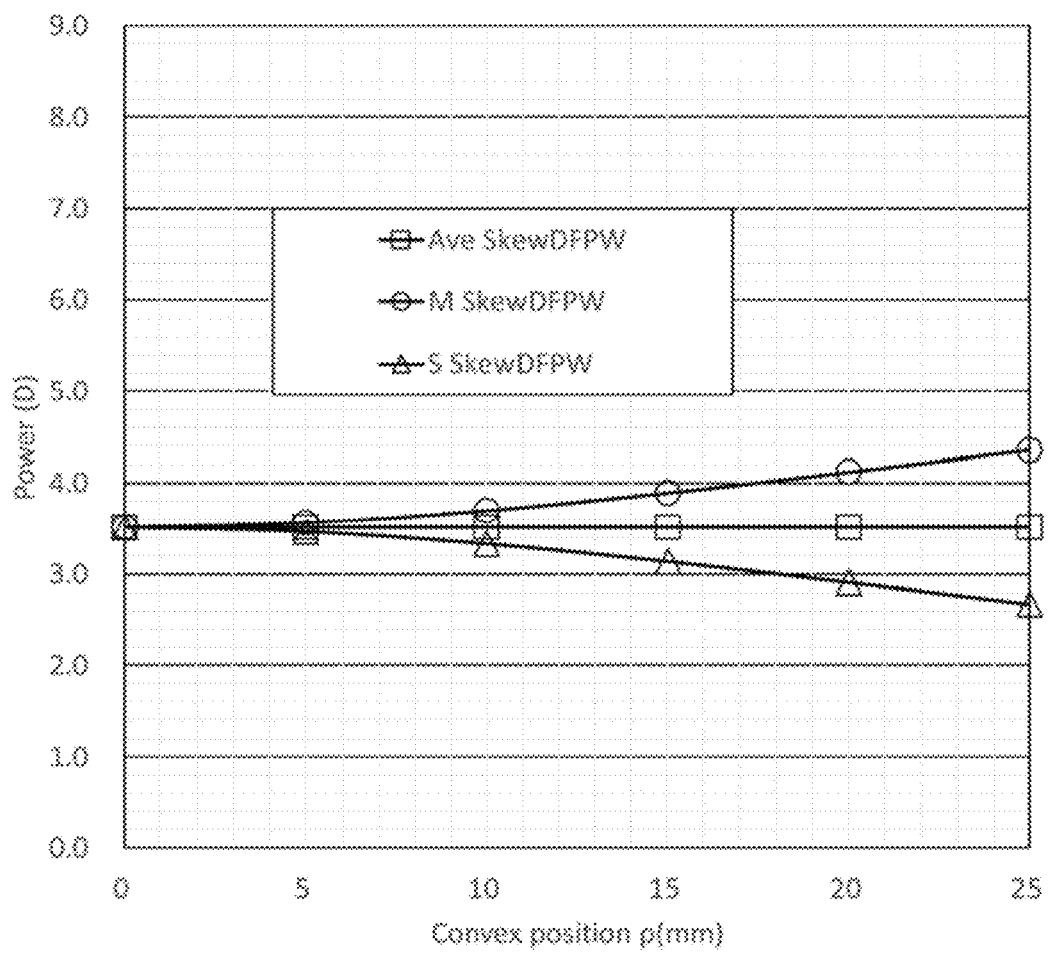

[Fig.13E]
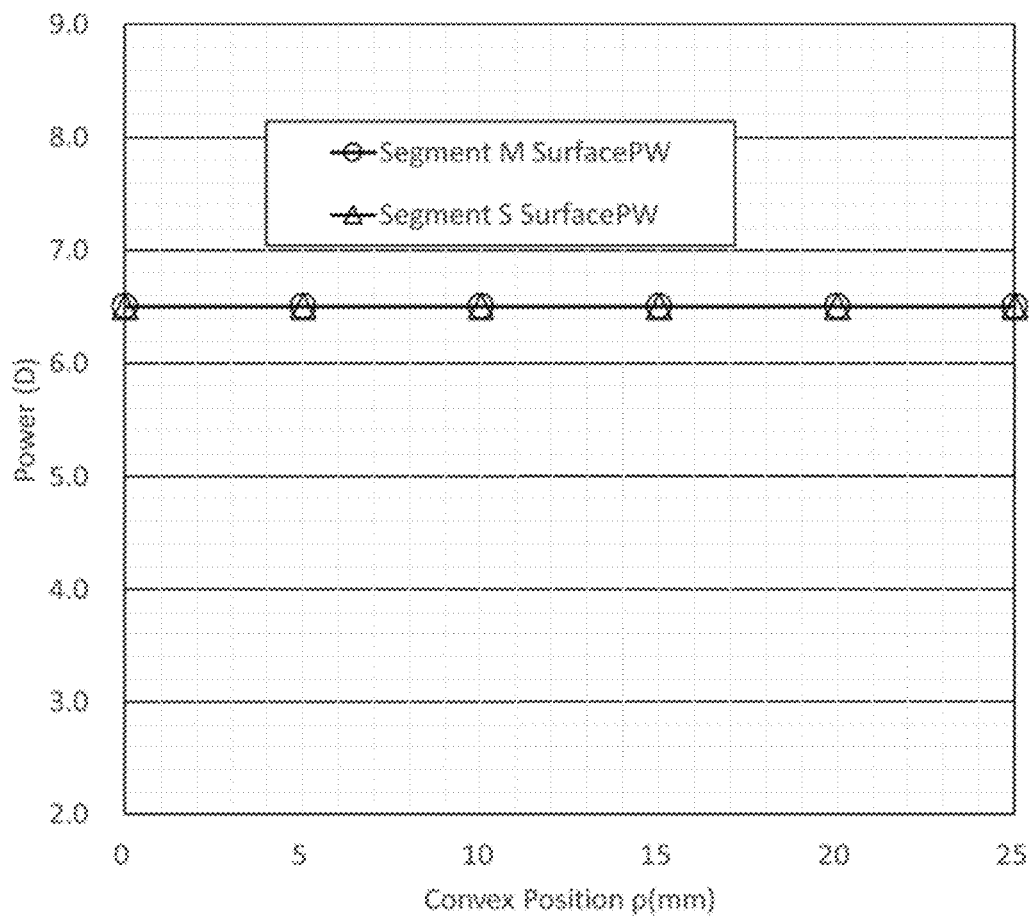

[Fig.18F]
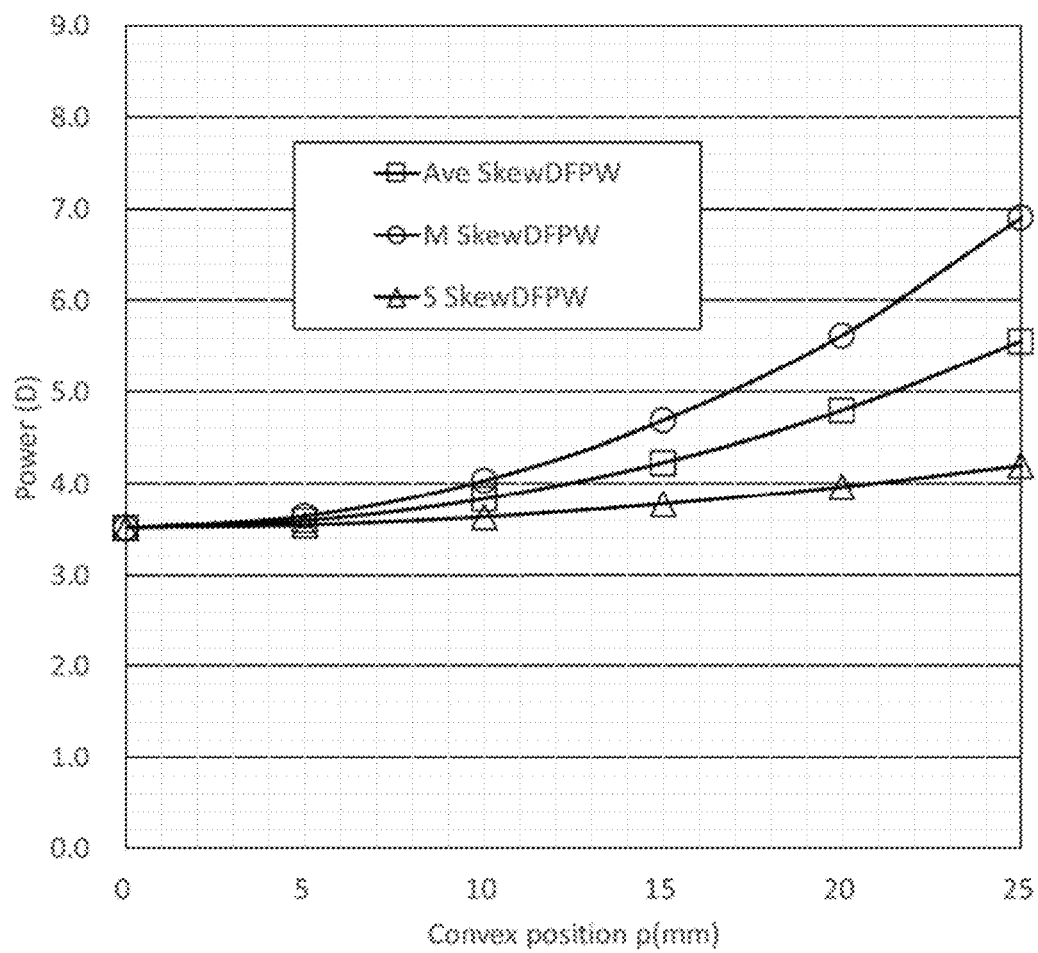

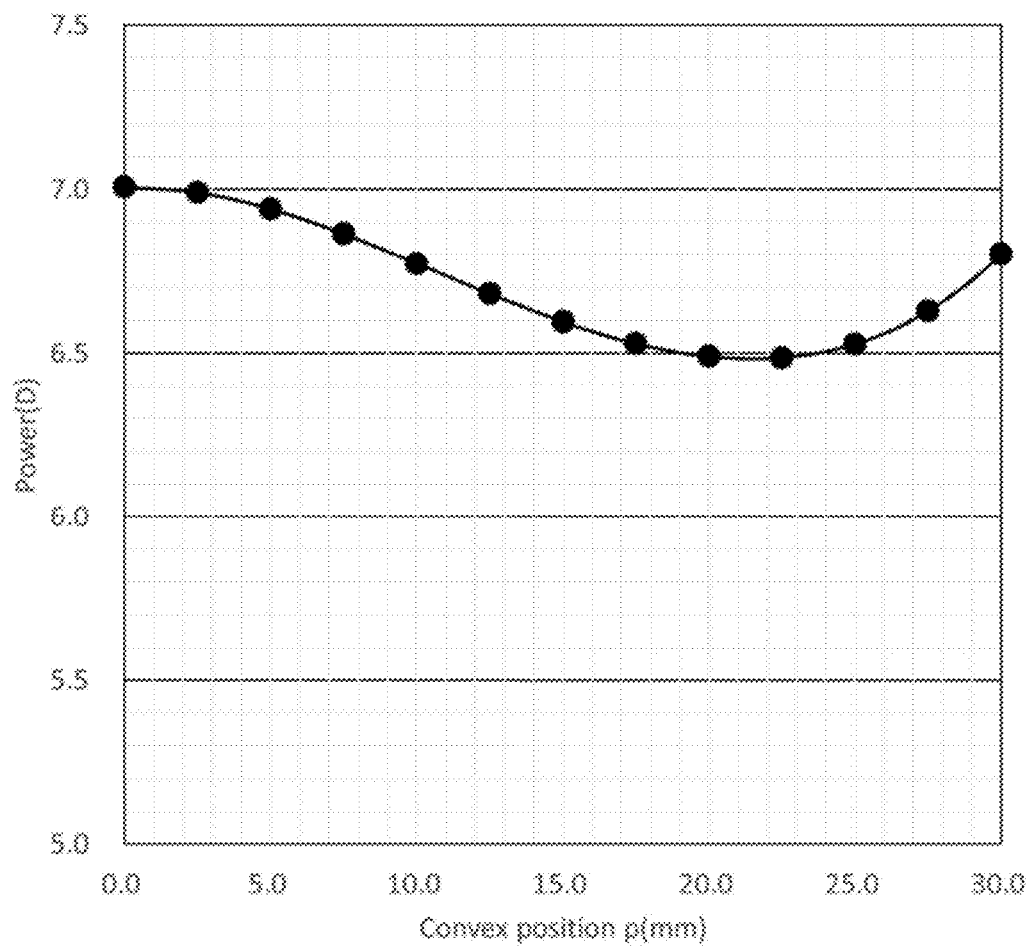

[Fig.14B]
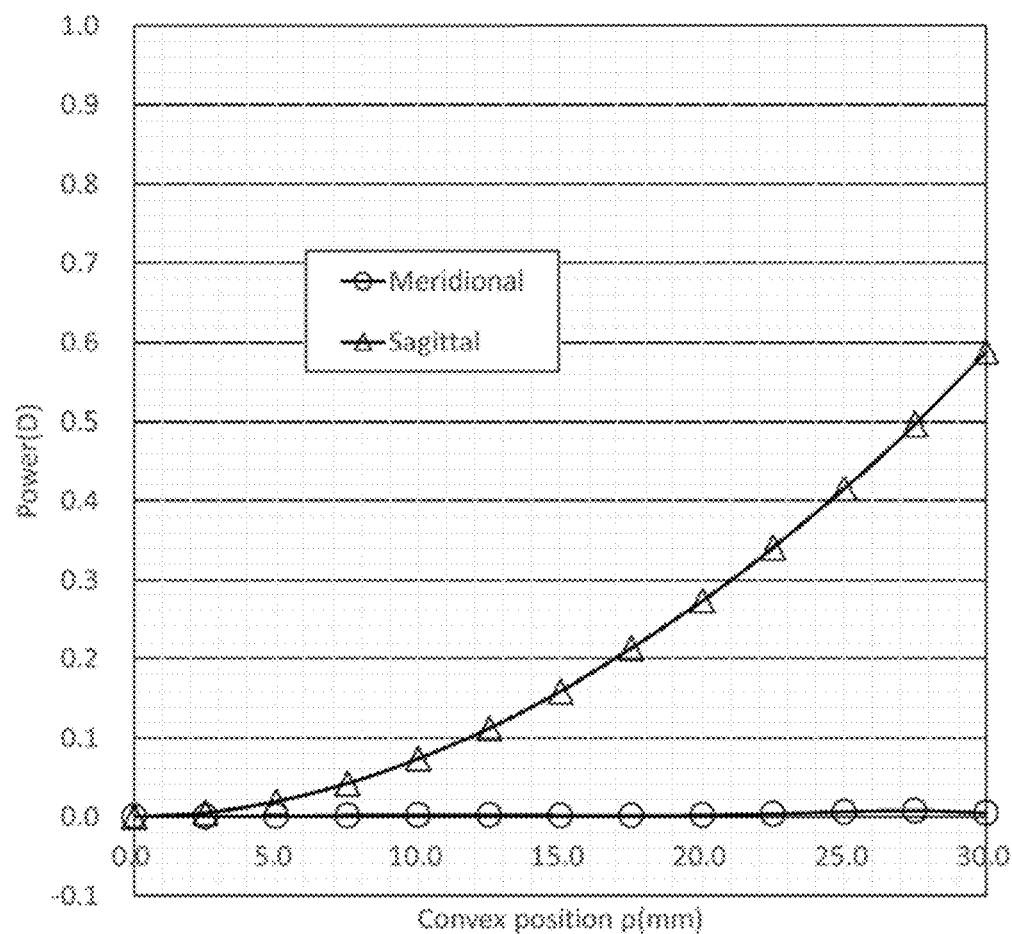

[Fig.14C]
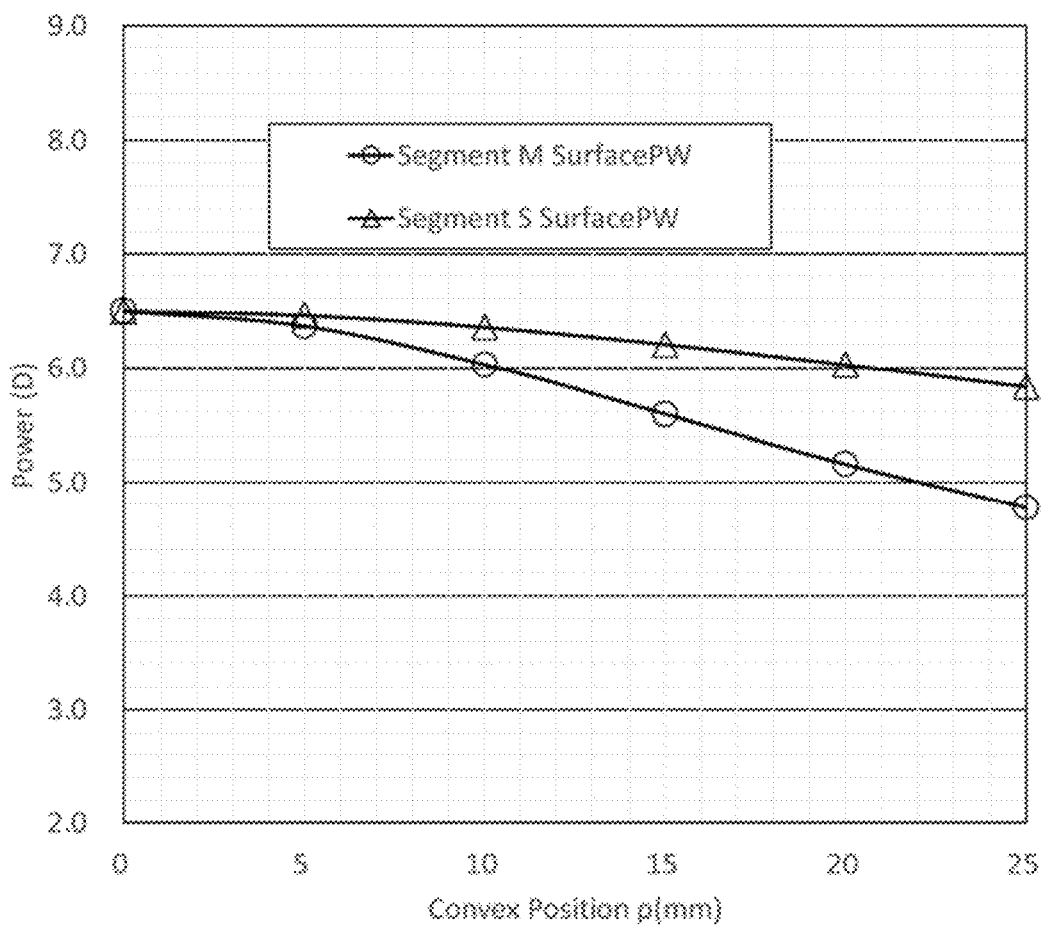

[Fig.14D]
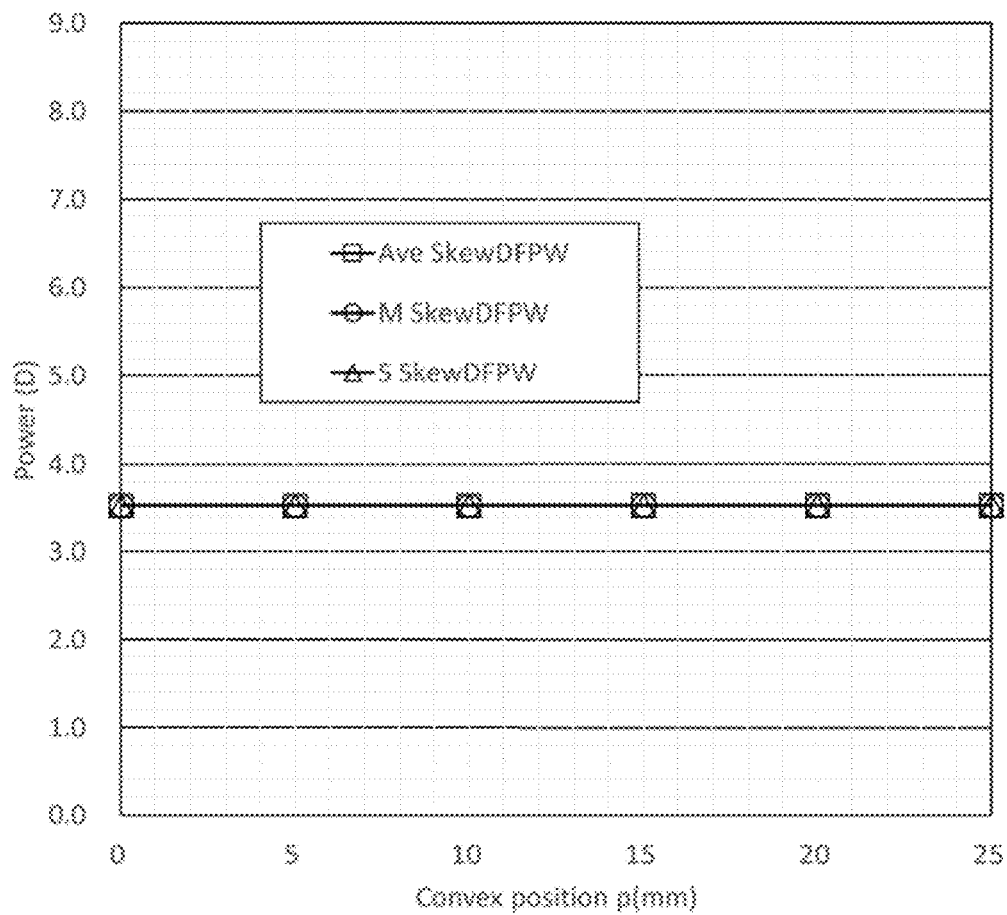

[Fig.14E]
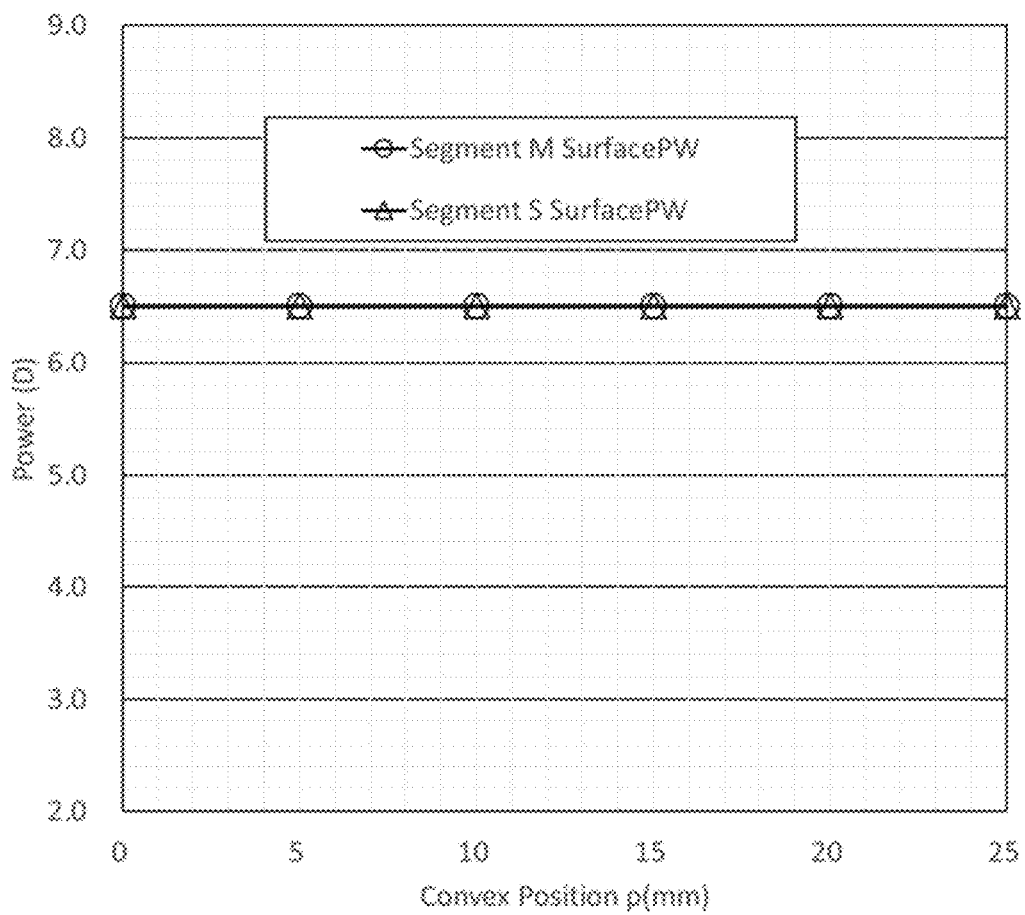

[Fig.14F]
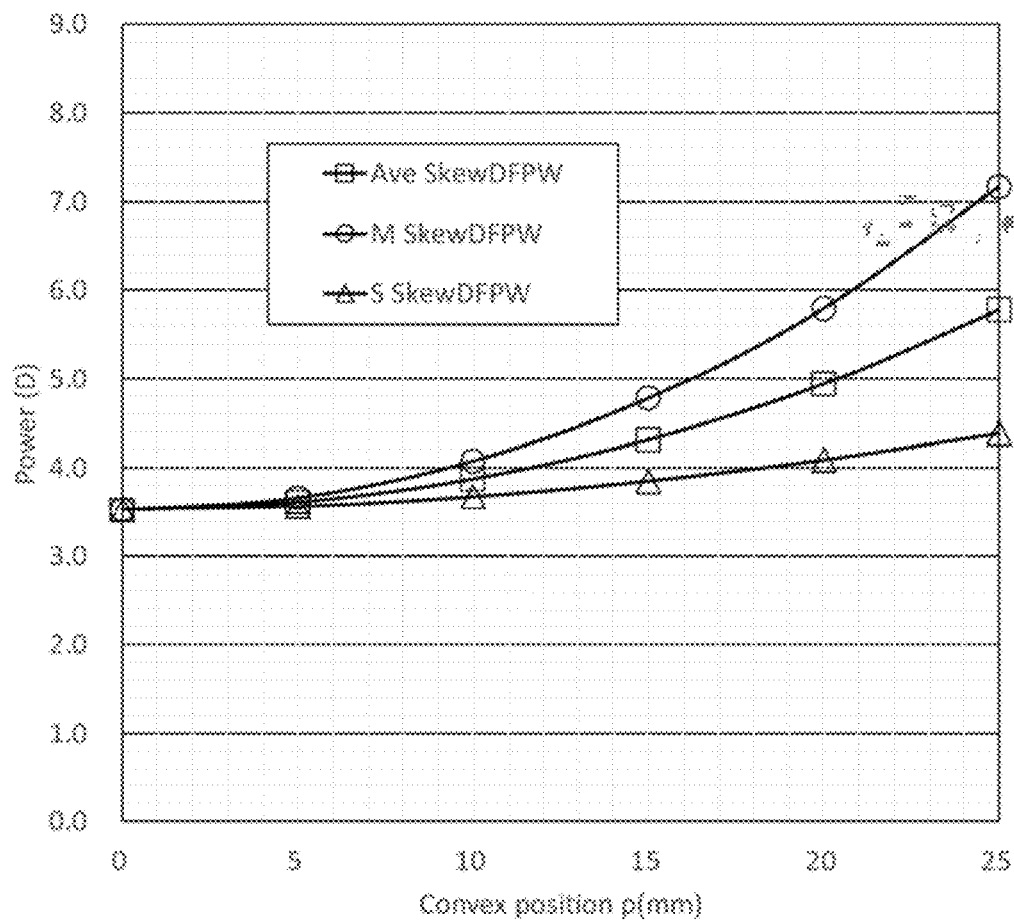

[Fig.15A]
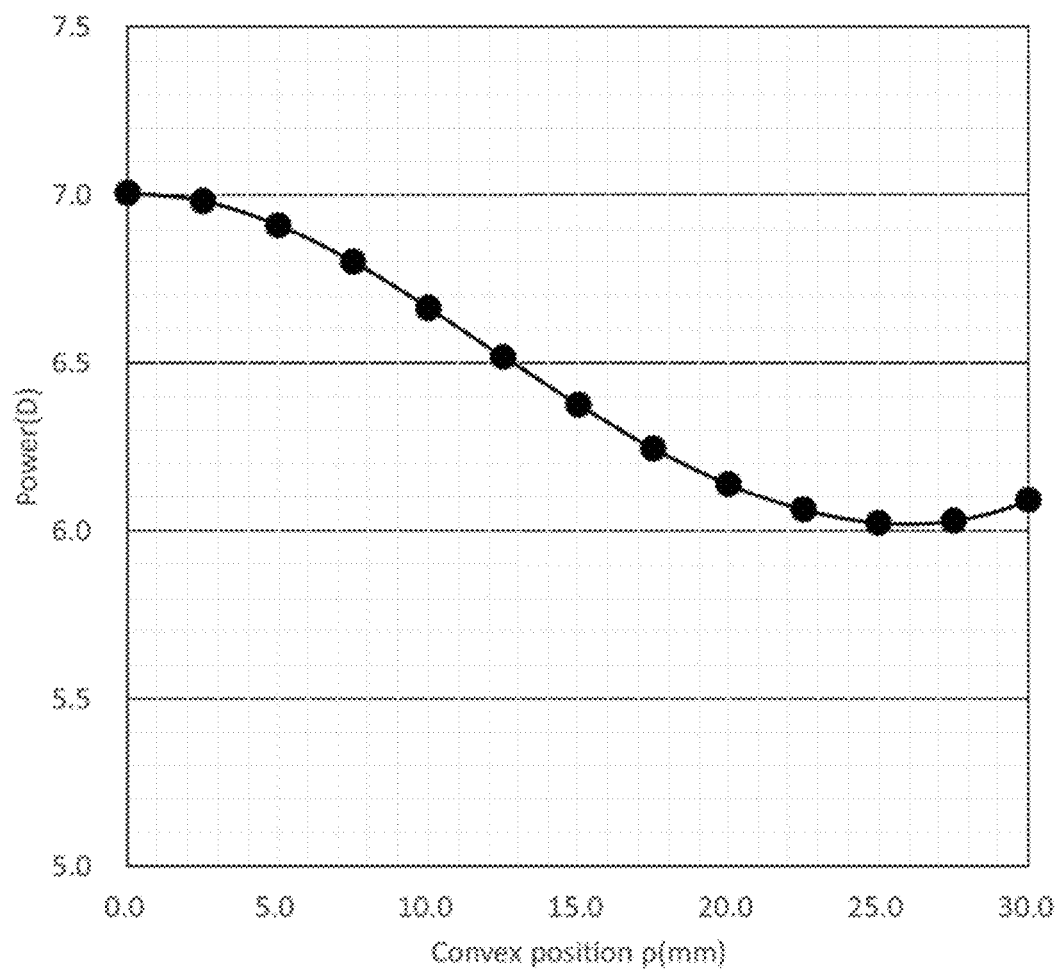

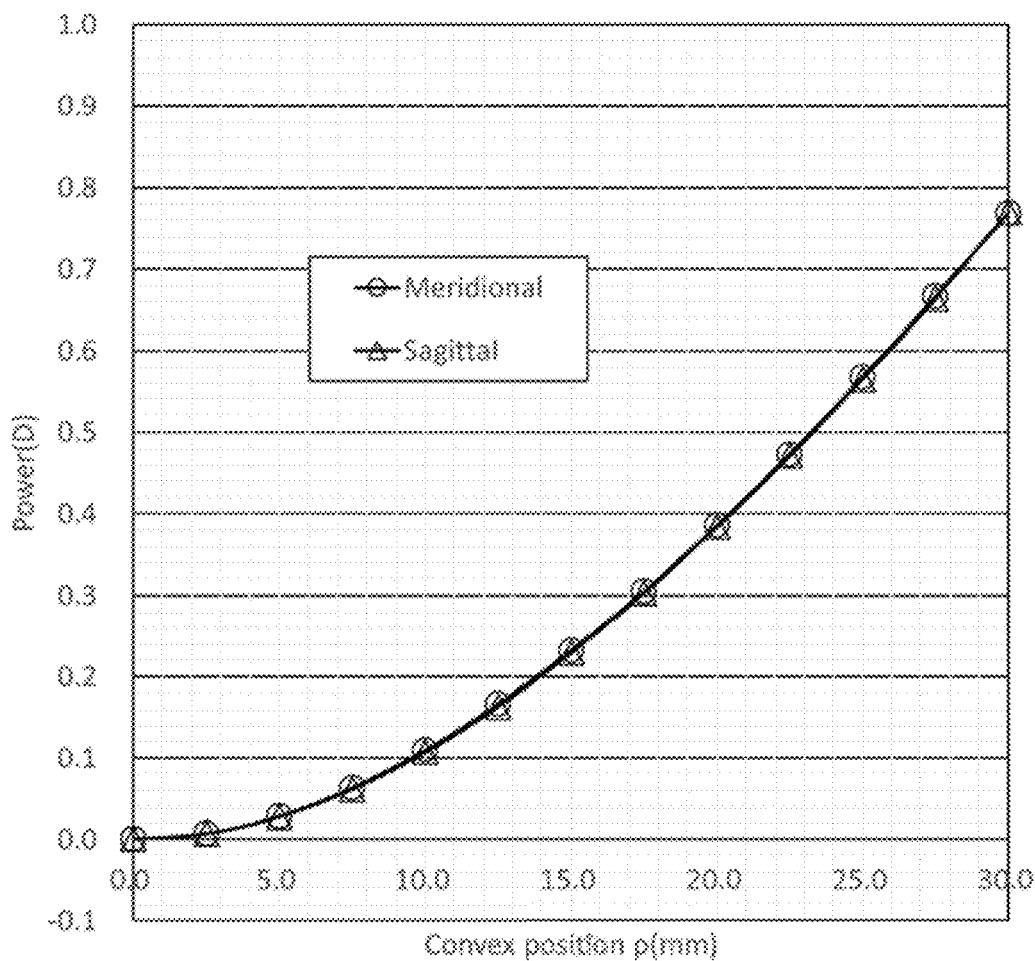
[Fig.15B]

[Fig.15C]
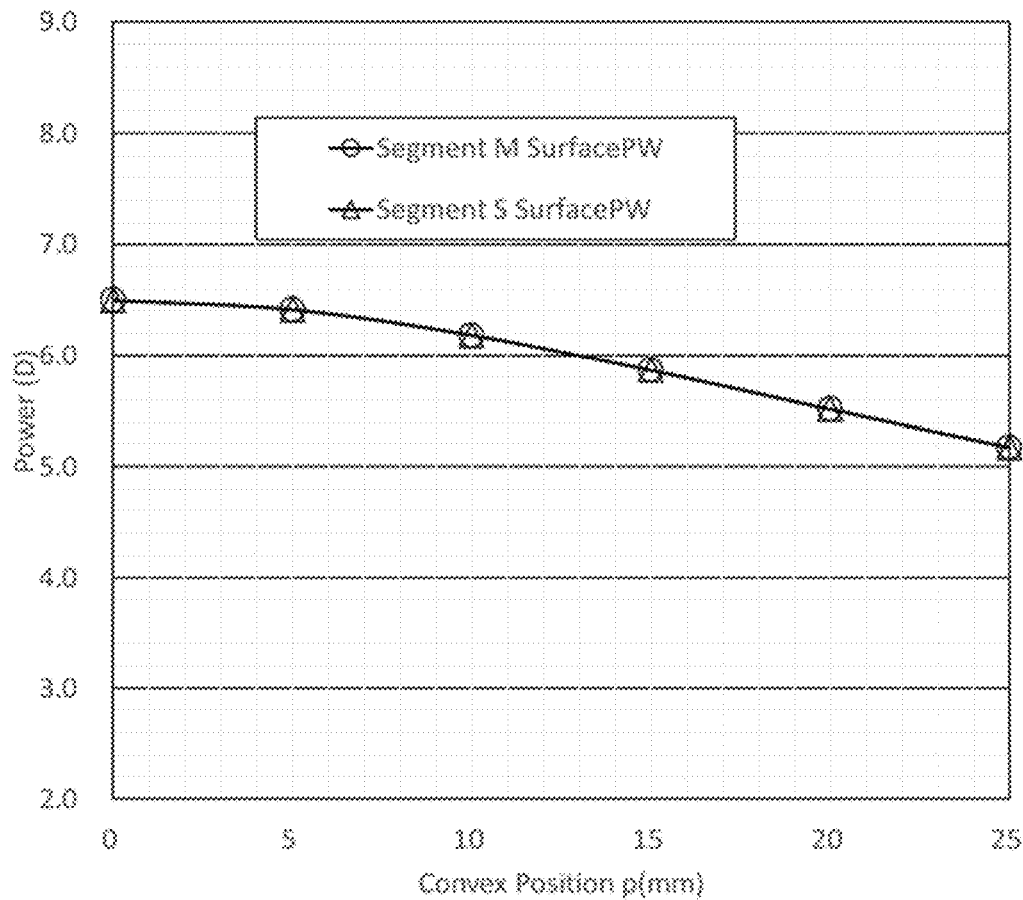

[Fig.15D]
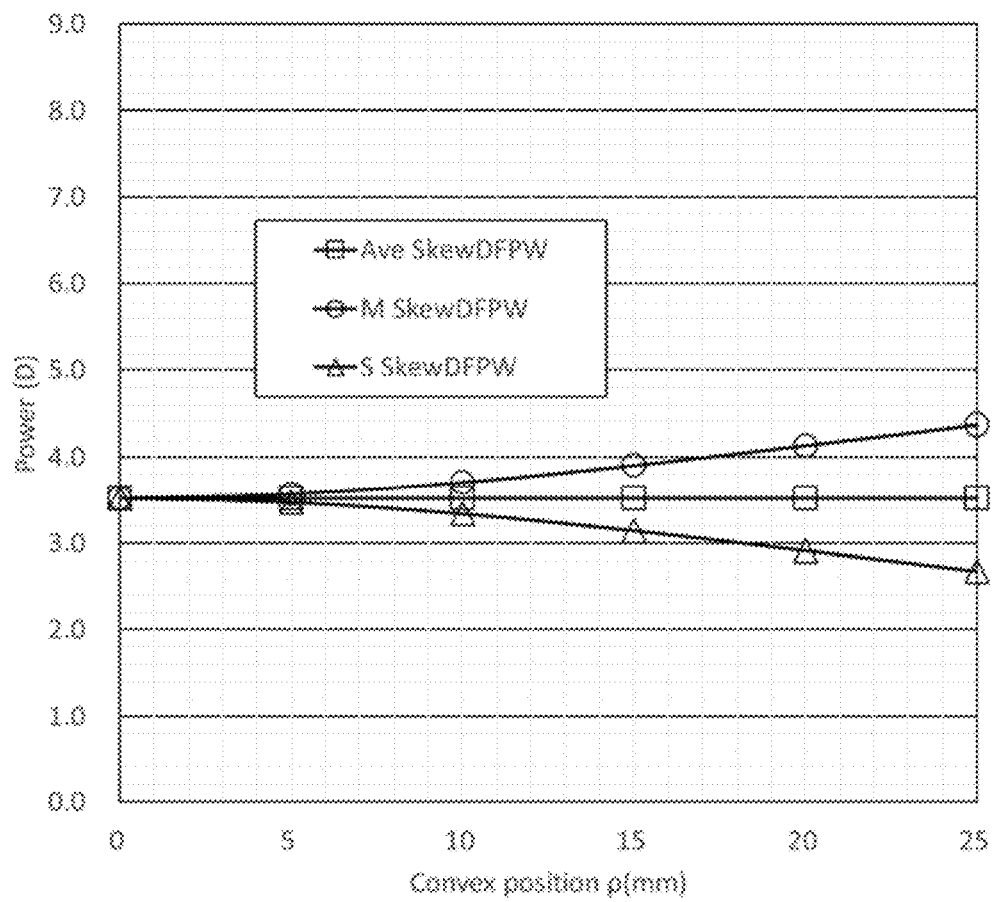

[Fig.15E]
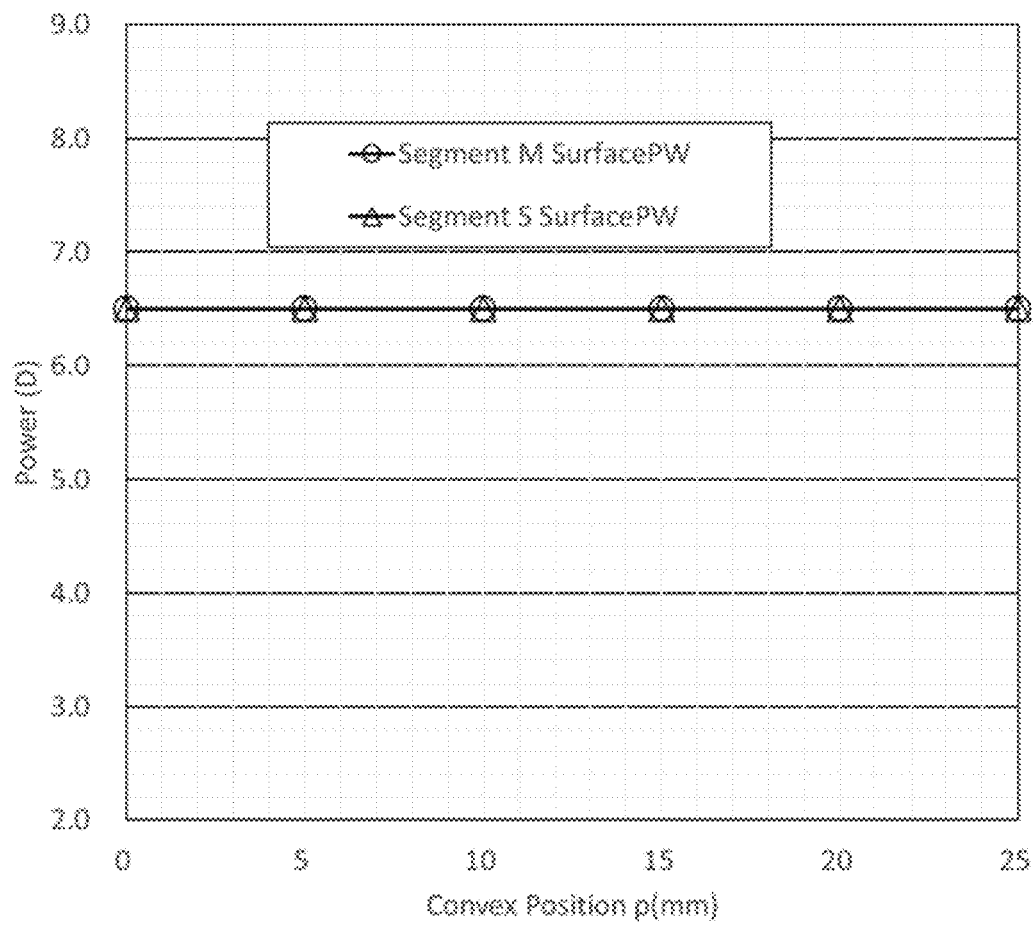

[Fig.15F]
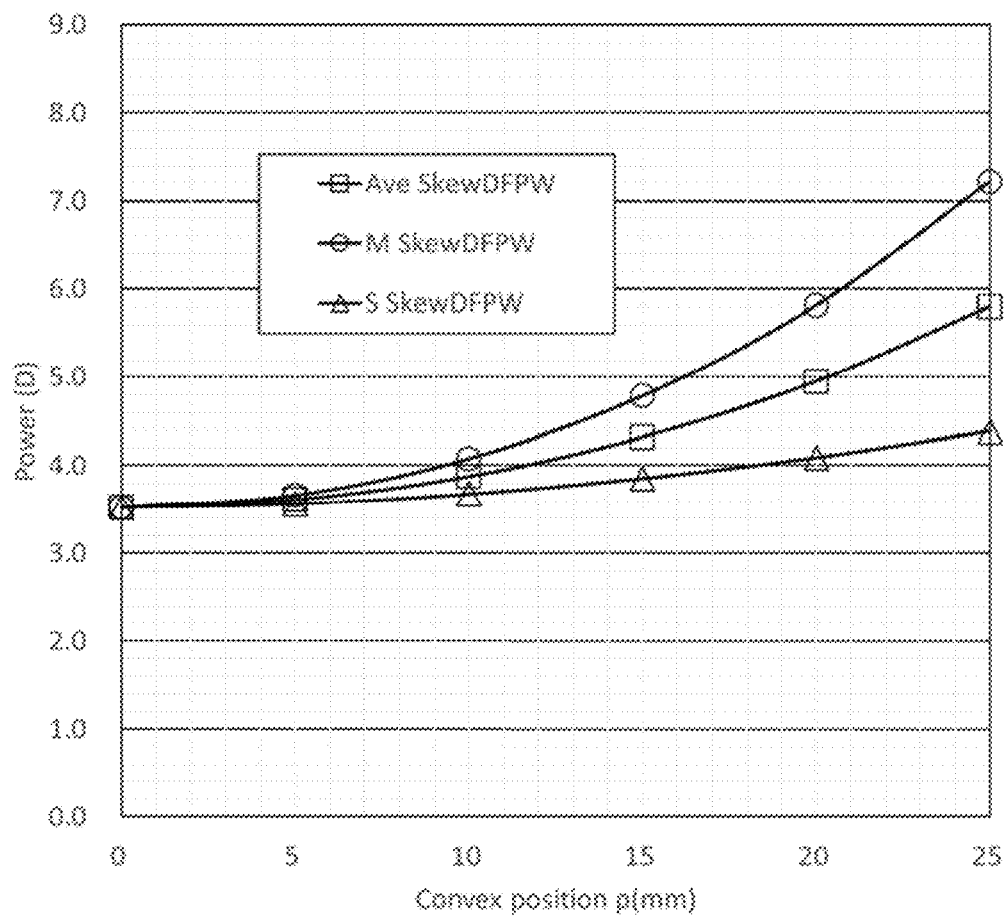

SPECTACLE LENS AND METHOD FOR DESIGNING THE SAME

CROSS-REFERENCE TO RELATED APPLICATIONS

This application is the National Stage of International Application No. PCT/JP2020/025118, filed Jun. 18, 2020, which claims priority to Japanese Patent Application No. 2019-117843, filed Jun. 25, 2019, and the contents of which is incorporated by reference.

TECHNICAL FIELD

The present disclosure relates to a spectacle lens and a method for designing the same, and relates particularly to a myopia progression-suppressive lens and a method for designing the same.

BACKGROUND ART

In a spectacle lens, ordinarily, parallel rays that are incident on the object-side face of the lens exit from the eyeball-side face of the lens and are focused on the retina (in the present specification, at a predetermined position A) of the wearer. That is to say, the parallel rays from a portion of a spectacle lens with a shape that corresponds to a prescription power are focused on the retina. This position A will be referred to as a focal position A.

CITATION LIST

Patent Literature

US 2017/131567A is an example of related art.

Astigmatism and a power error occur at a portion distant from the optical center (or centroid) (hereinafter also referred to collectively as the "lens center") of a spectacle lens. The occurrence of astigmatism and a power error means that a refractive power error occurs with respect to the prescription power. This refractive power error is expressed as (transmission power-prescription power). Thus, in the present specification, a refractive power error refers to a transmission power error, unless otherwise stated. Also, the occurrence of astigmatism and a power error means that a refractive power error in the meridional direction and a refractive power error in the sagittal direction that are the bases of the refractive power error occur. A difference between a refractive power error in the meridional direction and a refractive power error in the sagittal direction is referred to as astigmatism.

SUMMARY OF THE DISCLOSURE

A first mode of the present disclosure is a spectacle lens including:
a first area that causes light rays incident on an object-side face of the lens to exit from an eyeball-side face of the lens and to converge at a predetermined position A on a retina of a wearer; and
a plurality of defocusing second areas configured to cause light rays to converge at a position B on the object side or a position C on the distal side relative to the position A,
wherein at least some of the second areas in a peripheral area of the spectacle lens that is a radius range from 4.5 mm to 25 mm from a lens center have a shape that suppresses a variation in a defocusing effect, the variation being more likely to occur as a distance from the lens center increases.

A second mode of the present disclosure is the mode described as the first mode, in which
the second areas are convex areas, and
refractive power in at least some of the second areas in the peripheral area of the spectacle lens differs from refractive power in the second areas in a central area of the spectacle lens that is a radius range less than 4.5 mm from the lens center.

A third mode of the present disclosure is the mode described as the second mode, in which
the refractive power in the second areas in the peripheral area of the spectacle lens is reduced as the distance from the lens center increases.

A fourth mode of the present disclosure is the mode described as the first mode, in which
the second areas are convex areas, and
at least some of the second areas in the peripheral area of the spectacle lens have a toric shape that cancels out astigmatism in defocusing power occurring in the peripheral area.

A fifth mode of the present disclosure is a method for designing a spectacle lens that includes:
a first area that causes light rays incident on an object-side face of the lens to exit from an eyeball-side face of the lens and to converge at a predetermined position A on a retina of a wearer; and
a plurality of defocusing second areas configured to cause light rays to converge at a position B on the object side or a position C on the distal side relative to the position A,
the method including:
designing at least some of the second areas in a peripheral area of the spectacle lens that is a radius range from 4.5 mm to 25 mm from a lens center (corresponding to being at 10 degrees or more and 45 degrees or less, in terms of the rotation angle of an eyeball of a wearer) so as to have a shape that suppresses a variation in a defocusing effect, the variation being more likely to occur as a distance from the lens center increases.

BRIEF DESCRIPTION OF THE DRAWINGS

FIG. 1 is a diagram showing that defocusing power deriving from the shape differs from the actual defocusing power.

FIG. 2 is a front elevational view showing the shape of a spectacle lens according to a mode of the present disclosure.

FIG. 3 is a cross-sectional view showing an example configuration of the spectacle lens shown in FIG. 2.

FIG. 4 is a schematic cross-sectional view (part 1) showing paths of light that is transmitted through the spectacle lens shown in FIG. 2.

FIG. 5 is a schematic cross-sectional view (part 2) showing paths of light that is transmitted through the spectacle lens shown in FIG. 2.

FIG. 6A is a plot showing the relationship between the distance from the lens center (horizontal axis) and surface refractive power on a lens inner face (aspherical face) in Embodiment 1 (vertical axis).

FIG. 6B is a plot showing the relationship between the distance from the lens center (horizontal axis) and a transmission power error in the meridional direction and a transmission power error in the sagittal direction in a first area (base portion) of a spectacle lens in Embodiment 1 (vertical axis).

FIG. 6C is a plot showing the relationship between the distance from the lens center (horizontal axis) and a surface refractive power in the meridional direction and a surface refractive power in the sagittal direction in outer face second areas (convex areas) of the spectacle lens in Embodiment 1 (vertical axis).

FIG. 6D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 1 (vertical axis).

FIG. 6E is a plot showing the relationship between the distance from the lens center (horizontal axis) and a surface refractive power in the meridional direction and a surface refractive power in the sagittal direction in the outer face second areas (convex areas) of a spectacle lens in Comparative Example 1 (vertical axis).

FIG. 6F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 1 (vertical axis).

FIG. 7A is a plot showing the relationship between the distance from the lens center (horizontal axis) and surface refractive power on a lens inner face (aspherical face) in Embodiment 2 (vertical axis).

FIG. 7B is a plot showing the relationship between the distance from the lens center (horizontal axis) and a transmission power error in the meridional direction and a transmission power error in the sagittal direction in a first area (base portion) of a spectacle lens in Embodiment 2 (vertical axis).

FIG. 7C is a plot showing the relationship between the distance from the lens center (horizontal axis) and a surface refractive power in the meridional direction and a surface refractive power in the sagittal direction in outer face second areas (convex areas) of the spectacle lens in Embodiment 2 (vertical axis).

FIG. 7D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 2 (vertical axis).

FIG. 7E is a plot showing the relationship between the distance from the lens center (horizontal axis) and a surface refractive power in the meridional direction and a surface refractive power in the sagittal direction in the outer face second areas (convex areas) of a spectacle lens in Comparative Example 2 (vertical axis).

FIG. 7F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 2 (vertical axis).

FIG. 8A is a plot showing the relationship between the distance from the lens center (horizontal axis) and surface refractive power on a lens inner face (aspherical face) in Embodiment 3 (vertical axis).

FIG. 8B is a plot showing the relationship between the distance from the lens center (horizontal axis) and a transmission power error in the meridional direction and a transmission power error in the sagittal direction in a first area (base portion) of a spectacle lens in Embodiment 3 (vertical axis).

FIG. 8C is a plot showing the relationship between the distance from the lens center (horizontal axis) and a surface refractive power in the meridional direction and a surface refractive power in the sagittal direction in outer face second areas (convex areas) of the spectacle lens in Embodiment 3 (vertical axis).

FIG. 8D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 3 (vertical axis).

FIG. 8E is a plot showing the relationship between the distance from the lens center (horizontal axis) and a surface refractive power in the meridional direction and a surface refractive power in the sagittal direction in the outer face second areas (convex areas) of a spectacle lens in Comparative Example 3 (vertical axis).

FIG. 8F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 3 (vertical axis).

FIG. 9A is a plot showing the relationship between the distance from the lens center (horizontal axis) and surface refractive power on a lens inner face (aspherical face) in Embodiment 4 (vertical axis).

FIG. 9B is a plot showing the relationship between the distance from the lens center (horizontal axis) and a transmission power error in the meridional direction and a transmission power error in the sagittal direction in a first area (base portion) of a spectacle lens in Embodiment 4 (vertical axis).

FIG. 9C is a plot showing the relationship between the distance from the lens center (horizontal axis) and a surface refractive power in the meridional direction and a surface refractive power in the sagittal direction in outer face second areas (convex areas) of the spectacle lens in Embodiment 4 (vertical axis).

FIG. 9D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 4 (vertical axis).

FIG. 9E is a plot showing the relationship between the distance from the lens center (horizontal axis) and a surface refractive power in the meridional direction and a surface refractive power in the sagittal direction in the outer face second areas (convex areas) of a spectacle lens in Comparative Example 4 (vertical axis).

FIG. 9F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 4 (vertical axis).

FIG. 10A is a plot showing the relationship between the distance from the lens center (horizontal axis) and surface refractive power on a lens inner face (aspherical face) in Embodiment 5 (vertical axis).

FIG. 10B is a plot showing the relationship between the distance from the lens center (horizontal axis) and a transmission power error in the meridional direction and a transmission power error in the sagittal direction in a first area (base portion) of a spectacle lens in Embodiment 5 (vertical axis).

FIG. 10C is a plot showing the relationship between the distance from the lens center (horizontal axis) and a surface refractive power in the meridional direction and a surface refractive power in the sagittal direction in outer face second areas (convex areas) of the spectacle lens in Embodiment 5 (vertical axis).

FIG. 10D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 5 (vertical axis).

FIG. 10E is a plot showing the relationship between the distance from the lens center (horizontal axis) and a surface refractive power in the meridional direction and a surface refractive power in the sagittal direction in the outer face second areas (convex areas) of a spectacle lens in Comparative Example 5 (vertical axis).

FIG. 10F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 5 (vertical axis).

FIG. 11A is a plot showing the relationship between the distance from the lens center (horizontal axis) and surface refractive power on a lens inner face (aspherical face) in Embodiment 6 (vertical axis).

FIG. 11B is a plot showing the relationship between the distance from the lens center (horizontal axis) and a transmission power error in the meridional direction and a transmission power error in the sagittal direction in a first area (base portion) of a spectacle lens in Embodiment 6 (vertical axis).

FIG. 11C is a plot showing the relationship between the distance from the lens center (horizontal axis) and a surface refractive power in the meridional direction and a surface refractive power in the sagittal direction in outer face second areas (convex areas) of the spectacle lens in Embodiment 6 (vertical axis).

FIG. 11D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 6 (vertical axis).

FIG. 11E is a plot showing the relationship between the distance from the lens center (horizontal axis) and a surface refractive power in the meridional direction and a surface refractive power in the sagittal direction in the outer face second areas (convex areas) of a spectacle lens in Comparative Example 6 (vertical axis).

FIG. 11F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 6 (vertical axis).

FIG. 12A is a plot showing the relationship between the distance from the lens center (horizontal axis) and surface refractive power on a lens inner face (aspherical face) in Embodiment 7 (vertical axis).

FIG. 12B is a plot showing the relationship between the distance from the lens center (horizontal axis) and a transmission power error in the meridional direction and a transmission power error in the sagittal direction in a first area (base portion) of a spectacle lens in Embodiment 7 (vertical axis).

FIG. 12C is a plot showing the relationship between the distance from the lens center (horizontal axis) and a surface refractive power in the meridional direction and a surface refractive power in the sagittal direction in outer face second areas (convex areas) of the spectacle lens in Embodiment 7 (vertical axis).

FIG. 12D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 7 (vertical axis).

FIG. 12E is a plot showing the relationship between the distance from the lens center (horizontal axis) and a surface refractive power in the meridional direction and a surface refractive power in the sagittal direction in the outer face second areas (convex areas) of a spectacle lens in Comparative Example 7 (vertical axis).

FIG. 12F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 7 (vertical axis).

FIG. 13A is a plot showing the relationship between the distance from the lens center (horizontal axis) and surface refractive power on a lens inner face (aspherical face) in Embodiment 8 (vertical axis).

FIG. 13B is a plot showing the relationship between the distance from the lens center (horizontal axis) and a transmission power error in the meridional direction and a transmission power error in the sagittal direction in a first area (base portion) of a spectacle lens in Embodiment 8 (vertical axis).

FIG. 13C is a plot showing the relationship between the distance from the lens center (horizontal axis) and a surface refractive power in the meridional direction and a surface refractive power in the sagittal direction in outer face second areas (convex areas) of the spectacle lens in Embodiment 8 (vertical axis).

FIG. 13D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 8 (vertical axis).

FIG. 13E is a plot showing the relationship between the distance from the lens center (horizontal axis) and a surface refractive power in the meridional direction and a surface refractive power in the sagittal direction in the outer face second areas (convex areas) of a spectacle lens in Comparative Example 8 (vertical axis).

FIG. 13F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 8 (vertical axis).

FIG. 14A is a plot showing the relationship between the distance from the lens center (horizontal axis) and surface refractive power on a lens inner face (aspherical face) in Embodiment 9 (vertical axis).

FIG. 14B is a plot showing the relationship between the distance from the lens center (horizontal axis) and a transmission power error in the meridional direction and a transmission power error in the sagittal direction in a first area (base portion) of a spectacle lens in Embodiment 9 (vertical axis).

FIG. 14C is a plot showing the relationship between the distance from the lens center (horizontal axis) and a surface refractive power in the meridional direction and a surface refractive power in the sagittal direction in outer face second areas (convex areas) of the spectacle lens in Embodiment 9 (vertical axis).

FIG. 14D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 9 (vertical axis).

FIG. 14E is a plot showing the relationship between the distance from the lens center (horizontal axis) and a surface refractive power in the meridional direction and a surface refractive power in the sagittal direction in the outer face second areas (convex areas) of a spectacle lens in Comparative Example 9 (vertical axis).

FIG. 14F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 9 (vertical axis).

FIG. 15A is a plot showing the relationship between the distance from the lens center (horizontal axis) and surface refractive power on a lens inner face (aspherical face) in Embodiment 10 (vertical axis).

FIG. 15B is a plot showing the relationship between the distance from the lens center (horizontal axis) and a transmission power error in the meridional direction and a transmission power error in the sagittal direction in a first area (base portion) of a spectacle lens in Embodiment 10 (vertical axis).

FIG. 15C is a plot showing the relationship between the distance from the lens center (horizontal axis) and a surface refractive power in the meridional direction and a surface refractive power in the sagittal direction in outer face second areas (convex areas) of the spectacle lens in Embodiment 10 (vertical axis).

FIG. 15D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 10 (vertical axis).

FIG. 15E is a plot showing the relationship between the distance from the lens center (horizontal axis) and a surface refractive power in the meridional direction and a surface refractive power in the sagittal direction in the outer face second areas (convex areas) of a spectacle lens in Comparative Example 10 (vertical axis).

FIG. 15F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 10 (vertical axis).

EMBODIMENTS OF THE DISCLOSURE

Patent Document 1 (US Patent Application Publication No. 2017/131567) describes a spectacle lens that exhibits an effect of suppressing the progression of refractive errors such as myopia (hereinafter also referred to as a myopia progression-suppressive effect). This spectacle lens is also referred to as a myopia progression-suppressive lens. Specifically, micro convex portions, each of which has a spherical shape with a diameter of approximately 1 mm, for example, are formed on a convex face, which is a face on an object side of a spectacle lens.

In a spectacle lens, ordinarily, parallel rays that are incident on the object-side face of the lens exit from the eyeball-side face of the lens and are focused on the retina (in the present specification, at a predetermined position A) of the wearer. That is to say, the parallel rays from a portion of a spectacle lens with a shape that corresponds to a prescription power (a portion of a spectacle lens as described in Patent Document 1, for example) are focused on the retina. This position A will be referred to as a focal position A.

Meanwhile, as for the light that has passed through the micro convex portions of the spectacle lens described in Patent Document 1, light rays incident on the spectacle lens are focused at a plurality of positions B on the object side, in the optical axis direction, relative to the predetermined position A. These positions B will be referred to as focal positions B. The progression of myopia is suppressed by defocusing power imparted by the micro convex portions.

In the present specification, being on the object side refers to the side in the direction, along the optical axis, of an object to be visually recognized ("the forward direction"), and being on the distal side refers to the side opposite to the object side: i.e., the side in the direction, along the optical axis, that is away from the object ("the rear direction," or the direction from the spectacle lens toward the eyeball).

The spectacle lens described in Patent Document 1 is provided with micro convex portions in order to suppress the progression of myopia, and light rays are focused at a plurality of positions B that are on the object side relative to the position A on the retina, as described in the Background Art (see FIG. 5, which will be described later).

However, a refractive power error and astigmatism may occur in the defocusing power imparted by the micro convex portions at a portion distant from the lens center.

If a refractive power error occurs in the defocusing power imparted by the micro convex portions, there is a possibility that the focal position will move toward the distal side (in the rear direction; away from the object) or the object side relative to the positions B, although, originally, light rays are to be focused at a plurality of positions B on the object side relative to the position A on the retina. Light rays will be focused at a position different from the originally-designed positions, which is an unexpected situation and is therefore unfavorable.

If astigmatism occurs in the defocusing power imparted by the micro convex portions, a difference occurs between the refractive power in the meridional direction and the refractive power in the sagittal direction. That is to say, originally, light rays are to be focused at the positions B on the object side relative to the position A on the retina. However, light rays gather between focal positions Bm of the light rays that correspond to the refractive power in the meridional direction and focal positions Bs of the light rays that correspond to the refractive power in the sagittal direction, the focal positions Bm and Bs being located on opposite sides of the positions B, and the light rays do not gather at one point. This phenomenon inhibits the light rays from being focused at the originally-designed positions B. Moreover, there is a possibility that either the positions Bm or the positions Bs will be located closer to the retina (closer to the rear of the eyeball). In this case, the myopia progression-suppressive effect may be impaired.

At least one of the problem in the case where a refractive power error occurs in defocusing power and the problem in the case where astigmatism occurs in the defocusing power will be referred to as "a variation in the defocusing effect, the variation being more likely to occur as the distance from the lens center increases". Variation in the defocusing effect leads to a decrease in the reliability of the myopia progression-suppressive effect.

Note that Patent Document 1 states that the myopia progression-suppressive effect is exhibited by the micro convex portions. Meanwhile, a hyperopia progression-suppressive effect is expected to be exhibited by replacing the micro convex portions with micro concave portions, due to a mechanism that is contrary to the myopia progression mechanism and the mechanism that suppresses the myopia progression described in Patent Document 1. In the case of providing micro concave portions as well, a malfunction may occur at a portion distant from the aforementioned lens center, and there is a concern that the hyperopia progression-suppressive effect exhibited by the micro concave portions will be impaired.

An embodiment of the present disclosure aims to not impair the effect of suppressing the progression of myopia or hyperopia even in a peripheral area of a spectacle lens.

The inventors of the present application undertook intense study to solve the foregoing problems. At that time, the principle of variation in the defocusing effect was examined.

FIG. 1 is a diagram showing that defocusing power deriving from a shape differs from the actual defocusing power. The defocusing power deriving from the shape refers to a surface refractive power calculated based on the curvature of the face of the micro convex portions or the micro concave portions and the refractive index of a lens material (in other words, a surface refractive power when light is incident from a normal direction of the curve). The actual defocusing power refers to defocusing power imparted to light rays incident on the micro convex portions or the micro concave portions at an angle, as in the case where spectacles are actually worn, and is calculated based on an outgoing wavefront.

Given that the defocusing power brought about by a micro convex portion (a second area that is a convex area in this embodiment) at a point P in FIG. 1 is $D_f(\rho)$, $D_f(\rho)$ is expressed as the following expression. $\rho$ denotes the distance from the optical axis in the face (convex face; outer face) on the object side. $K_D(\rho)$ denotes a surface refractive power at the micro convex portion at the distance $\rho$. $K_B$ denotes a surface refractive power (base curve) in an area other than the micro convex portions (a first area that is a portion serving as a base in this embodiment).

$$D_f(\rho) = K_D(\rho) - K_B \quad \text{[Expression 1]}$$

If $D_f(\rho)$ is divided into the meridional (M) direction and the sagittal (S) direction, the following expressions hold.

$$D_{fM}(\rho) = K_{DM}(\rho) - K_B$$

$$D_{fS}(\rho) = K_{DS}(\rho) - K_B \quad \text{[Expression 2]}$$

Meanwhile, given that the actual defocusing power is denoted as $P_f(\rho)$, $P_f(\rho)$ is expressed as the following expression.

$$P_f(\rho) = P_D(\rho) - P_B(\rho) \quad \text{[Expression 3]}$$

$P_D(\rho)$ is a value of a wavefront at a point Q, and denotes a refractive power calculated by means of ray tracing. $P_B(\rho)$ is a value of a wavefront at the point Q on a base lens, and denotes a refractive power calculated by means of ray tracing.

If $P_D(\rho)$ is divided into the meridional (M) direction and the sagittal (S) direction, the following expressions hold.

$$P_{fM}(\rho) = P_{DM}(\rho) - P_{BM}(\rho)$$

$$P_{fS}(\rho) = P_{DS}(\rho) - P_{BS}(\rho) \quad \text{[Expression 4]}$$

$D_f(\rho)$ and $P_f(\rho)$ are substantially equal to each other in the central area of the spectacle lens, i.e. in an area where $\rho$ is small. However, it has been revealed through examination by the inventors of the present application that the difference between the actual defocusing power $P_f(\rho)$ and $D_f(\rho)$ increases if $\rho$ is large, i.e. in the peripheral area. That is to say, it has been revealed through examination by the inventors of the present application that the actual defocusing power $P_f(\rho)$ takes a value that differs from $D_f(\rho)$, which denotes the defocusing power deriving from the shape.

Based on this finding, in the present disclosure, the inventors of the present application found a setting in which the shape of the micro convex portions or the micro concave portions (second areas in the present specification) in the peripheral area of a spectacle lens at 4.5 mm or more and 25 mm or less, in terms of radius, from the lens center (corresponding to being at 10 degrees or more and 45 degrees or less, in terms of the rotation angle of an eyeball of the wearer) is varied from the shape of the micro convex portions or the micro concave portions (second area) in the central area, which is a radius range less than 4.5 mm from the lens center, such that the actual defocusing power takes a desired value. The inventors of the present application then conceived a configuration in which a variation in the defocusing effect in the peripheral area is suppressed by the second areas whose shape is varied.

The present disclosure has been made based on the above-described findings.

According to an embodiment of the present disclosure, it is possible to not impair the effect of suppressing the progression of myopia or hyperopia even in the peripheral area of a spectacle lens.

A mode of the present disclosure will be described below. The following description is an example, and the present disclosure is not limited to the mode described as an example.

Spectacle Lens According to Mode of the Present Disclosure

The spectacle lens according to a mode of the present disclosure is a myopia progression-suppressive lens. General features of the lens may be similar to the spectacle lens described in Patent Document 1. The specific configuration is as follows:

"A spectacle lens including:

a first area that causes light rays incident on an object-side face of the lens to exit from an eyeball-side face of the lens and to converge at a predetermined position A on a retina of a wearer; and a plurality of defocusing second areas configured to cause light rays to converge at a position B on the object side relative to the position A, wherein at least some of the second areas in a peripheral area of the spectacle lens that is a radius range from 4.5 mm to 25 mm from a lens center (corresponding to being at 10 degrees or more and 45 degrees or less, in terms of the rotation angle of an eyeball of a wearer) have a shape that suppresses a variation in a defocusing effect, the variation being more likely to occur as a distance from the lens center increases."

The first area corresponds generally to a first refraction area as shown, for example, in Patent Document 1. The "light rays incident from a face on an object side" in the above specific configuration are light rays from an infinite point. The second areas correspond generally to second refraction areas as shown, for example, in Patent Document 1. That is to say, in this mode, the second areas are convex areas.

In a mode of the present disclosure, even if the defocusing effect varies in the peripheral area of the spectacle lens that is a radius range from 4.5 mm to 25 mm from the lens center (corresponding to a rotation angle of an eyeball of the wearer being 10 degrees or more and 45 degrees or less) (hereinafter also referred to simply as the "peripheral area"), the second areas that are in the peripheral area have a shape that suppresses the variation.

As a result, according to a mode of the present disclosure, the effect of suppressing the progression of myopia or hyperopia is not impaired even in the peripheral area of the spectacle lens.

Details of Spectacle Lens According to Mode of the Present Disclosure

Hereinafter, a description will be given of more specific examples, examples that may be desired, and modifications of a mode of the present disclosure.

A cause of variation in the defocusing effect in the peripheral area lies in a refractive power error and astigmatism in the defocusing power imparted by the micro convex portions, as described in the problems section of the present disclosure.

Since light rays are obliquely incident on the peripheral area of the lens, the actual power differs from the power calculated based on the surface shape of the lens. That is to say, an average power error and astigmatism occur. This also applies to a lens with micro convex portions.

Measures Against Refractive Power Error in Defocusing Power

As a measure against a refractive power error in defocusing power, the refractive power in the second areas, i.e. convex areas in the peripheral area can be changed. As a specific example of changing the refractive power, the curvature of the convex face can be changed to change a so-called geometric refractive power, or the refractive power at a portion in the convex areas can also be changed by forming a layer of a different material (e.g. a hard coating) on the convex face. Hereinafter, a description will be given based on an example of changing the geometric refractive power.

For example, in the case where the spectacle lens that has the first area and the second areas is a minus unifocal lens (FIGS. 2 to 5, which will be described later), even if the base lens is an aspheric lens, and a power error or astigmatism is corrected, the actual defocusing power imparted by the same micro convex portions of the second areas may differ between the center portion and a peripheral portion.

The defocusing power imparted by the second areas differing between the center portion and the peripheral portion means that focal positions move from the originally-assumed positions B. This situation means that the myopia progression-suppressive effect is not constant but varies.

The actual defocusing power can be made constant by varying the refractive power (e.g. curvature) of the convex face of the convex areas in the peripheral area from the refractive power of the convex face of the convex areas in the central area that is a radius range less than 4.5 mm from the lens center.

Note that the refractive power in the convex areas, which are the second areas, in the peripheral area of the spectacle lens may be further reduced the greater the distance from the lens center is. The actual defocusing power tends to have a larger absolute value the greater the distance from the lens center is. For this reason, the refractive power (e.g. curvature) of the convex areas may be further reduced the farther they are from the lens center, in accordance with this tendency.

Note that the degree to which the curvature is varied may be determined based on the results of simulations of the peripheral area of the face on the object side that serves as a base, and the peripheral area of the face on the distal side.

Measures Against Astigmatism in Defocusing Power

As a measure against astigmatism in defocusing power, the convex face of the second areas, i.e. the convex areas in the peripheral area, can be formed to have a toric shape to cancel out the astigmatism in the defocusing power that occurs in the peripheral area.

Note that how to set the toric shape set may be determined based on the results of simulations of the peripheral area of the face on the object side that serves as a base, and the peripheral area of the face on the distal side.

Note that the shape suitable for each of the above measures may be set for at least some of the second areas in the peripheral area. "At least some" here refers to a predetermined number of second areas (convex areas), of a plurality of second areas. If such a shape is set for at least some of the second areas, there is less concern that the myopia progression-suppressive effect will be impaired than in the case of a conventional myopia progression-suppressive lens.

Meanwhile, a shape suitable for each of the above measures may be set uniformly for all of the second areas in the peripheral area.

It is preferable that the results of simulations of the peripheral area take values obtained by performing ray tracing at a finite distance.

If a person for which the myopia-suppressive effect is to be exhibited is in a visual environment in which the person works for long periods of time with his eyes close to something, it is often the case that the person already shows signs of myopia. For this reason, the spectacle lens according to a mode of the present disclosure is a unifocal lens for dealing with an object distance in a range from middle distances (1 m to 40 cm) to short distances (40 cm to 10 cm). That is to say, the first area of the spectacle lens according to a mode of the present disclosure exhibits the functions of this unifocal lens. Needless to say, the technical idea of the present disclosure is also applicable to a unifocal lens for dealing with an infinite point, but a unifocal lens for dealing with middle to short distances will be taken as an example of a mode of the present disclosure.

The spectacle lens according to a mode of the present disclosure is often a unifocal lens for dealing with middle to short distances. For this reason, even when the curvature of the convex face of the convex areas is set, a spectacle lens that is more suitable for the actual situation can ultimately be obtained if, in the case of a refractive power error, a refractive power error in the meridional direction and a refractive power error in the sagittal direction that serve as the bases of the aforementioned refractive power error take values that can be obtained by performing ray tracing at a finite distance. The same applies to the case of dealing with astigmatism. The "finite distance" here refers to the object distance that is set as the aforementioned middle distance or short distance, or preferably that is set for a unifocal lens.

Although, in a mode of the present disclosure, the peripheral area of the spectacle lens is expressed as the distance from the lens center, it may alternatively be expressed as the rotation angle (in other words, angle of view) of an eyeball. In this case, the radius range from 4.5 mm to 25 mm from the lens center substantially corresponds to a rotation angle from 10 degrees to 45 degrees. The rotation angle is described in the specification etc. of Japanese Patent Application Laid-Open No. 1992-338918, for example, and a description thereof is omitted accordingly.

A more specific configuration of the spectacle lens according to a mode of the present disclosure will be described below.

Overall Configuration of Spectacle Lens

FIG. 2 is a front elevational view showing the shape of the spectacle lens according to a mode of the present disclosure.

As shown in FIG. 2, a spectacle lens 1 has a plurality of convex areas 6, which are regularly arranged around the lens center. These convex areas 6 are the second areas. The portion that is other than the convex areas 6 and serves as a base is the first area. A specific configuration of the convex areas 6 will be described later in detail.

FIG. 3 is a cross-sectional view showing an example configuration of the spectacle lens shown in FIG. 2.

As shown in FIG. 3, the spectacle lens 1 has a face 3 on an object side and a face 4 on an eyeball side. The "face on the object side" is a surface that is located on the object side when spectacles that include spectacle lenses 1 is worn by the wearer. The "face on the eyeball side" is a surface on the opposite side, i.e. the surface that is located on the eyeball side when the spectacles that include spectacle lenses 1 are worn by the wearer. In a mode of the present disclosure, the face 3 on the object side is a convex face, and the face 4 on the eyeball side is a concave face. That is to say, the spectacle lens 1 according to a mode of the present disclosure is a meniscus lens.

The spectacle lens 1 includes a lens base material 2, hard coatings 8 that are formed on the convex face side and the concave face side of the lens base material 2, and anti-reflection coatings (AR coatings) 10 that are formed on the surfaces of the respective hard coatings 8. Note that other coatings may also be formed, in addition to the hard coatings 8 and the anti-reflection coatings 10, on the spectacle lens 1.

Lens Base Material

The lens base material 2 is made of, for example, a thermosetting resin material such as thiourethane, allyl, acryl, or epithio. Note that any other resin material with which a desired refractivity can be obtained may be selected as a resin material that constitutes the lens base material 2. Also, a lens base material that is made of inorganic glass, rather than a resin material, may alternatively be employed.

In a mode of the present disclosure, the face 3 (convex face) on the object side of the lens base material 2 is provided with a plurality of convex areas 6a, which are formed so as to protrude from the face toward the object side. Each of the convex areas 6a is constituted by a curved face with a curvature that differs from that of the face 3 on the object side of the lens base material 2.

Due to these convex areas 6a being formed, the convex areas 6a, each of which has a substantially circular shape, are arranged as islands with equal gaps therebetween on the lens, on the face 3 on the object side of the lens base material 2 when viewed in a plan view. In other words, the convex areas 6a, each of which has a substantially circular shape, are arranged in a state of being spaced apart from each other without being adjacent to each other, i.e. in a state where the first area serving as the base is present between the convex areas 6a.

Note that a plurality of convex areas 6a may alternatively be formed on the face 4 (concave face) on the eyeball side of the lens base material 2. Furthermore, a plurality of convex areas 6a may be formed on both faces, namely on the convex face and the concave face. For convenience of description, the case of forming the plurality of convex areas 6a on the face 3 (convex face) on the object side will be described below as an example.

Hard Coating

The hard coatings 8 are formed using a thermoplastic resin or a UV-curable resin, for example. The hard coatings 8 can be formed using a method of immersing the lens base material 2 in a hard coating agent, or by means of spin coating or the like. Due to being coated with these hard coatings 8, the durability of the spectacle lens 1 can be improved.

Anti-Reflection Coating

The anti-reflection coatings 10 are formed by forming films of an anti-reflection agent such as $ZrO_2$, $MgF_2$, or $Al_2O_3$ by means of vacuum evaporation, for example. Due to being coated with these anti-reflection coatings 10, the visibility of an object viewed through the spectacle lens 1 can be improved.

Shape of Face on Object Side

As mentioned above, a plurality of convex areas 6a are formed on the face 3 on the object side of the lens base material 2. Accordingly, if this face 3 is coated with the hard coating 8 and the anti-reflection coating 10, a plurality of convex areas 6b are also formed with the hard coating 8 and the anti-reflection coating 10, following the convex areas 6a on the lens base material 2. That is to say, convex areas 6, each of which is constituted by a convex area 6a and a convex area 6b, are arranged on the face 3 (convex face) on the object side of the spectacle lens 1 so as to protrude from the face 3 toward the object.

Similar to the convex areas 6a, the convex areas 6, which are formed following the convex areas 6a on the lens base material 2, are arranged as islands at equal gaps therebetween in the circumferential direction and the radial around the lens center, i.e. in a state of being regularly arrayed around the lens center.

In another mode of the present disclosure, the convex areas 6 may be formed by at least either the hard coating 8 or the anti-reflection coating 10, rather than by providing the convex areas 6a on the lens base material 2.

Note that the convex areas 6 may be provided at a portion through which the optical axis at the lens center passes, as shown in FIG. 2 of the present application, or an area in which the convex areas 6 are not provided may be secured at a portion through which the optical axis passes. For reference, one example of an area in which convex areas are not provided that is secured at a portion through which an optical axis passes is shown in FIG. 2 of Patent Document 1.

Each of the convex areas 6 is configured as follows, for example. It may be desired that the diameter of each convex area 6 is about 0.8 mm to 2.0 mm. It may be desired that the protruding height (protruding amount) of each convex area 6 is about 0.1 to 10 μm, or even about 0.7 to 0.9 μm. Each convex area 6 in the central area has a spherical shape with a curvature radius of 50 to 250 mm, or even about 86 mm. Due to this configuration, the refractive power of each convex area 6 is made larger than the refractive power in the area in which the convex areas 6 are not formed, by about 2.00 to 5.00 diopters.

Note that the curvature of the convex areas 6 in the peripheral area can be varied relative to the curvature of the convex areas 6 in the central area, and the specific value of the curvatures can be set, as appropriate, in accordance with the base shape of the face on the object side and the shape of the peripheral area of the face on the eyeball side.

Optical Properties

Due to having the convex areas 6 on the object-side face 3, the spectacle lens 1 with the above-described configuration may achieve the following optical properties, and can suppress, as a result, the progression of refractive errors, such as myopia, of a wearer of the spectacles.

FIG. 4 is a schematic cross-sectional view (part 1) showing paths of light that is transmitted through the spectacle lens shown in FIG. 2.

As shown in FIG. 4, light that is incident on an area in which the convex areas 6 are not formed in the object-side face 3 of the spectacle lens 1, i.e. the first area serving as the base, exits from the eyeball-side face 4 and is then focused on a retina 20a of an eyeball 20. That is to say, light rays that are transmitted through the spectacle lens 1 are, in principle, focused on the retina 20a of the wearer of the spectacles. In other words, the first area serving as the base of the spectacle lens 1 has a curvature that is set in accordance with a prescription for the wearer of the spectacles such that light is focused at a predetermined position A on the retina 20a.

FIG. 5 is a schematic cross-sectional view (part 2) showing paths of light that is transmitted through the spectacle lens shown in FIG. 2.

Meanwhile, as shown in FIG. 5, light that is incident on the convex areas 6 of the spectacle lens 1 exits from the face 4 on the eyeball side and is then focused at positions B, which are located on the object side relative to the retina 20a of the eyeball 20. That is to say, the convex areas 6 cause light that exits from the face 4 on the eyeball side to converge at the positions B located on the object side relative to the focal position A. These focal positions B are present as positions $B_1, B_2, B_3, \ldots B_N$ (N is the total number of convex areas 6) in correspondence with the respective convex areas 6.

Thus, in principle, the spectacle lens 1 causes light rays incident on the object-side face 3 to exit from the eyeball-side face 4, and to converge at the predetermined position A. Meanwhile, at the portions at which the convex areas 6 are arranged, the spectacle lens 1 causes light rays to converge at the positions B ($B_1, B_2, B_3, \ldots B_N$) located on the object side relative to the predetermined position A. That is to say, the spectacle lens 1 is configured to cause light rays to converge on the positions B on the object side, in addition to causing light rays to converge to realize the prescription of the wearer of the spectacles. Due to having such optical properties, the spectacle lens 1 exhibits a myopia progression-suppressive effect.

Method for Designing Spectacle Lens According to Mode of Present Disclosure

The technical idea of the present disclosure is also applicable to a method for designing a spectacle lens. The configuration thereof is as follows:

"A method for designing a spectacle lens that includes:

a first area that causes light rays incident on an object-side face of the lens to exit from an eyeball-side face of the lens and to converge at a predetermined position A on a retina of a wearer; and a plurality of defocusing second areas configured to cause light rays to converge at a position B on the object side relative to the position A, the method including:

designing at least some of the second areas in a peripheral area of the spectacle lens that is a radius range from 4.5 mm to 25 mm from a lens center (corresponding to being at 10 degrees or more and 45 degrees or less, in terms of the rotation angle of an eyeball of a wearer) so as to have a shape that suppresses a variation in a defocusing effect, the variation being more likely to occur as a distance from the lens center increases."

It may be desired to apply the method for designing a spectacle lens according to a mode of the present disclosure to an example that is the same as the already-described spectacle lens, and a description thereof is omitted accordingly.

Method for Producing Spectacle Lens

The technical idea of the present disclosure is also applicable to a method for producing a spectacle lens that employs the above method for designing a spectacle lens. A specific example of the method for producing the spectacle lens 1 will be described.

To produce the spectacle lens 1, first, the lens base material 2 is molded using a known molding method, such as cast polymerization. For example, by performing molding by means of cast polymerization using a mold that has a molding face provided with a plurality of concave portions, a lens base material 2 is obtained that has the convex areas 6 on at least one of the surfaces.

After the lens base material 2 has been obtained, next, the hard coatings 8 are formed on the surfaces of the lens base material 2. The hard coatings 8 can be formed using a method of immersing the lens base material 2 in a hard coating agent, spin coating, or the like.

After the hard coatings 8 have been formed, the anti-reflection coatings 10 are then formed on the surfaces of the hard coatings 8. The hard coatings 8 can be formed by depositing an anti-reflection agent by means of vacuum evaporation.

With the production method with the above procedure, the spectacle lens 1 is obtained that has, on the face 3 on the object side, a plurality of convex areas 6 that protrude toward the object.

In Case of Exhibiting Hyperopia Progression-Suppressive Effect

A hyperopia progression-suppressive effect is exhibited by replacing the convex areas with concave areas, and also replacing the positions B on the object side with positions C on the distal side in the spectacle lens and the method for designing the spectacle lens that have been described thus far.

A mode of exhibiting the hyperopia progression-suppressive effect is as follows:

"A spectacle lens including:

a first area that causes light rays incident on an object-side face of the lens to exit from an eyeball-side face of the lens and to converge at a predetermined position A on a retina of a wearer; and a plurality of defocusing second areas configured to cause light rays to converge at a position C on the distal side relative to the position A, wherein at least some of the second areas in a peripheral area of the spectacle lens that is a radius range from 4.5 mm to 25 mm from a lens center (corresponding to being at 10 degrees or more and 45 degrees or less, in terms of the rotation angle of an eyeball of a wearer) have a shape that suppresses a variation in a defocusing effect, the variation being more likely to occur as a distance from the lens center increases."

In the case of a mode of exhibiting the hyperopia progression-suppressive effect, it may be desired to implement examples as follows:

"The second areas are concave areas, and refractive power in at least some of the second areas in the peripheral area of the spectacle lens differs from refractive power in the second areas in a central area of the spectacle lens that is a radius range less than 4.5 mm from the lens center."

"The second areas are concave areas, and at least some of the second areas in the peripheral area of the spectacle lens have a toric shape that cancels out astigmatism in defocusing power occurring in the peripheral area."

Note that the concave areas are, literally, areas that are formed with recesses. The concave areas may have a shape obtained by recessing the convex shape of the micro convex portions (e.g., convex areas 6 as described with reference to FIGS. 2 and 3 above) toward the opposite side. Other shapes, arrangements, and so on are provided by replacing "convex" with "concave" in the above descriptions of "Lens Base Material", "Shape of Face on Object Side", and "Optical Properties".

EMBODIMENTS

Next, embodiments will be described to specifically describe the present disclosure. Needless to say, the present disclosure is not limited to the following embodiments.

Embodiment 1 and Comparative Example 1

The following spectacle lens was designed. Note that all of the spectacle lenses in the embodiments have the first area serving as a base and the second areas that are the convex areas. The overview of the configuration is as shown in FIG. 2.

S: −1.00 D
C: 0.00 D
Base curve: 1.0 D
n=1.589

The outer face, which is the face on the object side, was set to be spherical.

The inner face, which is the face on the eyeball side, was set to be aspherical.

The object distance was set to be infinite.
Outer-face curvature radius: r1=589.00 mm
Inner-face curvature radius: r2=294.407 mm
Center thickness: 1.0 mm
Eyeball rotation center position: 24 mm from the inner face vertex
Convex area shape: Spherical Actual defocusing power target: The average of defocusing power in the meridional direction and defocusing power in the sagittal direction was 3.50 D at any point on the lens Note that the expression for the inner aspherical face is as follows:

$$x = \frac{C\rho^2}{1+\sqrt{1-KC^2\rho^2}} + A_4\rho^4 + A_5\rho^5 + A_6\rho^6 + A_7\rho^7 + A_8\rho^8 \quad \text{[Expression 5]}$$

$\rho$ is as follows:

$$\rho = \sqrt{y^2+z^2} \quad \text{[Expression 6]}$$

In Embodiment 1, values of the symbols in the expression for the inner aspherical face are as follows:
C=1/r2=0.0033966548776263327674023769 1002
K=1.0
A4=−2.3251516E-7
A5=−4.1016978E-9
A6=5.4002311E-10
A7=−1.4792439E-11
A8=1.4112335E-13

For example, A4=−2.3251516E-7 indicates −2.3251516×$10^{-7}$.

Differences between the embodiments are collectively shown in the following table.

TABLE 1

| | Embodiment 1 | Embodiment 2 | Embodiment 3 | Embodiment 4 | Embodiment 5 |
|---|---|---|---|---|---|
| S Power [D] | −1.00 | −1.00 | −1.00 | −1.00 | −1.00 |
| Base Curve [D] | 1.00 | 1.00 | 3.00 | 3.00 | 3.00 |
| Object Distance | ∞ | ∞ | ∞ | 400 mm | 400 mm |
| Design of First Area (Base Portion) on Inner Face | Transmission power error in meridional direction: zero | Astigmatism: zero | Spherical | Transmission power error in meridional direction: zero | Astigmatism: zero |

TABLE 1-continued

|  | | | | | |
|---|---|---|---|---|---|
| Design of Second Areas (Convex Areas) | Spherical | Toric | Spherical | Toric | Spherical |
| Actual Target Defocus Power | Average between meridional direction and sagittal direction: 3.50 D | Both meridional direction and sagittal direction: 3.50 D | Average between meridional direction and sagittal direction: 3.50 D | Both meridional direction and sagittal direction: 3.50 D | Average between meridional direction and sagittal direction: 3.50 D |
| How to Reduce Surface Refractive Power of Second Areas (Convex Areas) in Peripheral Area | Evenly reduce in meridional direction and sagittal direction | Reduce more in meridional direction | Evenly reduce in meridional direction and sagittal direction | Reduce more in meridional direction | Evenly reduce in meridional direction and sagittal direction |

|  | Embodiment 6 | Embodiment 7 | Embodiment 8 | Embodiment 9 | Embodiment 10 |
|---|---|---|---|---|---|
| S Power [D] | −4.00 | −4.00 | −4.00 | −4.00 | −4.00 |
| Base Curve [D] | 1.00 | 1.00 | 3.00 | 3.00 | 3.00 |
| Object Distance | 400 mm | 400 mm | 400 mm | ∞ | ∞ |
| Design of First Area (Base Portion) on Inner Face | Transmission power error in meridional direction: zero | Astigmatism: zero | Spherical | Transmission power error in meridional direction: zero | Astigmatism: zero |
| Design of Second Areas (Convex Areas) | Spherical | Toric | Spherical | Toric | Spherical |
| Actual Target Defocus Power | Average between meridional direction and sagittal direction: 3.50 D | Both meridional direction and sagittal direction: 3.50 D | Average between meridional direction and sagittal direction: 3.50 D | Both meridional direction and sagittal direction: 3.50 D | Average between meridional direction and sagittal direction: 3.50 D |
| How to Reduce Surface Refractive Power of Second Areas (Convex Areas) in Peripheral Area | Evenly reduce in meridional direction and sagittal direction | Reduce more in meridional direction | Evenly reduce in meridional direction and sagittal direction | Reduce more in meridional direction | Evenly reduce in meridional direction and sagittal direction |

In the following description, M in the diagrams denotes the meridional direction, S denotes the sagittal direction, and Ave denotes an average value of a value in M and a value in S.

FIG. 6A is a plot showing the relationship between the distance from the lens center (horizontal axis) and surface refractive power on a lens inner face (aspheric surface) in Embodiment 1 (vertical axis).

FIG. 6B is a plot showing the relationship between the distance from the lens center (horizontal axis) and a transmission power error in the meridional direction and a transmission power error in the sagittal direction in the first area (base portion) of the spectacle lens in Embodiment 1 (vertical axis).

As shown in FIG. 6B, in Embodiment 1, the first area (base portion) is designed such that the refractive power error in the meridional direction is substantially zero. In addition, in Embodiment 1, the second areas (convex areas) were designed as follows, in accordance with the distance from the lens center.

FIG. 6C is a plot showing the relationship between the distance from the lens center (horizontal axis) and a surface refractive power in the meridional direction and a surface refractive power in the sagittal direction in the outer-face second areas (convex areas) of the spectacle lens in Embodiment 1 (vertical axis).

FIG. 6D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 1 (vertical axis).

As shown in FIG. 6C, in Embodiment 1, the larger the distance from the lens center is, i.e. the larger the distance from the lens center to the peripheral area side is, the more reduced the surface refractive power in the second areas (convex areas) is in the meridional direction and the sagittal direction. Specifically, the curvature of the spherical shape of the convex areas is reduced in both the meridional direction and the sagittal direction. As a result, it was found that the actual average defocusing power barely varied from 3.50 D, which is the actual defocusing power target value, as shown in FIG. 6D.

Note that the case of making the refractive power in the second areas (convex areas) constant regardless of the distance from the lens center (Comparative Example 1) will be described briefly.

FIG. 6E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 1 (vertical axis).

FIG. 6F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 1 (vertical axis).

As shown in FIG. 6E, in Comparative Example 1, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual average defocusing power increased from 3.50 D, which is the actual defocusing power target value, as shown in FIG. 6F. That is to say, it was found that the defocusing effect varied in Comparative Example 1.

Embodiment 2 and Comparative Example 2

Parameters that are changed from the design in Embodiment 1 are as follows. Parameters other than the following parameters are the same as those in Embodiment 1.
  Convex area shape: Toric
  Actual defocusing power target: "Both" defocusing power in the meridional direction and defocusing power in the sagittal direction is 3.50 D at any point on the lens
  Values of the symbols in the expression for the inner aspherical face that differ from those in Embodiment 1 are as follows:
    $A4 = -2.8930926E-07$
    $A5 = -2.3465168E-09$
    $A6 = 4.6742775E-10$
    $A7 = -1.2295559E-11$
    $A8 = 1.1000012E-13$ FIG. 7A is a plot showing the relationship between the distance from the lens center (horizontal axis) and surface refractive power on a lens inner face (aspheric surface) in Embodiment 2 (vertical axis).

FIG. 7B is a plot showing the relationship between the distance from the lens center (horizontal axis) and a transmission power error in the meridional direction and a transmission power error in the sagittal direction in the first area (base portion) of the spectacle lens in Embodiment 2 (vertical axis).

As shown in FIG. 7B, in Embodiment 2, the first area (base portion) is designed such that astigmatism (i.e. the difference between a refractive power error in the meridional direction and a refractive power error in the sagittal direction) is substantially zero. In addition, in Embodiment 2, the second areas (convex areas) were designed as follows, in accordance with the distance from the lens center.

FIG. 7C is a plot showing the relationship between the distance from the lens center (horizontal axis) and a surface refractive power in the meridional direction and a surface refractive power in the sagittal direction in the outer-face second areas (convex areas) of the spectacle lens in Embodiment 2 (vertical axis).

FIG. 7D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 2 (vertical axis).

As shown in FIG. 7C, in Embodiment 2, the larger the distance from the lens center is, i.e. the larger the distance from the lens center to the peripheral area side is, the more reduced the surface refractive power in the second areas (convex areas) is in the meridional direction and the sagittal direction (the refractive power in the meridional direction is more reduced). Specifically, the curvature of the spherical shape of the convex areas is reduced. As a result, it was found that the actual defocusing power in both the meridional direction and the sagittal direction barely varied from 3.50 D, which was the actual defocusing power target value, as shown in FIG. 7D.

Note that the case of making the refractive power in the second areas (convex areas) constant regardless of the distance from the lens center (Comparative Example 2) will be described briefly.

FIG. 7E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 2 (vertical axis).

FIG. 7F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 2 (vertical axis).

As shown in FIG. 7E, in Comparative Example 2, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual defocusing power in both the meridional direction and the sagittal direction increased from 3.50 D, which was the actual defocusing power target value, as shown in FIG. 7F. That is to say, it was found that the defocusing effect varied in Comparative Example 2.

Embodiment 3 and Comparative Example 3

Parameters that are changed from the design in Embodiment 1 are as follows. Parameters other than the following parameters are the same as those in Embodiment 1.
Base curve: 3.0 D
The inner face, which is the face on the eyeball side, was set to be spherical.
Outer-face curvature radius: r1=196.333 mm
Inner-face curvature radius: r2=147.041 mm
FIG. 8A is a plot showing the relationship between the distance from the lens center (horizontal axis) and surface refractive power on a lens inner face (aspheric surface) in Embodiment 3 (vertical axis).
FIG. 8B is a plot showing the relationship between the distance from the lens center (horizontal axis) and a transmission power error in the meridional direction and a transmission power error in the sagittal direction in the first area (base portion) of the spectacle lens in Embodiment 3 (vertical axis).
As shown in FIGS. 8A and 8B, in Embodiment 3, the first area (base portion) is designed to have a spherical shape. In addition, in Embodiment 3, the second areas (convex areas) were designed as follows, in accordance with the distance from the lens center.
FIG. 8C is a plot showing the relationship between the distance from the lens center (horizontal axis) and a surface refractive power in the meridional direction and a surface refractive power in the sagittal direction in the outer-face second areas (convex areas) of the spectacle lens in Embodiment 3 (vertical axis).
FIG. 8D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 3 (vertical axis).
As shown in FIG. 8C, in Embodiment 3, the larger the distance from the lens center is, i.e. the larger the distance from the lens center to the peripheral area side is, the more reduced the surface refractive power in the second areas (convex areas) is in the meridional direction and the sagittal direction. Specifically, the curvature of the spherical shape of the convex areas is reduced. As a result, it was found that the actual average defocusing power barely varied from 3.50 D, which is the actual defocusing power target value, as shown in FIG. 8D.
Note that the case of making the refractive power in the second areas (convex areas) constant regardless of the distance from the lens center (Comparative Example 3) will be described briefly.
FIG. 8E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 3 (vertical axis).
FIG. 8F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 3 (vertical axis).
As shown in FIG. 8E, in Comparative Example 3, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual average defocusing power increased from 3.50 D, which is the actual defocusing power target value, as shown in FIG. 8F. That is to say, it was found that the defocusing effect varied in Comparative Example 3.

Embodiment 4 and Comparative Example 4

Parameters that are changed from the design in Embodiment 1 are as follows. Parameters other than the following parameters are the same as those in Embodiment 1.
Base curve: 3.0 D
The object distance was set to be 400 mm.
Outer-face curvature radius: r1=196.333 mm
Inner-face curvature radius: r2=147.041 mm
Convex area shape: Toric
Actual defocusing power target: "Both" defocusing power in the meridional direction and defocusing power in the sagittal direction is 3.50 D at any point on the lens
Values of the symbols in the expression for the inner aspherical face that differ from those in Embodiment 1 are as follows:
C=1/r2=0.0068008058628448896434634974533 1
A4=−1.4060042E-07
A5=1.695817E-09
A6=6.2492899E-11
A7=−1.4892971E-12
A8=8.663421E-15
FIG. 9A is a plot showing the relationship between the distance from the lens center (horizontal axis) and surface refractive power on a lens inner face (aspheric surface) in Embodiment 4 (vertical axis).
FIG. 9B is a plot showing the relationship between the distance from the lens center (horizontal axis) and a transmission power error in the meridional direction and a transmission power error in the sagittal direction in the first area (base portion) of the spectacle lens in Embodiment 4 (vertical axis).
As shown in FIG. 9B, in Embodiment 4, the first area (base portion) is designed such that the refractive power error in the meridional direction is substantially zero. In addition, in Embodiment 4, the second areas (convex areas) were designed as follows, in accordance with the distance from the lens center.
FIG. 9C is a plot showing the relationship between the distance from the lens center (horizontal axis) and a surface refractive power in the meridional direction and a surface refractive power in the sagittal direction in the outer-face second areas (convex areas) of the spectacle lens in Embodiment 4 (vertical axis).
FIG. 9D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 4 (vertical axis).
As shown in FIG. 9C, in Embodiment 4, the larger the distance from the lens center is, i.e. the larger the distance from the lens center to the peripheral area side is, the more reduced the surface refractive power in the second areas (convex areas) is in the meridional direction and the sagittal direction (the refractive power in the meridional direction is more reduced). Specifically, the curvature of the spherical shape of the convex areas is reduced in both the meridional direction and the sagittal direction. As a result, it was found that the actual defocusing power in both the meridional direction and the sagittal direction is barely varied from 3.50 D, which was the actual defocusing power target value, as shown in FIG. 9D.

Note that the case of making the refractive power in the second areas (convex areas) constant regardless of the distance from the lens center (Comparative Example 4) will be described briefly.

FIG. 9E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 4 (vertical axis).

FIG. 9F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 4 (vertical axis).

As shown in FIG. 9E, in Comparative Example 4, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual defocusing power in both the meridional direction and the sagittal direction increased from 3.50 D, which was the actual defocusing power target value, as shown in FIG. 9F. That is to say, it was found that the defocusing effect varied in Comparative Example 4.

Embodiment 5 and Comparative Example 5

Parameters that are changed from the design in Embodiment 1 are as follows. Parameters other than the following parameters are the same as those in Embodiment 1.
Base curve: 3.0 D
The object distance was set to be 400 mm.
Outer-face curvature radius: r1=196.333 mm
Inner-face curvature radius: r2=147.041 mm
Values of the symbols in the expression for the inner aspherical face that differ from those in Embodiment 1 are as follows:
C=1/r2=0.0068008058628448896434634974 5331
A4=−1.8553325E−07
A5=2.7748042E−09
A6=3.6830526E−11
A7=−9.9544957E−13
A8=4.3136845E−15

FIG. 10A is a plot showing the relationship between the distance from the lens center (horizontal axis) and surface refractive power on a lens inner face (aspheric surface) in Embodiment 5 (vertical axis).

FIG. 10B is a plot showing the relationship between the distance from the lens center (horizontal axis) and a transmission power error in the meridional direction and a transmission power error in the sagittal direction in the first area (base portion) of the spectacle lens in Embodiment 5 (vertical axis).

As shown in FIG. 10B, in Embodiment 5, the first area (base portion) is designed such that astigmatism (i.e. the difference between a refractive power error in the meridional direction and a refractive power error in the sagittal direction) is substantially zero. In addition, in Embodiment 5, the second areas (convex areas) were designed as follows, in accordance with the distance from the lens center.

FIG. 10C is a plot showing the relationship between the distance from the lens center (horizontal axis) and a surface refractive power in the meridional direction and a surface refractive power in the sagittal direction in the outer-face second areas (convex areas) of the spectacle lens in Embodiment 5 (vertical axis).

FIG. 10D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 5 (vertical axis).

As shown in FIG. 10C, in Embodiment 5, the larger the distance from the lens center is, i.e. the larger the distance from the lens center to the peripheral area side is, the more reduced the surface refractive power in the second areas (convex areas) is in the meridional direction and the sagittal direction. Specifically, the curvature of the spherical shape of the convex areas is reduced. As a result, it was found that the actual average defocusing power barely varied from 3.50 D, which is the actual defocusing power target value, as shown in FIG. 10D.

Note that the case of making the refractive power in the second areas (convex areas) constant regardless of the distance from the lens center (Comparative Example 5) will be described briefly.

FIG. 10E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 5 (vertical axis).

FIG. 10F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 5 (vertical axis).

As shown in FIG. 10E, in Comparative Example 5, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual average defocusing power increased from 3.50 D, which is the actual defocusing power target value, as shown in FIG. 10F. That is to say, it was found that the defocusing effect varied in Comparative Example 5.

Embodiment 6 and Comparative Example 6

Parameters that are changed from the design in Embodiment 1 are as follows: Parameters other than the following parameters are the same as those in Embodiment 1.
S: −4.00 D
The object distance was set to be 400 mm.
Inner-face curvature radius: r2=117.785 mm
Values of the symbols in the expression for the inner aspherical face that differ from those in Embodiment 1 are as follows:
C=1/r2=0.0084900334854361799660441426146
A4=−5.1590858E-07
A5=4.7732903E-09
A6=1.4614985E-10
A7=−1.3000922E-12
A8=−1.2863666E-14

FIG. 11A is a plot showing the relationship between the distance from the lens center (horizontal axis) and surface refractive power on a lens inner face (aspheric surface) in Embodiment 6 (vertical axis).

FIG. 11B is a plot showing the relationship between the distance from the lens center (horizontal axis) and a transmission power error in the meridional direction and a transmission power error in the sagittal direction in the first area (base portion) of the spectacle lens in Embodiment 6 (vertical axis).

As shown in FIG. 11B, in Embodiment 6, the first area (base portion) is designed such that the refractive power error in the meridional direction is substantially zero. In addition, in Embodiment 6, the second areas (convex areas) were designed as follows, in accordance with the distance from the lens center.

FIG. 11C is a plot showing the relationship between the distance from the lens center (horizontal axis) and a surface refractive power in the meridional direction and a surface refractive power in the sagittal direction in the outer-face second areas (convex areas) of the spectacle lens in Embodiment 6 (vertical axis).

FIG. 11D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 6 (vertical axis).

As shown in FIG. 11C, in Embodiment 6, the larger the distance from the lens center is, i.e. the larger the distance from the lens center to the peripheral area side is, the more reduced the surface refractive power in the second areas (convex areas) is in the meridional direction and the sagittal direction. Specifically, the curvature of the spherical shape of the convex areas is reduced in both the meridional direction and the sagittal direction. As a result, it was found that the actual average defocusing power barely varied from 3.50 D, which is the actual defocusing power target value, as shown in FIG. 11D.

Note that the case of making the refractive power in the second areas (convex areas) constant regardless of the distance from the lens center (Comparative Example 6) will be described briefly.

FIG. 11E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 6 (vertical axis).

FIG. 11F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 6 (vertical axis).

As shown in FIG. 11E, in Comparative Example 6, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual average defocusing power increased from 3.50 D, which is the actual defocusing power target value, as shown in FIG. 11F. That is to say, it was found that the defocusing effect varied in Comparative Example 6.

Embodiment 7 and Comparative Example 7

Parameters that are changed from the design in Embodiment 1 are as follows. Parameters other than the following parameters are the same as those in Embodiment 1.
S: −4.00 D
The object distance was set to be 400 mm.
Inner-face curvature radius: r2=117.785 mm
Convex area shape: Toric
Actual defocusing power target: "Both" defocusing power in the meridional direction and defocusing power in the sagittal direction is 3.50 D at any point on the lens
Values of the symbols in the expression for the inner aspherical face that differ from those in Embodiment 1 are as follows:
C=1/r2=0.0084900334854361799660441426146
A4=−6.6468643E-07
A5=7.3438153E-09
A6=9.717384E-11
A7=−5.2561303E-14
A8=−3.1103924E-14

FIG. 12A is a plot showing the relationship between the distance from the lens center (horizontal axis) and surface refractive power on a lens inner face (aspheric surface) in Embodiment 7 (vertical axis).

FIG. 12B is a plot showing the relationship between the distance from the lens center (horizontal axis) and a transmission power error in the meridional direction and a transmission power error in the sagittal direction in the first area (base portion) of the spectacle lens in Embodiment 7 (vertical axis).

As shown in FIG. 12B, in Embodiment 7, the first area (base portion) is designed such that astigmatism (i.e. the difference between a refractive power error in the meridional direction and a refractive power error in the sagittal direction) is substantially zero. In addition, in Embodiment 7, the second areas (convex areas) were designed as follows, in accordance with the distance from the lens center.

FIG. 12C is a plot showing the relationship between the distance from the lens center (horizontal axis) and a surface refractive power in the meridional direction and a surface refractive power in the sagittal direction in the outer-face second areas (convex areas) of the spectacle lens in Embodiment 7 (vertical axis).

FIG. 12D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 7 (vertical axis).

As shown in FIG. 12C, in Embodiment 7, the larger the distance from the lens center is, i.e. the larger the distance from the lens center to the peripheral area side is, the more reduced the surface refractive power in the second areas (convex areas) is in the meridional direction and the sagittal direction (the refractive power in the meridional direction is more reduced). Specifically, the curvature of the spherical shape of the convex areas is reduced. As a result, it was found that the actual defocusing power in both the meridional direction and the sagittal direction barely varied from 3.50 D, which was the actual defocusing power target value, as shown in FIG. 12D.

Note that the case of making the refractive power in the second areas (convex areas) constant regardless of the distance from the lens center (Comparative Example 7) will be described briefly.

FIG. 12E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 7 (vertical axis).

FIG. 12F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 7 (vertical axis).

As shown in FIG. 12E, in Comparative Example 7, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual defocusing power in both the meridional direction and the sagittal direction increased from 3.50 D, which was the actual defocusing power target value, as shown in FIG. 12F. That is to say, it was found that the defocusing effect varied in Comparative Example 7.

Embodiment 8 and Comparative Example 8

Parameters that are changed from the design in Embodiment 1 are as follows. Parameters other than the following parameters are the same as those in Embodiment 1.
S: −4.00 D
Base curve: 3.0 D
The object distance was set to be 400 mm.
The inner face, which is the face on the eyeball side, was set to be spherical.
Outer-face curvature radius: r1=196.333 mm
Inner-face curvature radius: r2=84.075 mm FIG. 13A is a plot showing the relationship between the distance from the lens center (horizontal axis) and surface refractive power on a lens inner face (aspheric surface) in Embodiment 8 (vertical axis).

FIG. 13B is a plot showing the relationship between the distance from the lens center (horizontal axis) and a transmission power error in the meridional direction and a transmission power error in the sagittal direction in the first area (base portion) of the spectacle lens in Embodiment 8 (vertical axis).

As shown in FIGS. 13A and 13B, in Embodiment 8, the first area (base portion) is designed to have a spherical shape. In addition, in Embodiment 8, the second areas (convex areas) were designed as follows, in accordance with the distance from the lens center.

FIG. 13C is a plot showing the relationship between the distance from the lens center (horizontal axis) and a surface refractive power in the meridional direction and a surface refractive power in the sagittal direction in the outer-face second areas (convex areas) of the spectacle lens in Embodiment 8 (vertical axis).

FIG. 13D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 8 (vertical axis).

As shown in FIG. 13C, in Embodiment 8, the larger the distance from the lens center is, i.e. the larger the distance from the lens center to the peripheral area side, the more reduced the surface refractive power in the second areas (convex areas) is in the meridional direction and the sagittal direction. Specifically, the curvature of the spherical shape of the convex areas is reduced. As a result, it was found that the actual average defocusing power barely varied from 3.50 D, which is the actual defocusing power target value, as shown in FIG. 13D.

Note that the case of making the refractive power in the second areas (convex areas) constant regardless of the distance from the lens center (Comparative Example 8) will be described briefly.

FIG. 13E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 8 (vertical axis).

FIG. 13F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 8 (vertical axis).

As shown in FIG. 13E, in Comparative Example 8, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual average defocusing power increased from 3.50 D, which is the actual defocusing power target value, as shown in FIG. 13F. That is to say, it was found that the defocusing effect varied in Comparative Example 8.

Embodiment 9 and Comparative Example 9

Parameters that are changed from the design in Embodiment 1 are as follows. Parameters other than the following parameters are the same as those in Embodiment 1.
S: −4.00 D
Base curve: 3.0 D
Outer-face curvature radius: r1=196.333 mm
Inner-face curvature radius: r2=84.075 mm
Convex area shape: Toric Actual defocusing power target: "Both" defocusing power in the meridional direction and defocusing power in the sagittal direction is 3.50 D at any point on the lens Values of the symbols in the expression for the inner aspherical face that differ from those in Embodiment 1 are as follows:

C=1/r2=0.011894184470654736842105263315789
A4=−3.8714886E-07
A5=−3.4591069E-09
A6=5.8607762E-10
A7=−1.4532515E-11
A8=1.4579488E-13

FIG. 14A is a plot showing the relationship between the distance from the lens center (horizontal axis) and surface refractive power on a lens inner face (aspheric surface) in Embodiment 9 (vertical axis).

FIG. 14B is a plot showing the relationship between the distance from the lens center (horizontal axis) and a transmission power error in the meridional direction and a transmission power error in the sagittal direction in the first area (base portion) of the spectacle lens in Embodiment 9 (vertical axis).

As shown in FIG. 14B, in Embodiment 9, the first area (base portion) is designed such that the refractive power error in the meridional direction is substantially zero. In addition, in Embodiment 9, the second areas (convex areas) were designed as follows, in accordance with the distance from the lens center.

FIG. 14C is a plot showing the relationship between the distance from the lens center (horizontal axis) and a surface refractive power in the meridional direction and a surface refractive power in the sagittal direction in the outer-face second areas (convex areas) of the spectacle lens in Embodiment 9 (vertical axis).

FIG. 14D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 9 (vertical axis).

As shown in FIG. 14C, in Embodiment 9, the larger the distance from the lens center is, i.e. the larger the distance from the lens center to the peripheral area side is, the more reduced the surface refractive power in the second areas (convex areas) is in the meridional direction and the sagittal direction (the refractive power in the meridional direction is more reduced). Specifically, the curvature of the spherical shape of the convex areas is reduced in both the meridional direction and the sagittal direction. As a result, it was found that the actual defocusing power in both the meridional direction and the sagittal direction is barely varied from 3.50 D, which was the actual defocusing power target value, as shown in FIG. 14D.

Note that the case of making the refractive power in the second areas (convex areas) constant regardless of the distance from the lens center (Comparative Example 9) will be described briefly.

FIG. 14E is a plot showing the relationship between the distance from the lens center (horizontal axis) and a surface refractive power in the meridional direction and a surface refractive power in the sagittal direction in the outer-face second areas (convex areas) of the spectacle lens in Comparative Example 9 (vertical axis).

FIG. 14F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 9 (vertical axis).

As shown in FIG. 14E, in Comparative Example 9, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual defocusing power in both the meridional direction and the sagittal direction increased from 3.50 D, which was the actual defocusing power target value, as shown in FIG. 14F. That is to say, it was found that the defocusing effect varied in Comparative Example 9.

Embodiment 10 and Comparative Example 10

Parameters that are changed from the design in Embodiment 1 are as follows. Parameters other than the following parameters are the same as those in Embodiment 1.

S: −4.00 D
Base curve: 3.0 D
Outer-face curvature radius: r1=196.333 mm
Inner-face curvature radius: r2=84.075 mm Values of the symbols in the expression for the inner aspherical face that differ from those in Embodiment 1 are as follows:

C=1/r2=0.011894184470654736842105263315789
A4=−5.4377405E-07
A5=−5.2688778E-09
A6=7.3505486E-10
A7=−1.7409673E-11
A8=1.5438782E-13

FIG. 15A is a plot showing the relationship between the distance from the lens center (horizontal axis) and surface refractive power on a lens inner face (aspheric surface) in Embodiment 10 (vertical axis).

FIG. 15B is a plot showing the relationship between the distance from the lens center (horizontal axis) and a transmission power error in the meridional direction and a transmission power error in the sagittal direction in the first area (base portion) of the spectacle lens in Embodiment 10 (vertical axis).

As shown in FIG. 15B, in Embodiment 10, the first area (base portion) is designed such that astigmatism (i.e. the difference between a refractive power error in the meridional direction and a refractive power error in the sagittal direction) is substantially zero. In addition, in Embodiment 10, the second areas (convex areas) were designed as follows, in accordance with the distance from the lens center.

FIG. 15C is a plot showing the relationship between the distance from the lens center (horizontal axis) and a surface refractive power in the meridional direction and a surface refractive power in the sagittal direction in the outer-face second areas (convex areas) of the spectacle lens in Embodiment 10 (vertical axis).

FIG. 15D is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Embodiment 10 (vertical axis).

As shown in FIG. 15C, in Embodiment 10, the larger the distance from the lens center is, i.e. the larger the distance from the lens center to the peripheral area side is, the more reduced the surface refractive power in the second areas (convex areas) is in the meridional direction and the sagittal direction. Specifically, the curvature of the spherical shape of the convex areas is reduced. As a result, it was found that the actual average defocusing power barely varied from 3.50 D, which is the actual defocusing power target value, as shown in FIG. 15D.

Note that the case of making the refractive power in the second areas (convex areas) constant regardless of the distance from the lens center (Comparative Example 10) will be described briefly.

FIG. 15E is a plot showing the relationship between the distance from the lens center (horizontal axis) and a surface refractive power in the meridional direction and a surface refractive power in the sagittal direction in the outer-face second areas (convex areas) of the spectacle lens in Embodiment 10 (vertical axis).

FIG. 15F is a plot showing the relationship between the distance from the lens center (horizontal axis) and the actual defocusing power in the meridional direction and the actual defocusing power in the sagittal direction, and the average defocusing power therebetween in the second areas (convex areas) of the spectacle lens in Comparative Example 10 (vertical axis).

As shown in FIG. 15E, in Comparative Example 10, the refractive power in the second areas (convex areas) is set constant regardless of the distance from the lens center. Specifically, the curvature of the spherical shape of the convex areas is set constant. As a result, it was found that the larger the distance from the lens center was, i.e. the larger the distance from the lens center to the peripheral area side was, the more the actual average defocusing power increased from 3.50 D, which is the actual defocusing power target value, as shown in FIG. 15F. That is to say, it was found that the defocusing effect varied in Comparative Example 10.

An aspect of the "spectacle lens and method for designing the same" of the present disclosure is summarized below.

An embodiment of the present disclosure is as follows:
"A spectacle lens including:
a first area that causes light rays incident on an object-side face of the lens to exit from an eyeball-side face of the lens and to converge at a predetermined position A on a retina of a wearer; and
a plurality of defocusing second areas configured to cause light rays to converge at a position B on the object side or a position C on the distal side relative to the position A,
wherein at least some of the second areas in a peripheral area of the spectacle lens that is a radius range from 4.5 mm to 25 mm from a lens center have a shape that suppresses a variation in a defocusing effect, the variation being more likely to occur as a distance from the lens center increases."

The invention claimed is:
1. A spectacle lens comprising:
a first area that causes light rays incident on an object-side face of the lens to exit from an eyeball-side face of the lens and to converge at a predetermined position A on a retina of a wearer; and
a plurality of second areas configured to cause light rays to converge at a position B on the object side or a position C on the distal side relative to the position A,
wherein refractive power of the second areas in the peripheral area of the spectacle lens, that is a radius range from 4.5 mm to 25 mm from a lens center, is continuously reduced as the distance from the lens center increases over an entirety of the radius range.
2. The spectacle lens according to claim 1,
wherein the second areas comprise convex areas, and
refractive power in at least some of the second areas in the peripheral area of the spectacle lens differs from refractive power in the second areas in a central area of the spectacle lens that is a radius range less than 4.5 mm from the lens center.
3. The spectacle lens according to claim 1,
wherein refractive power of at least some of the second areas in the peripheral area of the spectacle lens is reduced evenly in meridional direction and sagittal direction as the distance from the lens center increases.
4. The spectacle lens according to claim 1,
wherein refractive power of at least some of the second areas in the peripheral area of the spectacle lens is reduced in meridional direction more than sagittal direction as the distance from the lens center increases.
5. The spectacle lens according to claim 1,
wherein the second areas comprise convex areas, and
at least some of the second areas in the peripheral area of the spectacle lens comprises toric shape.
6. The spectacle lens according to claim 1,
wherein the second areas comprise convex areas, and
the convex areas are arranged in a state of being spaced apart with each other and the first area is present between the convex areas.
7. A method for designing a spectacle lens that includes:
a first area that causes light rays incident on an object-side face of the lens to exit from an eyeball-side face of the lens and to converge at a predetermined position A on a retina of a wearer; and
a plurality of second areas configured to cause light rays to converge at a position B on the object side or a position C on the distal side relative to the position A,
the method including:
designing the second areas in a peripheral area of the spectacle lens, that is a radius range from 4.5 mm to 25 mm from a lens center, to have refractive power that is continuously reduced as the distance from the lens center increases over an entirety of the radius range.

* * * * *